US009639897B2

(12) United States Patent
Bendel et al.

(10) Patent No.: US 9,639,897 B2
(45) Date of Patent: May 2, 2017

(54) PREDICTING ECONOMIC CONDITIONS

(71) Applicant: Bank of America Corporation, Charlotte, NC (US)

(72) Inventors: Timothy J. Bendel, Charlotte, NC (US); Mark V. Krein, Charlotte, NC (US); David N. Joffe, Charlotte, NC (US); Sandi Setiawan, Charlotte, NC (US); William Anthony Nobili, Charlotte, NC (US); David Joa, San Francisco, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/146,345

(22) Filed: May 4, 2016

(65) Prior Publication Data

US 2016/0247234 A1 Aug. 25, 2016

Related U.S. Application Data

(63) Continuation-in-part of application No. 14/078,197, filed on Nov. 12, 2013.

(51) Int. Cl.
*G06Q 40/06* (2012.01)
*G06Q 10/04* (2012.01)
*G06Q 30/02* (2012.01)

(52) U.S. Cl.
CPC ............. *G06Q 40/06* (2013.01); *G06Q 10/04* (2013.01); *G06Q 30/0202* (2013.01)

(58) Field of Classification Search
CPC ...................................................... G06Q 40/06
USPC .......................................................... 706/21
See application file for complete search history.

(56) References Cited

U.S. PATENT DOCUMENTS

| 5,444,819 | A | * | 8/1995 | Negishi | G06Q 40/02 706/21 |
|---|---|---|---|---|---|
| 6,546,378 | B1 | * | 4/2003 | Cook | A61B 5/04012 382/159 |
| 7,660,737 | B1 | | 2/2010 | Lim et al. | |
| 8,364,569 | B1 | | 1/2013 | Lee, Jr. | |
| 8,606,620 | B2 | | 12/2013 | Grichnik et al. | |

(Continued)

OTHER PUBLICATIONS

V. Plerou, P. Gopikrishnan, B. Rosenow, L. A. N. Amaral, T. Guhr, H. E. Stanley. "Random matrix approach to cross correlations in financial data". Physics Review E 65, 066126 (2002). And references therein.

(Continued)

*Primary Examiner* — Samica L Norman
*Assistant Examiner* — William J Jacob
(74) *Attorney, Agent, or Firm* — Banner & Witcoff, Ltd.; Michael A. Springs

(57) ABSTRACT

Computer-implemented methods for identifying or assessing any type of risk and/or opportunity that may arise can include either, alone or in combination, band pass filtering, principal component analysis, random matrix theory analysis, synchronization analysis, and early-warning detection. Each technique can also be viewed as a process that takes a set of inputs and converts it to a set of outputs. These outputs can be used as inputs for a subsequent process or the outputs may be directly actionable for formulating certain economic predictions to make certain decisions.

24 Claims, 40 Drawing Sheets

(56) References Cited

U.S. PATENT DOCUMENTS

| | | | |
|---|---|---|---|
| 2003/0074331 A1* | 4/2003 | Kreft | G06Q 10/06 705/400 |
| 2004/0015376 A1* | 1/2004 | Zhu | G06Q 40/08 705/7.28 |
| 2005/0182673 A1 | 8/2005 | Marzian et al. | |
| 2007/0130060 A1 | 6/2007 | Ariarajah et al. | |
| 2008/0033854 A1* | 2/2008 | Nguyen | G06Q 30/02 705/35 |
| 2008/0154821 A1* | 6/2008 | Poulin | G06Q 10/04 706/21 |
| 2009/0182620 A1 | 7/2009 | Sunvold | |
| 2009/0265281 A1 | 10/2009 | Cohen et al. | |
| 2009/0292648 A1 | 11/2009 | Damschroder et al. | |
| 2010/0076813 A1 | 3/2010 | Ghosh et al. | |
| 2010/0094672 A1* | 4/2010 | Macy | G06Q 10/00 705/7.12 |
| 2013/0103615 A1* | 4/2013 | Mun | G06Q 40/06 705/36 R |
| 2014/0330645 A1 | 11/2014 | Craft | |

OTHER PUBLICATIONS

F. Luo, J. Zhong, Y. Yang, J. Zhou. "Application of random matrix theory to microarray data for discovering functional jene modules". Physical Review E 73, 031924 (2006). And references therein.

S. Bornholdt. "Less is more in modeling large genetic networks". Science 310, 449 (2005).

Z. N. Oltvai, A.-L. Barabasi. "Life's complexity pyramid". Science 298, 763 (2002).

M. E. J. Newman. "The physics of networks". Physics Today, Nov. 2008.

S. H. Strogatz. "Exploring complex networks". Nature 410, 268 (2001).

A. E. Molter, R. Albert. "Networks in motion". Physics Today, Apr. 2012.

M. Breakspear, S. Heitmann, A. Daffertshofer. "Generative models of cortical oscillations: neurobiological implications of the Kuramoto model". Frontiers in Human Neuroscience 4, 1 (2010). Publicly available codes and references therein.

R. M. May, S. A. Levin, G. Sugihara. "Ecology for bankers". Nature 451, 893 (2008).

A. G. Haldane, R. M. May. "Systemic risk in banking ecosystems". Nature 469, 351 (2011).

J. D. Farmer, D. Foley. "The economy needs agent-based modeling". Nature 460, 685 (2009).

M. Scheffer, J. Bascompte, W. A. Brock, V. Brovkin, S. R. Carpenter, V. Dakos, H. Held, E. H. van Nes, M. Rietkerk, G. Sughara. "Early-warning signals for critical transitions". Nature 461, 53 (2009). And references therein.

M. Scheffer. "Foreseeing tipping points". Nature 467, 411 (2010).

J. M. Drake, B. D. Griffen. "Early warning signals of extinction in deteriorating environments". Nature 467, 456 (2010).

L. Dai, K. S. Korolev, J. Gore. "Slower recovery in space before collapse of connected populations". Nature 496, 355 (2013). And references therein.

K. Borner, S. Sanyal, A. Vespignani. "Network science". In Blaise Cronin (Ed.), Annual Review of Information Science & Techonology, vol. 41, Medford, NJ: Information Today, Inc./American Society for Information Science and Technology, Chapter 12, pp. 537-607 (2007).

N. Friedman. "Inferring cellular networks using probabilistic graphical models". Science 303, 799 (2004).

M. Wildi. "Real-time US-Recession Indicator (USRI): A classical cycle perspective with bounceback". Publicly available pre-print. Institute of Data Analysis and Process Design, University of Technical Sciences, Rosenstrasse 3, 8401 Winterthur, Switzerland, email: marc.wildi@zhaw.ch; web-link to the paper: http://www.idp.zhaw.ch/fileadmin/user_upload/engineering/_Institute_und_Zentren/IDP/forschungsschwerpunkte/FRME/sef/US_Recession_Indicator/papers/us_recession.pdf.

M. E. J. Newman. "Networks: An Introduction". Oxford University Press (2010). And references therein.

M. O. Jackson. "Social and Economic Networks". Princeton University Press (2008). And references therein.

S. Wasserman, K. Faust. "Social Network Analysis: Methods and Applications". Cambridge University Press (1994). And references therein.

Taylor, R., Interpretation of the Correlation Coefficient: A Basic Review, Jan./Feb. 1990.

Saad, Y., Numerical Methods for Large Eigenvalue Problems, 2011.

Plerou, V., A Random Matrix Approach to Cross-Correlations in Financial Data.

Benes, J., Vavra D., Eigenvalue Filtering in VAR Models with Application to the Czech Business Cycle, Nov. 2005.

Bourgine et al., Cognitive Economics: An Interdisciplinary Approach, p. 391, 2004.

McElroy et al (Tucker S. McElroy and Thomas M. Trimbur. "Continuous Time Extraction of a Nonstationary Signal with Illustrations in Continuous Low-pass and Band-pass Filtering," Finance and Economics Discussion Series, Divisions of Research & Statistics and Monetary Affairs, Federal Reserve Board, Washington, D.C., Published in SSRN Journal 2007).

Kastrinaki et al. (An Analysis of UK Merger Cyclers and their Synchronization with Business Cycles: A Frequency Domain Approach, Mar. 2006, University of Warwick).

Oct. 18, 2013—U.S. Appl. No. 14/058,119.

Carol Alexander, Quantative Methods in Finance, 2008.

Margaret Meyer, Increasing Interdependence of Multivariate Distributions, Mar. 1, 2011.

* cited by examiner

PREDICTING ECONOMIC CONDITIONS

This application is a continuation-in-part of co-pending U.S. patent application Ser. No. 14/078,197 entitled "Predicting Economic Conditions" and filed on Nov. 12, 2013, the entire disclosure of which is hereby incorporated by reference.

BACKGROUND

Modern global finance depends on a high level of connectivity among financial institutions. In stable market conditions such connections allow capital to flow freely with little regard to geography. Transactions among investors/savers and liquidity providers and liquidity users can be globally efficient. The same networked structure may, however, become a channel of economic instability and distress amplification during global, financial stress. In the case of banks, where savers (deposits) fund investments (loans), a devaluation of loans can create abnormal liquidity demands from deposits. In the same way, in the case of shadow banks, where savers (money markets) fund investments (equity, debt and derivatives), a devaluation of collateral can also create an abnormal liquidity demand. These abnormal liquidity demands can escalate due to the interconnectedness of the economic system.

Studying systemic risk as compared with the emphasis on developing conventional risk management techniques in individual entities may be helpful in understanding economic conditions. The losses resulting from systemic risk may be taken into account. Focusing on the individual firm level in risk management may not be enough in managing the risk of a complex, interconnected system of companies. A larger, systemic perspective may be desired. Therefore, micro-macro connections can be studied, though individual components unique to a given microeconomic system. The topological properties of the networks in macroeconomic system share similarities with universal organizing principles.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Computer-implemented methods for identifying or assessing any type of risk and/or opportunity that may arise can include either, alone or in combination, band pass filtering, principal component analysis, random matrix theory analysis, synchronization analysis, and early-warning detection. Each technique can also be viewed as a process that takes a set of inputs and converts it to a set of outputs. These outputs can be used as inputs for a subsequent process or the outputs may be directly actionable for formulating certain economic predictions to make investment decisions and the like.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of examples various embodiments in which the disclosure may be practiced. It is to be understood that other embodiments may be utilized and structural and functional modifications may be made without departing from the scope of the present disclosure. The disclosure is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. For example, the use of "including" and "comprising" and variations thereof is meant to encompass the items listed thereafter and equivalents thereof as well as additional items and equivalents thereof, and the use of the terms "mounted," "connected," "coupled," "positioned," "engaged" and similar terms, is meant to include both direct and indirect mounting, connecting, coupling, positioning and engaging.

As noted above, various aspects of the disclosure relate to predicting economic conditions. Before discussing these aspects in greater detail, however, several examples of a network architecture and a data processing device that may be used in implementing various aspects of the disclosure will first be discussed.

Figure 1:
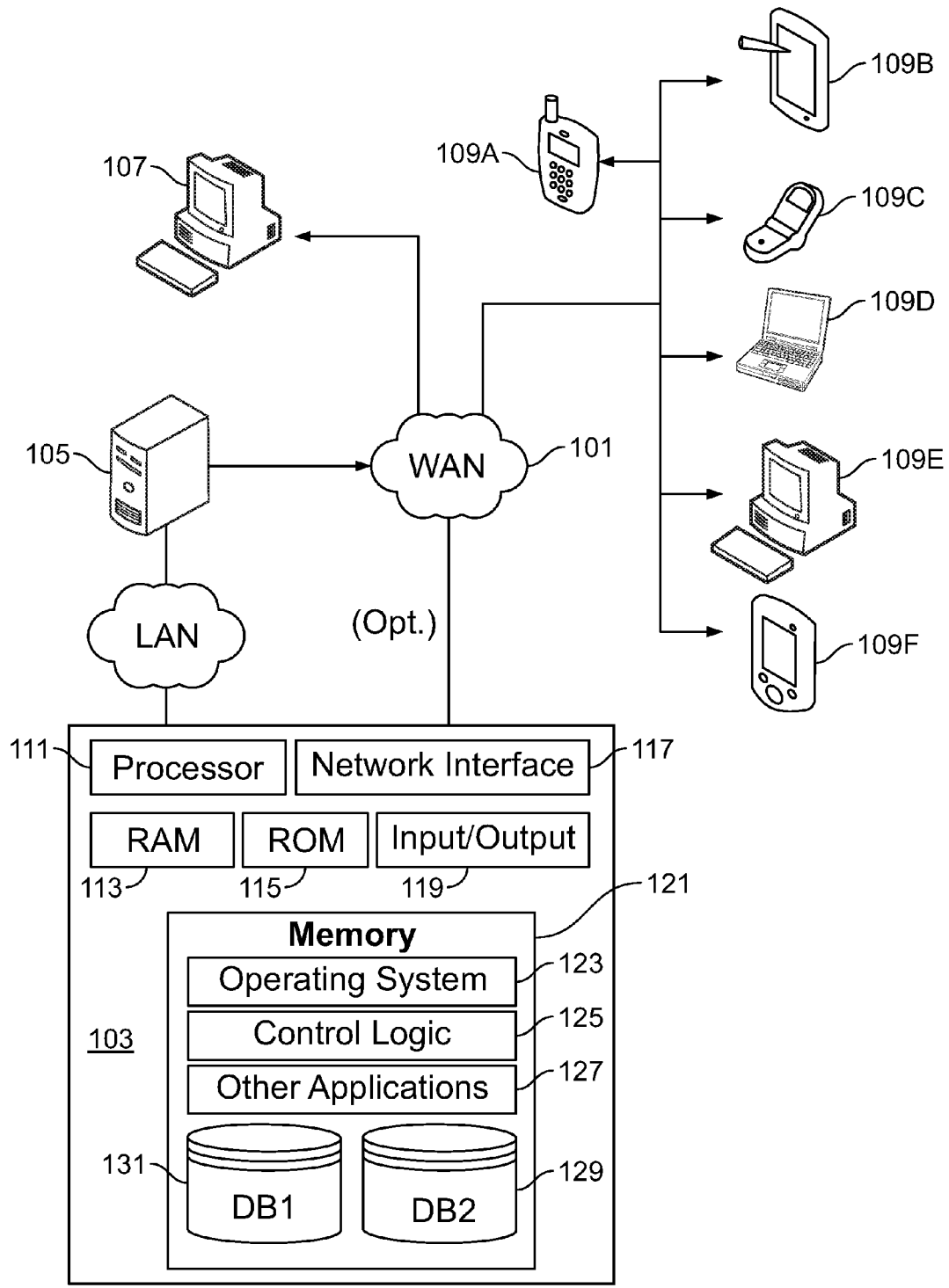
FIG. 1 illustrates one example of a network architecture and data processing device that may be used to implement one or more illustrative aspects discussed herein.

Detailed Description of Example Network Architecture and Data Processing Device that May be Used to Implement Methods for Determining Economic Conditions:

FIG. 1 illustrates one example of a network architecture and data processing device that may be used to implement one or more illustrative aspects. Various network nodes 103, 105, 107, and 109A-F may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109A-F and other devices (not shown) may be connected to one or more of the networks via twisted pair wires, coaxial cable, fiber optics, radio waves or other communication media. For example, the above connections can be made via the internet, bluetooth, WiFi, infrared, or any other known method of wireless transmission.

As shown in FIG. 1, devices 109A-F may include personal computers such as desktops, laptops, notebooks, mobile telephones or smartphones with applications and other functionality, a handheld device with Wi-Fi or other wireless connectivity (e.g., wireless enabled tablets, tablet computers, PDAs, and the like), displays with built-in or external memories and processors, or any other known computer, computing device, or handheld computer can also be connected to one or more of the networks described herein. It is also contemplated that other types of devices such as ATMs, kiosks, and other cash handling devices can be connected to one or more of the networks described herein. These devices can be enabled to communicate with wireless access points which in one example can be a series of cellular towers hosted by a service provider. Additionally, the wireless access points may be Wi-Fi (e.g., compatible with IEEE 802.11a/b/g/ and the like wireless communication standards) connections and the computing devices may obtain access to the Internet at these connections. Other known techniques may be used to allow devices to connect with a network.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, and devices 109A-F. Data server 103 provides overall access, control and administration of databases and control software for performing one or more illustrative aspects as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, devices 109A-F, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 or devices 109A-F a user may access web server 105 using an Internet browser, as is known in the art, or by executing a software application or app that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device as discussed herein. Data server 103, e.g., may include a processor 111 controlling overall operation of the data server 103. Data server 103 may further include RAM 113, ROM 115, network interface 117, input/output interfaces 119 (e.g., keyboard, mouse, display, printer, or the like.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects as described herein, and other application software 127 providing secondary, support, and/or other functionality which may or may not be used in conjunction with one or more aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, or the like).

Memory 121 may also store data used in performance of one or more aspects, including a first database 129 and a second database 131. In some embodiments, the first database may include the second database (e.g., as a separate table, report, or the like). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109A-F) as described herein may be spread across multiple data processing devices, for example, to distribute processing load across multiple computers, to segregate transactions based on geographic location, user access level, quality of service (QoS), or the like.

One or more aspects may be embodied in computer-usable or readable data and/or computer-executable instructions, such as in one or more program modules, executed by one or more computers or other devices as described herein. Generally, program modules include routines, programs, objects, components, data structures, or the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, or the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Detailed Description of Example Methods and Systems for Determining Economic Conditions:

Identifying structural attributes of the interconnected world economic network can provide clues about which characteristics of the system correlate with a certain degree under systemic distress leading to economic instability or economic stability. Based on the understanding derived from these studies, an early-warning system of economic-instability detection can be developed. This early-warning system can also be used in identifying and assessing any type of risk and opportunity that may arise. It can be used to mitigate risk or maximize gain.

Additionally, aggregate macroeconomic events at the largest scale are built up from individual microeconomic agents or activities at the most granular level. This may be reflected in utilizing network analysis to identify economic instability in financial systems.

The interlinked ebb-and-flows of financial markets, which show the dynamic structure of financial systems, affect systemic risk inherent in it. In an ideal situation where relevant data or their possible proxies are available, banking systems that are composed of a number of several connected banks can be constructed. Key parameters that define the structure of the system can be varied accordingly. These may include the level of capitalization, the degree to which banks are connected, the size of interbank exposures and the degree of concentration of the system. The result of the analysis of the influence of these parameters can be used to potentially modify the financial system and mitigate risks as needed.

Network analysis can be applied to analyze the increasingly complex and globally interlinked financial markets. A network is simply a collection of points (or nodes) joined by lines (or edges). Networks provide a simple but useful representation of real-world systems of interacting components. The internet, for instance, can be represented as a network of computers linked by data connections. Other examples include social networks of friendships between individuals and networks of business contacts. Networks are increasingly common in the study of biology, epidemiology, genetics, transportation, computer software, and so on. Networks can also be applied in exploring some possible applications of network analysis in financial systems.

It is possible to model the propagation of failures in a financial system as an epidemic spreading process in a network of interlinked stocks and flows of money. Starting, for example, from a small number of failed banks, the aim is to characterize the probability that failures propagate at the systemic level as a function of some relevant parameters, like the connectivity of the network and concentrations, correlations, sensitivities, leverage and liquidity of asset and liability classes at banks. One of the key problems in this context is to understand the role of the network structure in relation to economic instability.

System variables that show purely random fluctuations or perfectly periodic rhythms define idealized extremes. In fact, some parameters whose fluctuations may seem random when viewed in isolation can be highly predictable in the temporal context of variation in other parameters; hence, variations in one system variable can convey substantial information about variation in another. An organism (or a company) that is capable of learning these correlations can exploit them in order to anticipate vital changes in the system. Stressful stimuli may be important not because of their immediate and direct consequences, but in the information they convey about the overall state of the system and its likely trajectory. Therefore, survival may depend much on the art of correctly identifying the system's trajectory coupled with the ability to adapt to changes in the system.

Robustness of the economic system and the ability to withstand economic shock can be promoted by modularity—the degree to which nodes of a system can be decoupled into relatively discrete components. For example, a basic principle in management of forest fires and epidemics is that if there is strong interconnection among the system elements, a perturbation will encounter nothing to stop it from spreading. But if the system is appropriately compartmentalized through, say, introduction of fire breaks and quarantining, disturbance or risk is more easily countered.

The introduction of modularity, however, will often involve a trade-off between local and systemic risk. Moreover, the wrong compartmentalization in financial markets could preclude stabilizing feedbacks, such as mechanisms for maintaining liquidity of cash flows through the financial system, where fragmentation leading to illiquidity could actually increase systemic risk. Redundancy of components and pathways, in which one can substitute for another, is also a key element in the robustness of complex systems, and effective redundancy is not independent of modularity.

There are only coarse or indirect options for control of the financial system. The tools available to policymakers are designed to modify individual incentives and individual behaviors in ways that will support the collective good. Such top-down efforts to influence individual behaviors can often be effective, but in certain instances it may be a challenge to control the spread of synchronized behaviors or to manage financial crises in an optimal way.

Although the study of payment flows is of interest to central bankers, in certain instances it may miss aspects of systemic risk, namely public perception and asset valuation associated with the interaction of counterparties (the mutual financial obligations and exposures that link companies). Such company networks are helpful in studying the effects of inflated asset-pricing, credit crises and the poorly understood but potentially worrying effects of the current widespread use of derivatives by investment banks to manage risk in real-time. Whatever the case, it seems that networks that define financial reality and global markets may be of use to understanding the market robustness and ability to thrive as well as its potential vulnerability to collapse.

Complex dynamical systems, financial system included, may have transitional points where a sudden shift to a totally different dynamical regime may take place. Though predicting such tipping points is very difficult, the generic early-warning signs that may indicate if a critical threshold is approaching may exist in reality.

Many complex dynamical systems have critical thresholds called tipping points where the system abruptly shifts from one state to another. In global finance, there is big concern about a sudden systemic decline in market prices that can threaten the global financial system which, in turn, may lead to global economic downturns. It is traditionally difficult to predict such critical transitions since the state of the system may show little change before the tipping point is reached. However, it seems that certain generic signs may take place in a wide class of systems as they approach a critical point. The dynamics of systems near a critical point have generic properties, regardless of differences in the details of each system. Critical thresholds for such transitions correspond to bifurcations. In the so-called catastrophic bifurcation, once a threshold is exceeded, a positive feedback mechanism pushes the system through a phase of directional change towards a contrasting state. The transitions from a stable equilibrium to a cyclic or chaotic state can also happen in some other types of bifurcations.

Three possible early-warnings in the dynamics of a system approaching a tipping point may be used in emerging risk detection: slower recovery from perturbations, increased autocorrelation and increased variance.

Because slowing down causes the intrinsic rates of change in the system to decrease, the state of the system at any given moment becomes more and more like its past state. The resulting increase in "memory" of the system can be measured in various ways from the frequency spectrum of the system. One approach is to look at the lagging autocorrelation, which can directly be interpreted as slowness of recovery in such natural perturbation regimes. Analysis in the models exposed to stochastic forcing confirms that if the system is driven gradually closer to a catastrophic state, there is a marked increase in autocorrelation that builds up long before the critical transition takes place. This is true even for realistic models. Increased variance in the pattern of fluctuations can be seen as another possible consequence of critical slowing as a critical transition is approached. As the Eigenvalue approaches zero, the impacts of shocks do not decay, and their accumulating effect increases the variance of the state variable. In principle, critical slowing could reduce the ability of the system to track the fluctuations, and thereby produce an opposite effect on variance. However, analysis shows that an increase in the variance usually arises and may be detected before a critical transition takes place. This detection technique can be implemented both temporally and spatially.

Methods for identifying or assessing any type of risk and/or opportunity that may arise can include either, alone or in combination, band pass filtering, principal component analysis, random matrix theory analysis, synchronization analysis, and early-warning detection. Each technique can also be viewed as a process that takes a set of inputs and converts it to a set of outputs. These outputs can be used as inputs for a subsequent process or the outputs may be directly actionable for formulating certain economic predictions to make investment decisions and the like.

Figure 2:
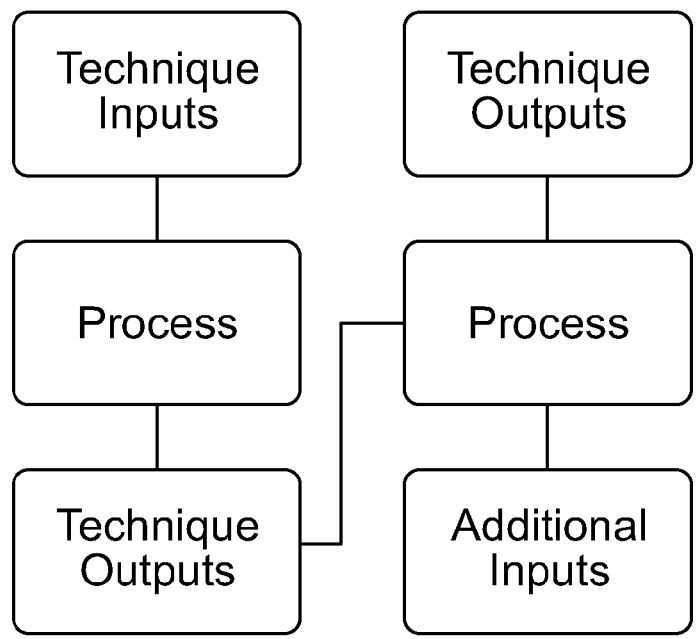
FIG. 2 illustrates a flow diagram for an exemplary process disclosed herein.

A general diagram of this approach is illustrated in FIG. 2. FIG. 2 shows a diagram of an analysis where the system analyzes a series of inputs, which can be any financial data, for example, consumer leverages, commercial leverages, and unemployment rates and the like. These inputs are processed using any of the techniques described herein to produce an output or economic indicator. These economic indicators can be used to develop strategies for making investments, mitigating risks, creating new products, and the like. The various outputs from the techniques described herein can be used to arrive at a decision, e.g. to sell, invest, mitigate risk, and the like.

Figure 3:
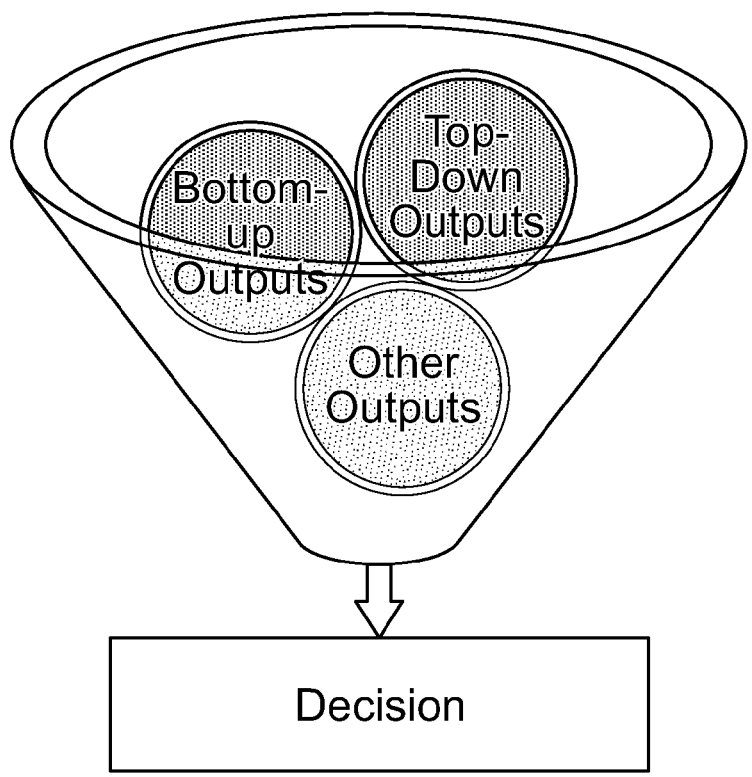
FIG. 3 illustrates a flow diagram for another exemplary process disclosed herein.

As schematically illustrated in FIG. 3, either approach works by converting various sets of inputs into outputs that may be used to guide financial decisions. Based on the understanding derived from these studies, an early-warning system of assessing and dealing with various risks (including, but not limited to, economic instability) is also developed. In one example, as shown in FIG. 3, various outputs can be reviewed to arrive at the financial decision, for example, outputs from a top-down review of financial data, bottom up review of financial data, and other outputs.

Certain techniques can be used in a top-down approach that reviews inputs from the macro level down to the micro level or a bottom up approach that works in an opposite fashion. Considerable noises make modeling time series data in its most granular level (such as modeling account level in portfolio analysis or relationship networks in finance) more difficult. To deal with these difficulties, a top-down approach can be conducted. This approach is intended to firstly understand the behavior at the most aggregate level (top), where the relevant national level macroeconomic time series are used. Then the analysis is gradually performed towards the more granular level (down), where time series data being used includes, but not limited to, relevant geographic or state level, and segmental level. As information is viewed down from the most aggregate level to the more granular level, any useful derivable information is taken into consideration, such as how shocks, policies, and strategies may contribute to the behaviors being observed.

Figure 4:
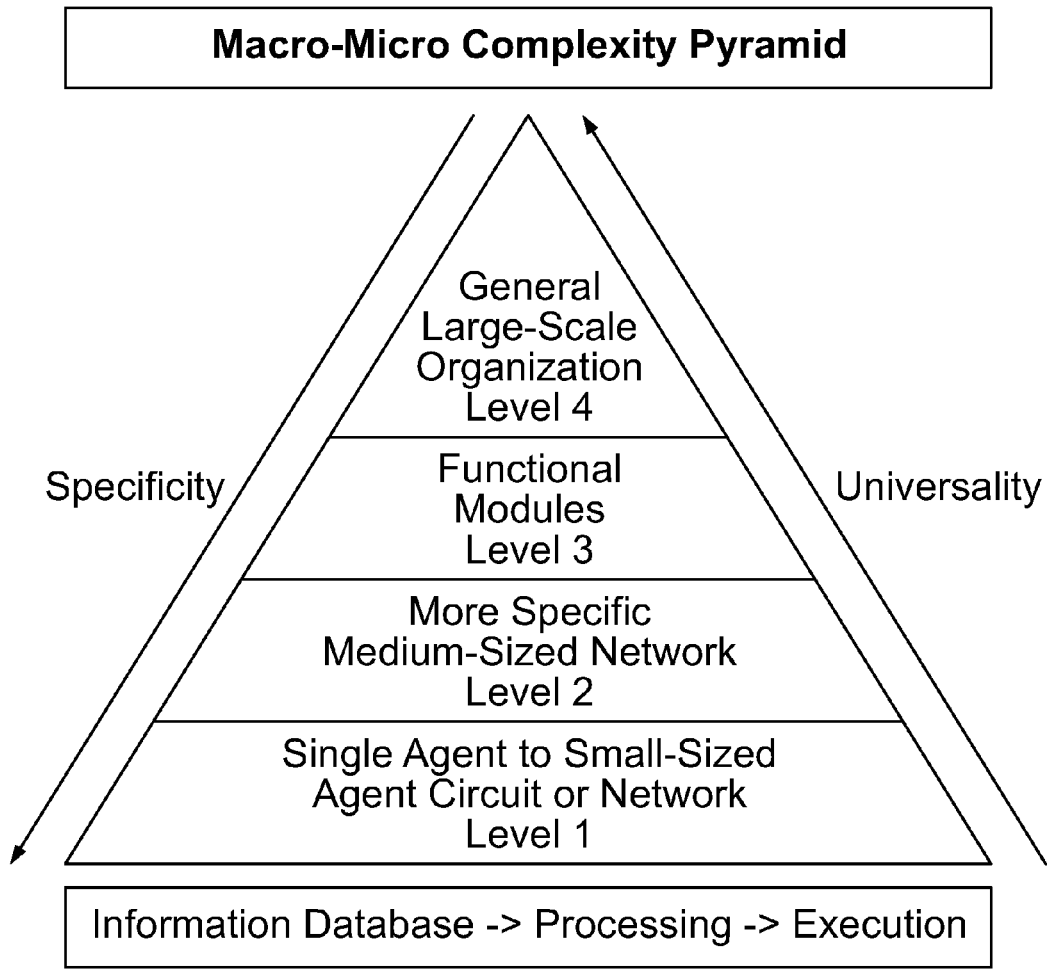
FIG. 4 illustrates an exemplary diagram relating to one or more aspects of the disclosure herein.

A complexity pyramid composed of various levels of granularity is shown in FIG. 4. The bottom of the pyramid shows the representation of specific individual to small-sized economic agent network or circuit (level 1). Insights into the logic of most granular organization can be achieved when the economic system is viewed as a complex network in which the components are connected by some kind of relationship links. At the lowest level, these components form medium-sized networks (level 2), which in turn are the building blocks of functional modules (level 3). These modules are nested, generating scale-free or other kinds of network architectures (level 4). Although individual components are unique to a given microeconomic system, the topological properties of the networks share similarities with universal organizing principles.

Band Pass Filtering Technique:

A band pass filtering technique can be applied to economic inputs in order to extract a signal from noise by removing certain data or frequencies that are too rapid or too slow to be "true," similar to electronic signal processing. Certain filters can be applied to economic time series data to identify the particular phase in an economic cycle. The analysis may help guide certain decisions such as whether to loosen or tighten credit availability.

Figure 5:
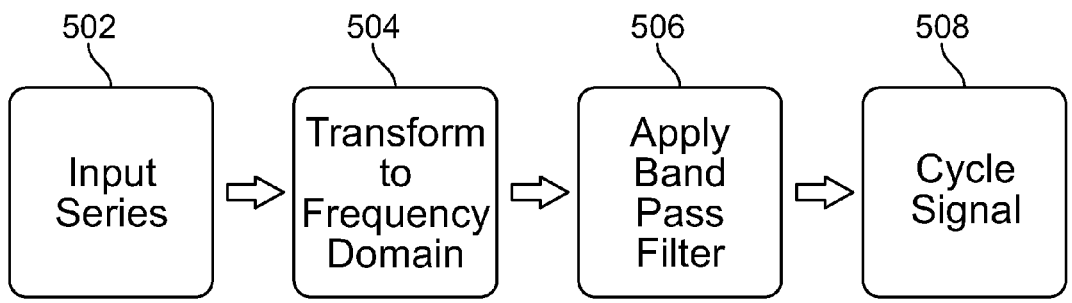
FIG. 5 illustrates a flow diagram for another exemplary process disclosed herein.
Figure 6A:
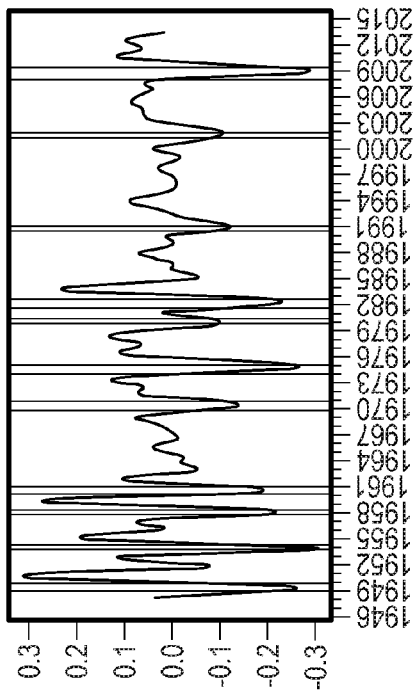
FIGS. 6A-6C illustrate an exemplary data filtering technique disclosed herein.
Figure 6C:
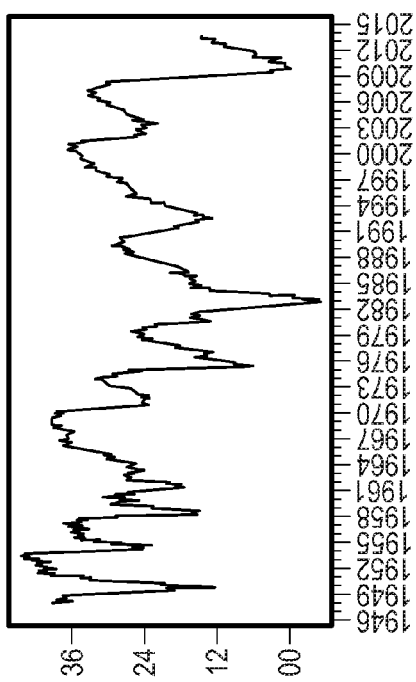
Figure 6B:
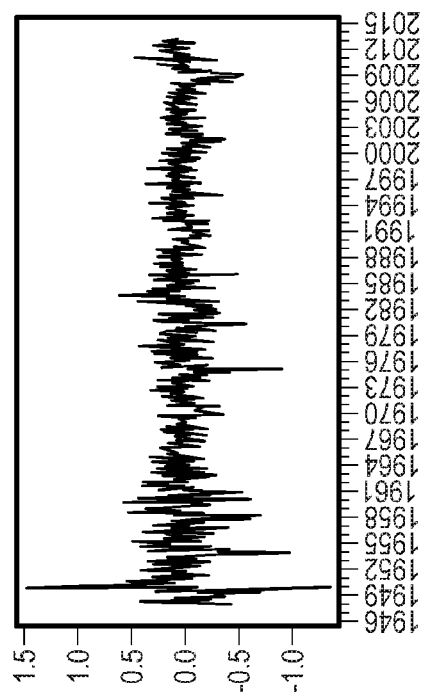

FIG. 5 illustrates a process flow of an application of a band pass filter to a series of inputs 502. These inputs can be consumer and commercial leverages and unemployment rates, and can be either macroeconomic or microeconomic data. First the series of inputs is collected and transformed to a proper frequency domain at 504. The band pass filter can then be applied at step 506 to generate a meaningful cycle signal in step 508. FIGS. 6A-6C show a raw time series transformed into a frequency domain with the signal extracted. In particular, a band pass filter is applied to the data depicted in FIG. 6A and FIG. 6B to produce the filtered data shown in FIG. 6C. The data shown in FIG. 6 can then be evaluated to determine a synchronization point or region of the data that can be used to make economic predictions based on the synchronization events.

Figure 7:
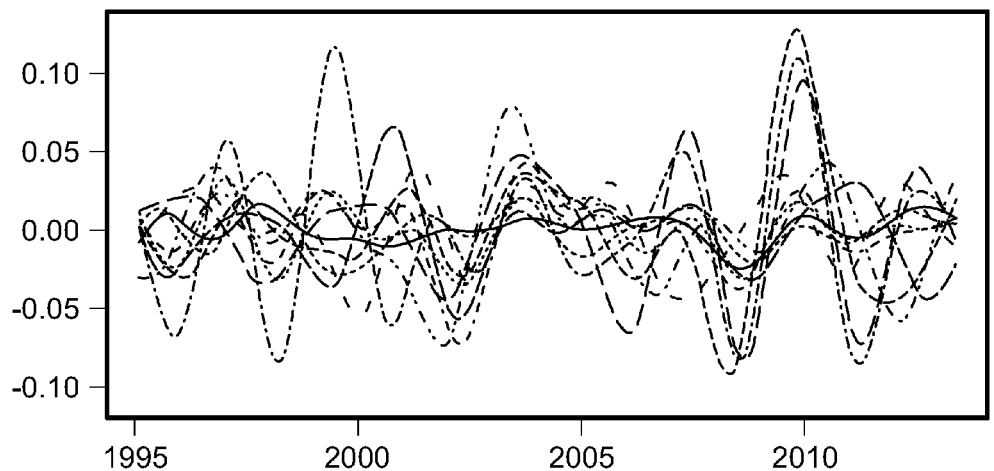
FIG. 7 illustrates a graph relating to an exemplary process of FIG. 5.

As shown in FIG. 7, the band pass filtering technique can be applied to multiple economic indicators simultaneously. If the correct band pass filter is implemented, when each of the signals synchronize, it can indicate a transition from an equilibrium state to either a positive state (economic boom) or a negative state (recession). FIG. 7 illustrates a synchronization event in the period around 2010, which shows a positive state of the economy.

During a synchronization event, the risk or reward can increase and the benefits of diversification are diminished. The synchronization level can be measured based on the collective correlation of a group of time series. This correlation could also be applied to additional measures other than the simple filtered series.

Figure 8A:
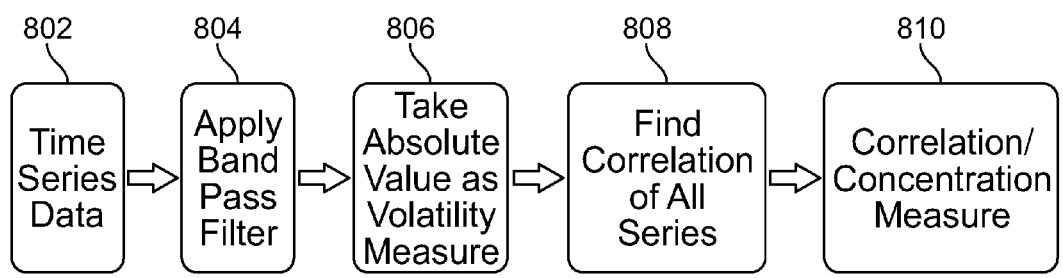
FIG. 8A illustrates a flow diagram for another exemplary filtering process disclosed herein.
Figure 8B:
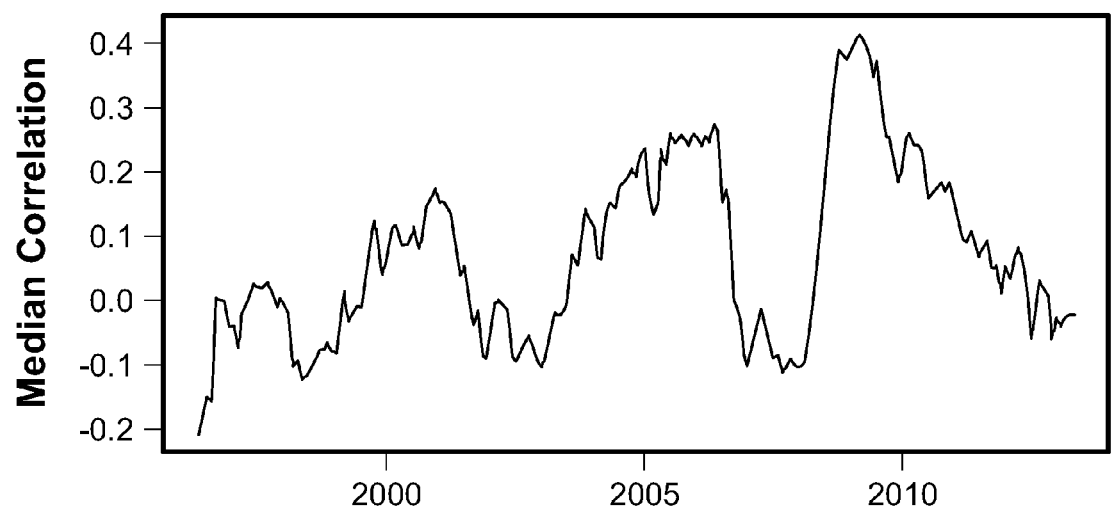
FIG. 8B illustrates an exemplary graph relating to the exemplary process of FIG. 8A.

For example, the absolute value of the volatility of the changes can be determined. This process is depicted generally in FIG. 8A. As shown in FIG. 8A, time series data 802 can be processed by a band pass filter, at step 804, can be applied to the economic data and the absolute value of the data can be taken at step 806 to locate correlations across all of the series of data at step 808. The correlation and concentration measures can then be reviewed at step 810 to predict certain economic trends, for example, the level of leverage of consumer and commercial sectors. An example output of the absolute values is illustrated in FIG. 8B. As shown in 8B, in this example, a higher correlation value may be associated with a weaker state in the economy, whereas a lower correlation value may indicate a stronger performing economy. However, higher correlation value may reflect a better state of the economy, if the level of saving is considered. Therefore, higher correlation may be associated with stronger or weaker performing economy based on the data being observed.

Principal Component Analysis:

Once it is determined whether or not the economy is moving in a positive or negative direction, the next step is to determine if there are any particular elements driving the change. On a macro level this could be certain industries or asset classes. On a micro level it could be a certain company's economic performance or group of companies' economic performances. Principal component analysis or PCA can be used to identify the particular "drivers" of the trends. This can indicate which subcomponents are accounting for the change in state.

Figure 9:
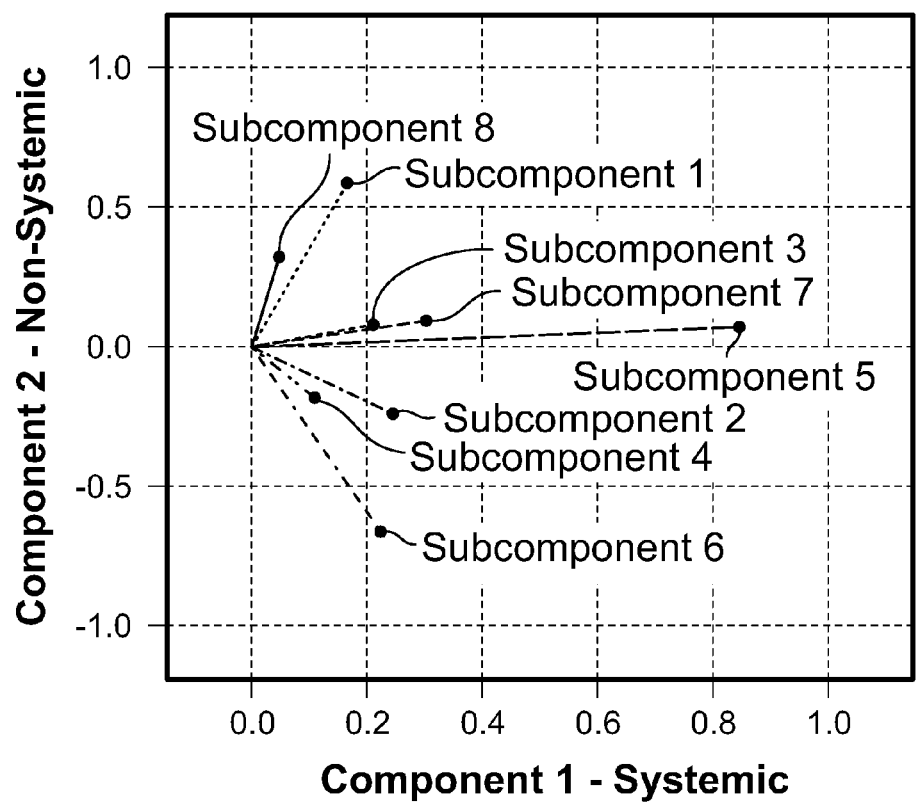
FIG. 9 illustrates another exemplary graph relating to principle component analysis.

As shown in FIG. 9, largest ratios of two predetermined components may illustrate a particular economic driver. As shown in FIG. 9, two subcomponents can be compared by calculating the ratio between their first and second principal components. In one example, the first principal component can represent systemic risk, for example, a recession or other event external to the data being studied. The second principal component can be non-systemic (idiosyncratic) risk, which can be specific to a particular subcomponent. In FIG. 9, Subcomponent 5 may be the market driver because the ratio of the first principal component to the second principal component is the largest.

In another example, certain economic instability markers can be identified using spectral analysis and principal component analysis. In this case, because the typical size of a U.S. business cycle is approximately 70 months, this data can be analyzed as part of a study. Spectral analysis of correlation matrices can be conducted to determine economic instability markers.

In certain examples, the analysis can be applied to uncollectables, where it has been declared that certain amounts of money are unlikely to be collected, by sectors as shown in FIGS. 10-13. This analysis can also be applied to the Home Price Index ("HPI") by states as shown in FIGS. 14-17. By first scaling the time series, a correlation matrix is generated within a moving time window with the length of roughly one business cycle (~70 months). In each of the moving windows, principal component analysis (PCA) can be conducted. The first principal component (PC1) is usually called "systemic risk," which basically represents the collective response of all component time series under consideration to exogenous stimuli. The behavior of the PC1 eigenvector contents (or factor loadings) over time can be investigated. A quality called dispersion level is provided to give a measure of disparity or diversity of the time series being analyzed.

Figure 10:
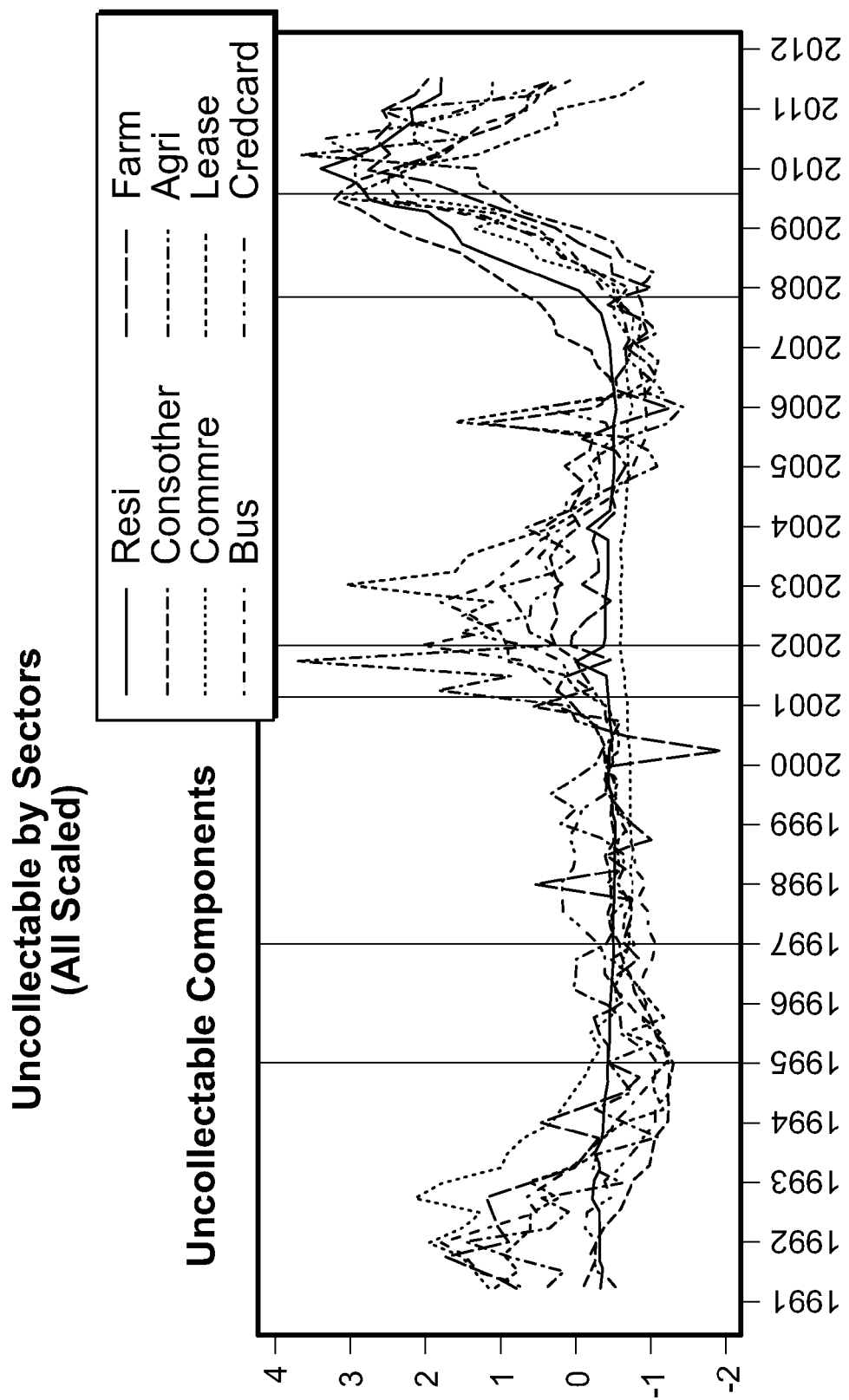
FIG. 10 illustrates another exemplary graph relating to principle component analysis.
Figure 11:
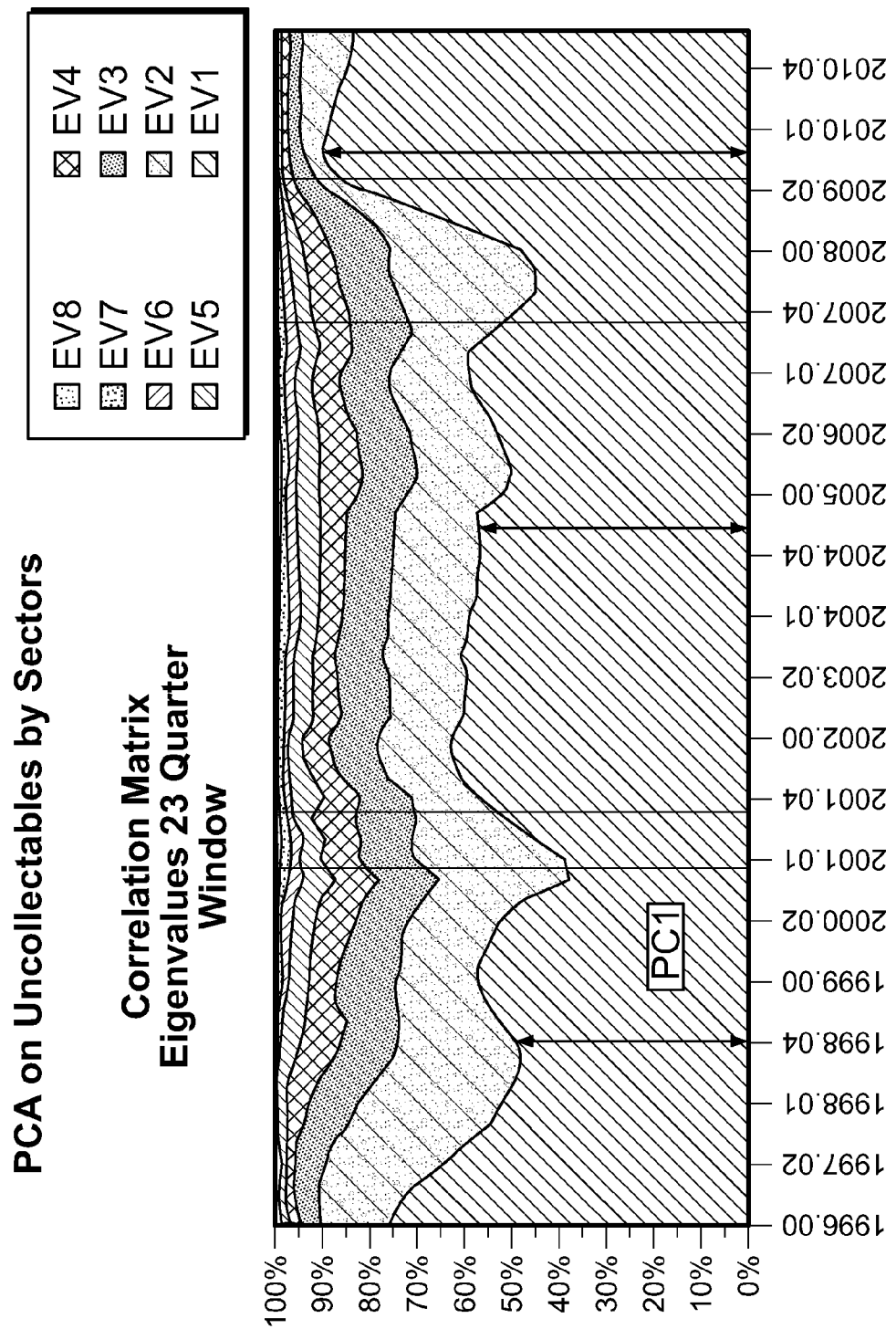
FIG. 11 illustrates another exemplary graph relating to principle component analysis.
Figure 12:
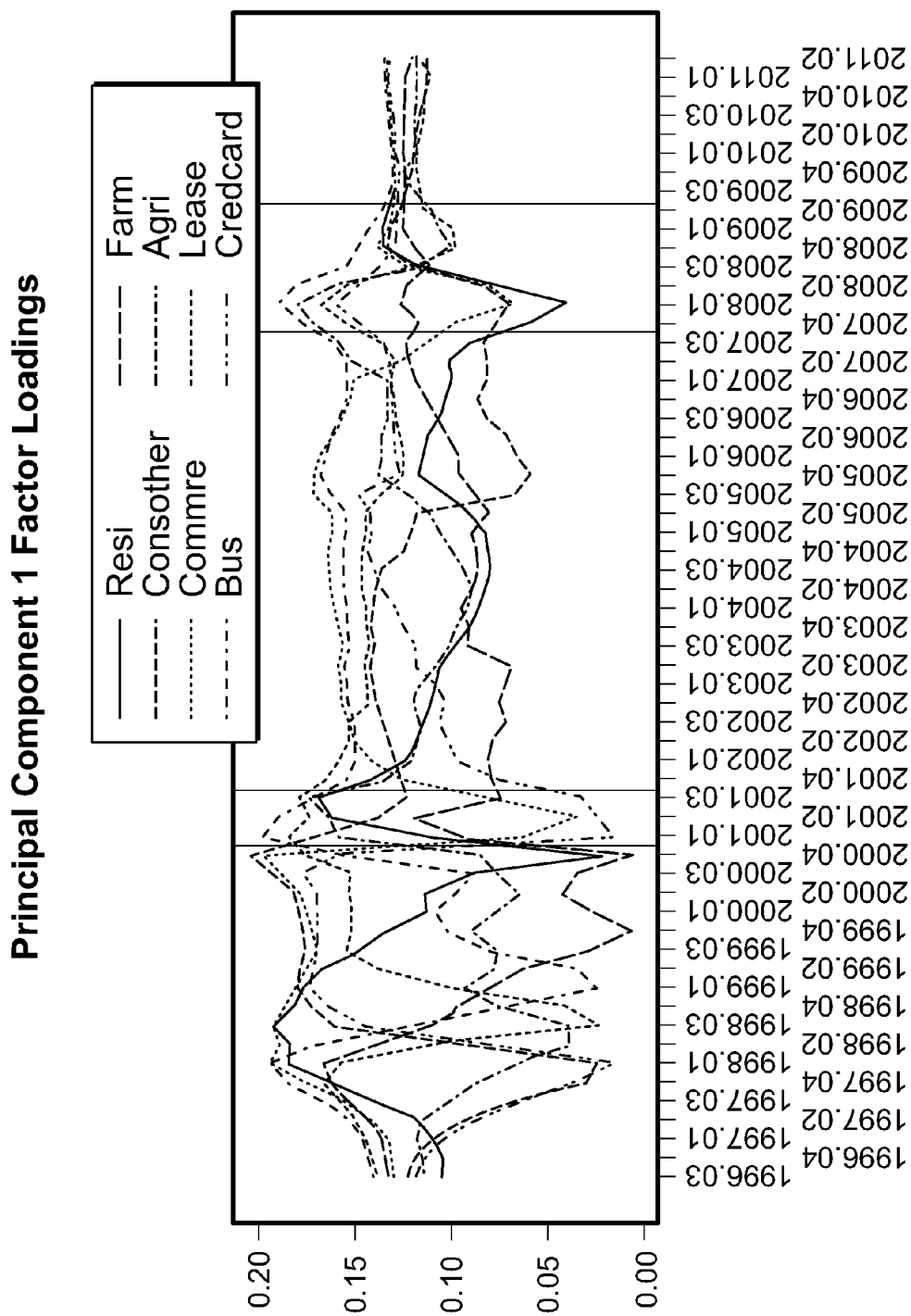
FIG. 12 illustrates another exemplary graph relating to principle component analysis.
Figure 13:
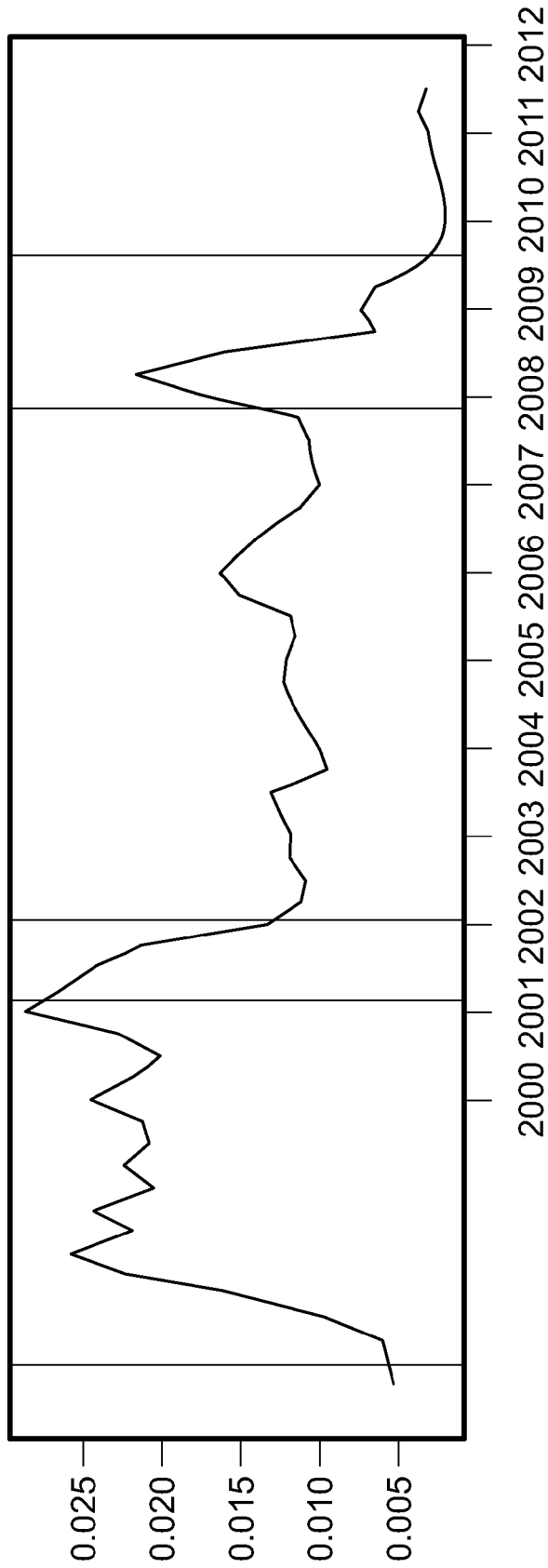
FIG. 13 illustrates another exemplary graph relating to principle component analysis.
Figure 14:
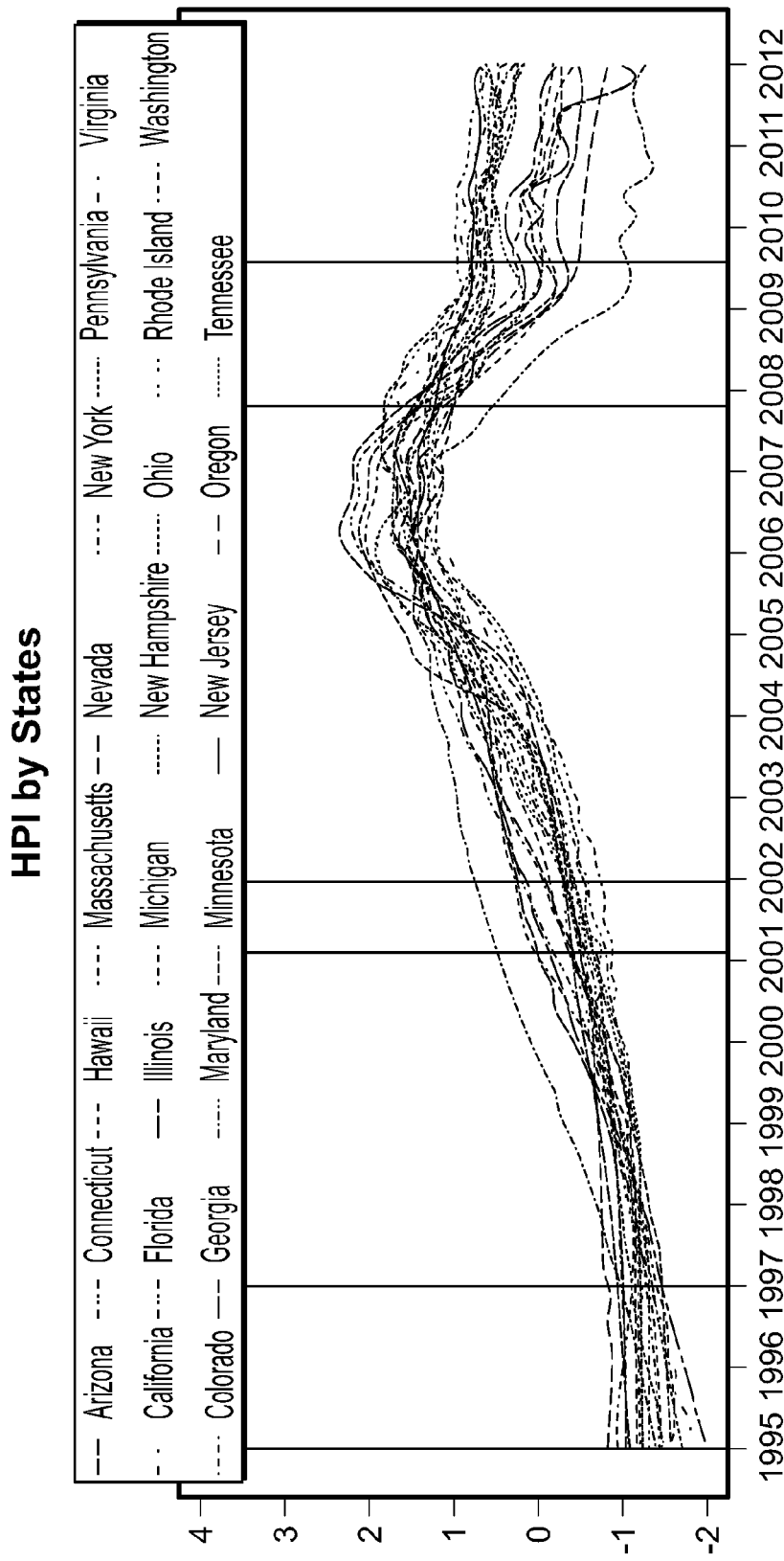
FIG. 14 illustrates another exemplary graph relating to principle component analysis.
Figure 15:
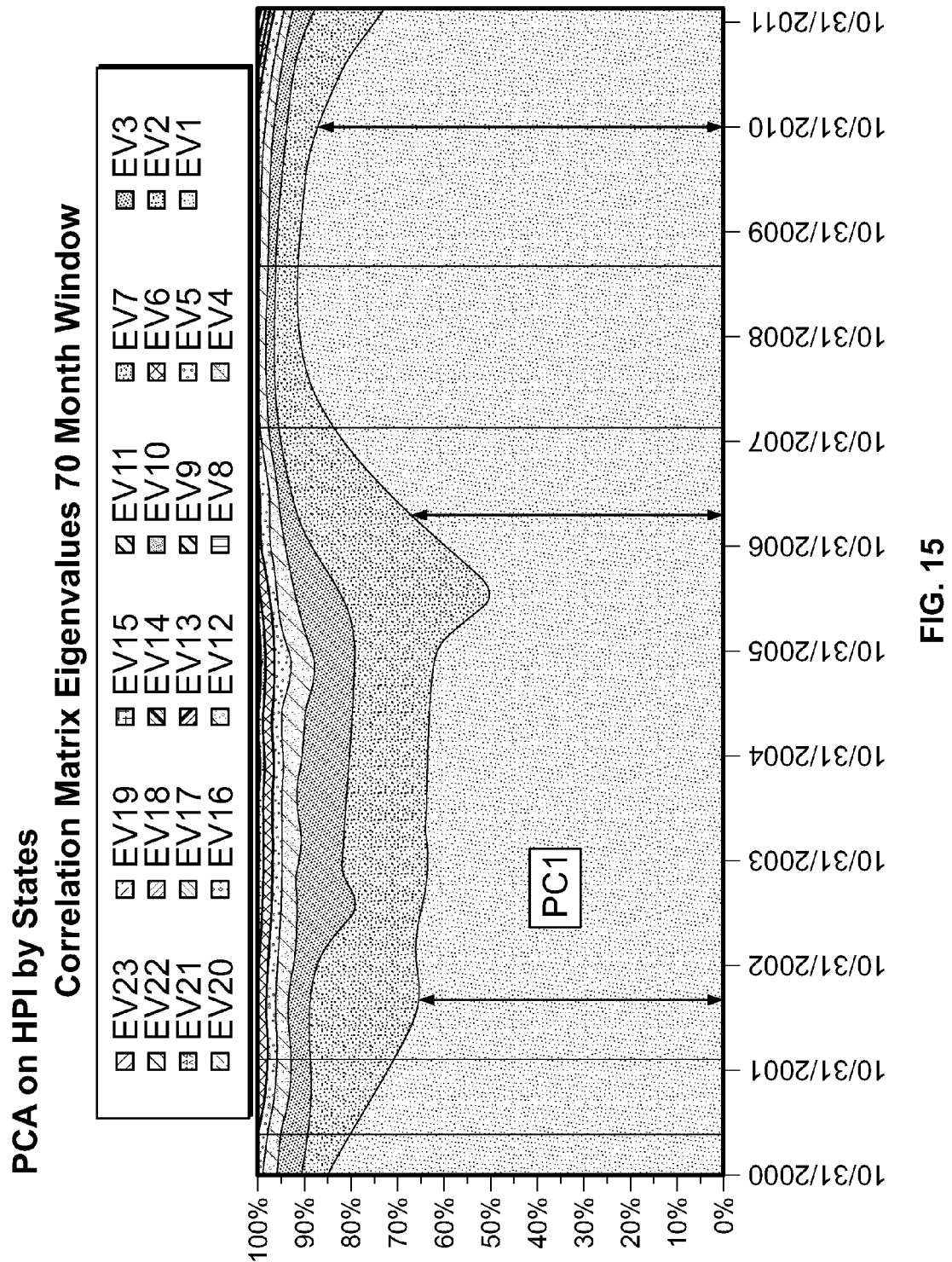
FIG. 15 illustrates another exemplary graph relating to principle component analysis.
Figure 16:
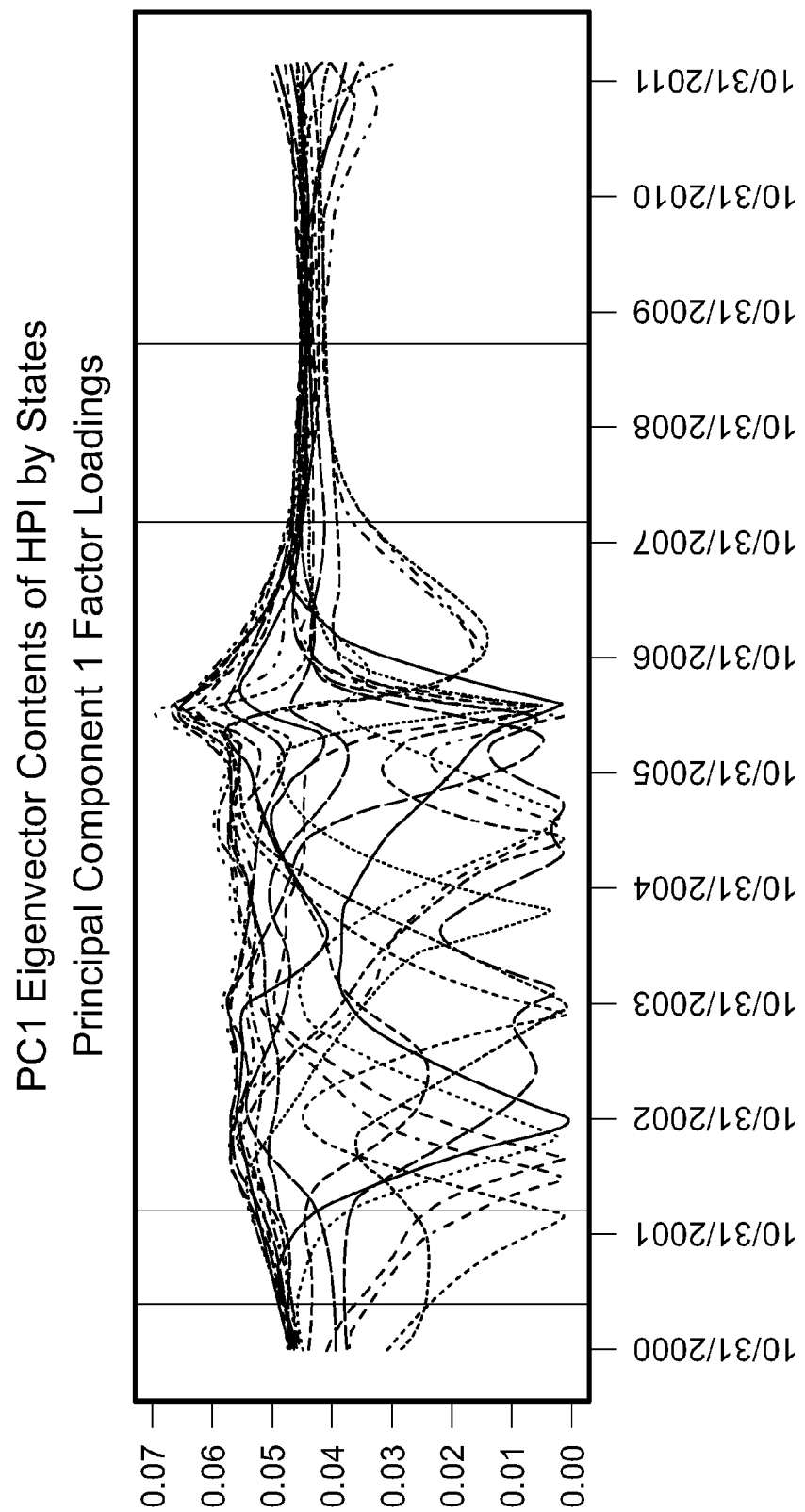
FIG. 16 illustrates another exemplary graph relating to principle component analysis.
Figure 17:
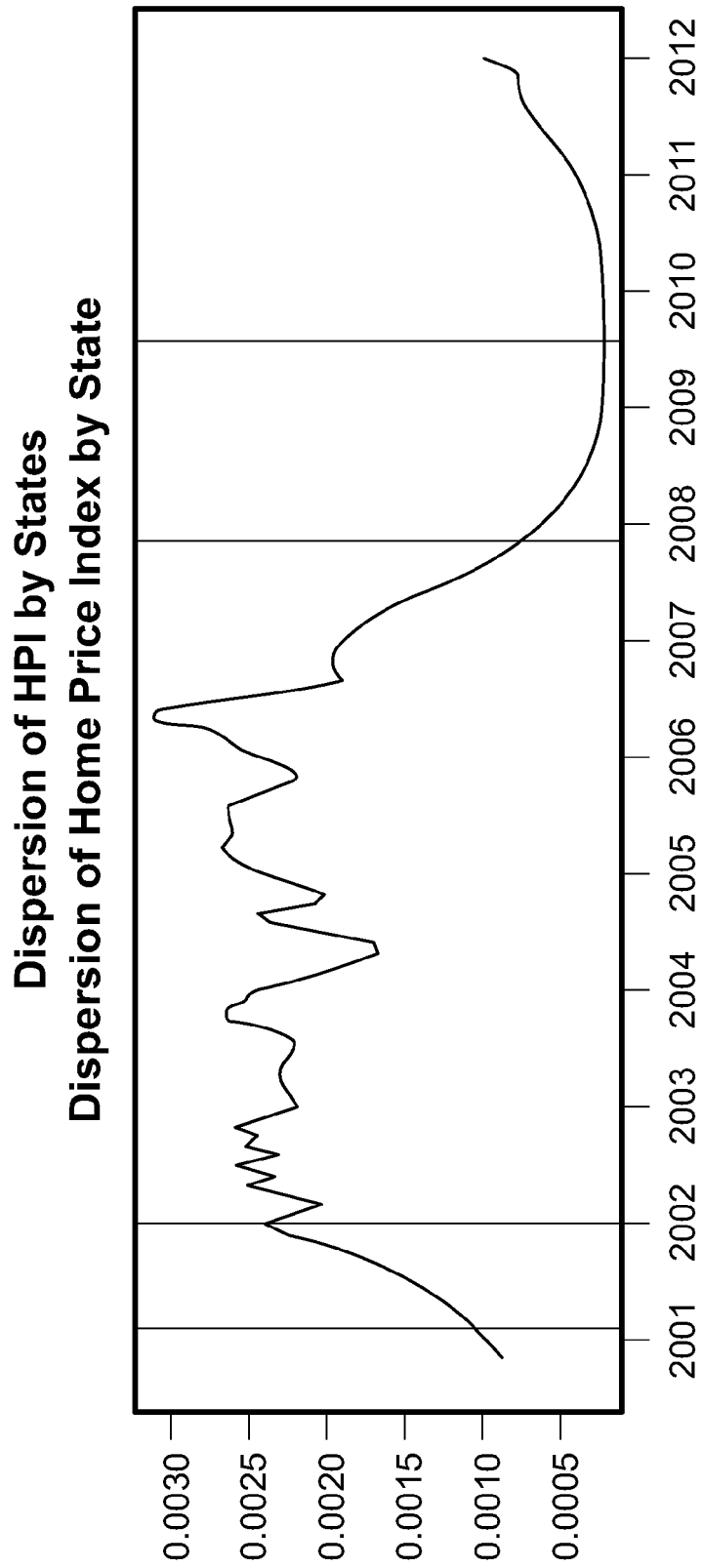
FIG. 17 illustrates another exemplary graph relating to principle component analysis.

For each analysis, a set of figures are shown: the time series PCA (FIGS. 10 and 14), PC1 Eigenvector contents (FIGS. 12 and 16), and PC1 dispersions (FIGS. 13 and 17). The vertical black ribbons show recessions, and the vertical green ribbons show the 1995/1996 period where the bad consumer cycle took place without being accompanied by a recession. As can be seen in FIGS. 10 and 14, the time series data can be scaled. The eigenvalues obtained using PCA are shown in FIGS. 11 and 15 and can be normalized such that their total summation is equal to 100%. FIGS. 12 and 16 show the contents of the first principal component (or, principal component number 1).

Exemplary charts of the dispersion level over time are shown in FIGS. 13 and 17. The dispersion level may be taken as representing the level of economic instability risk of the system under consideration. From the dynamical behavior of the dispersion level, an early-warning tool of economic instability risk may be developed. In particular, the higher the value of the dispersion level the less contagious the system is. As shown in FIGS. 13 and 17 recessions promoted the decrease of the dispersion level. This can be interpreted as the phenomenon of the economic instability of systemic risk.

Figure 18:
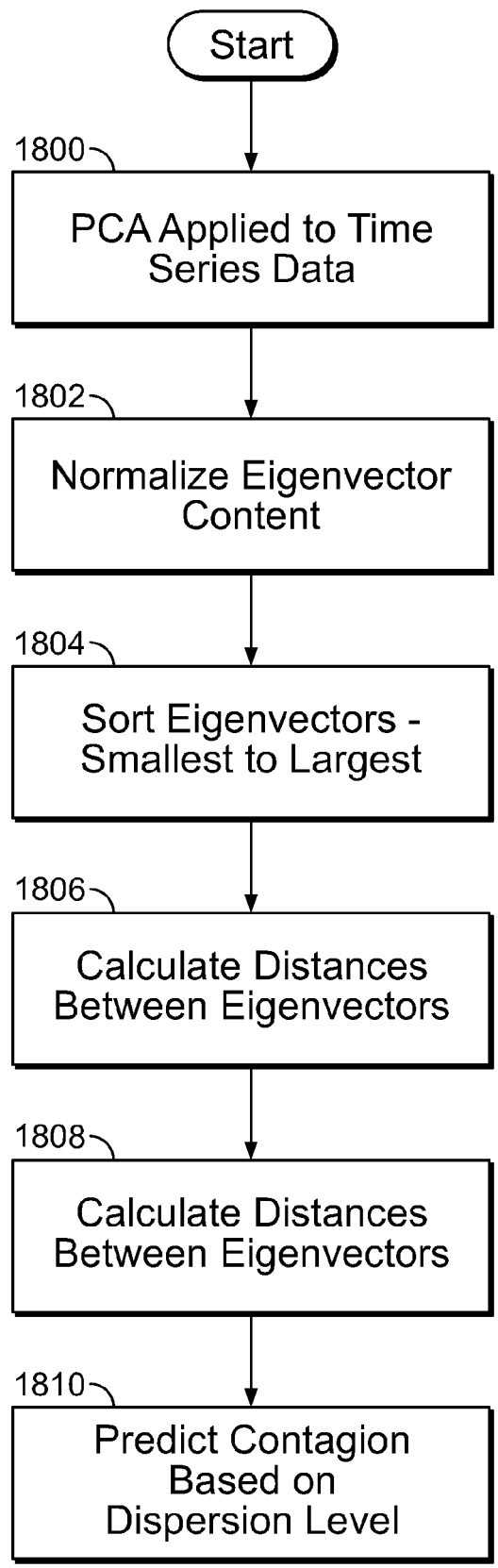
FIG. 18 illustrates an exemplary flow chart pertaining to principle component analysis.

FIG. 18 shows an exemplary flow chart for implementing an algorithm that may detect economic instability risk based on eigenvector dispersion "level." In step 1800, principal component analysis is applied to several time series under consideration by using an appropriate time window. In step 1802, the eigenvector content of principal component number 1 is normalized for each time window. The eigenvectors are then sorted, e.g., from smallest to largest, say from 1 to 8 for each time window in step 1804. In step 1806, the distances between the eigenvectors are then calculated e.g. 1 to 2, 2 to 3, 3 to 4, and so on, specific for each time window (note that the order of eigenvectors may change for different time window). In step 1808, for each time window, the mean (or, the variance) of the remaining distances is calculated, where this entity represents the dispersion "level" at specific time window (the higher the value, the higher the dispersion level). In step 1810, economic instability is then predicted based on the dispersion level.

Figure 19:
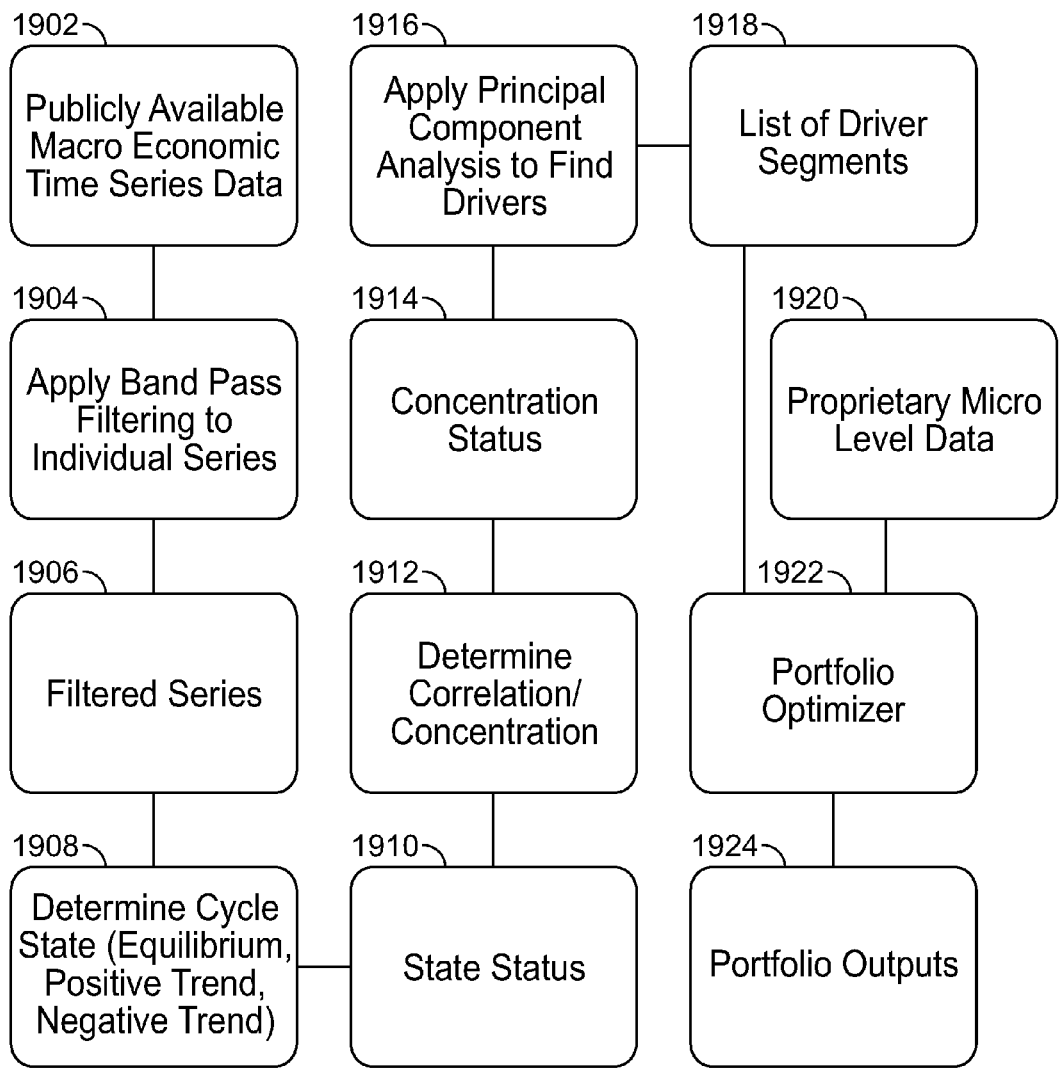
FIG. 19 illustrates a flow chart pertaining to an exemplary data filtering technique and principle component analysis.

Band Pass Filtering and Principal Component Analysis:

Band pass filtering and principal component analysis can be used in conjunction with each other to make economic predictions. FIG. 19 shows an exemplary flow chart of an example implementation of band pass filtering and principal component analysis being used together to determine economic instability risk. In this example, publicly available macroeconomic time series data 1902 can be applied to a band pass filter 1904 to obtain a filtered data series 1906. The filtered data series can then be analyzed to determine a particular economic cycle state, e.g. positive or negative trend at step 1908. Once a state of the market is detected (steps 1910-1914), principle component analysis can be applied to determine the particular driver of the state of the market at step 1916. Using the drivers obtained in the analysis (as well as the correlation/concentration) at step 1918, a portfolio optimizer 1922 can, for example, be implemented for making investments, mitigating risks, creating new products, and the like at step 1924. Additionally, proprietary micro level data can be analyzed at step 1920.

Random Matrix Theory:

Another approach to spectral analysis of economic data is using Random Matrix Theory (RMT) to analyze economic data and predict trends in the market. Random Matrix Theory (RMT) was initially proposed by Wigner and Dyson in 1960s for studying the spectrum of complex nuclei. RMT can be used to identify and model phase transitions and dynamics in physical systems and can also be used to create financial and economical models.

For example, RMT can be used to estimate the number of dimensions (components) of a data correlation matrix by comparing the statistics of the observed eigenvalues, i.e. the eigenvalues of the data correlation matrix to those of a random matrix counterpart. The density distribution of eigenvalues for such random matrices is known, so that the comparison between the observed eigenvalues and the analytical "null" distribution of RMT can be used to obtain an estimate of the number of components. Specifically, the number of observed eigenvalues larger than the analytical maximum provides an estimate of the number of significant eigenvalue components. Hence, the observed eigenvalues of the data correlation matrix larger than the theoretical maximum provides a reasonable approximation to the number of principal components to retain, i.e., the number of eigenvalue components obtained using PCA that really matter in the calculation. RMT is analytical in nature, and the computational cost of RMT may be small in certain instances.

Taking a matrix whose elements are the correlation coefficient values of multiple time series of interest, the standard Pearson correlation coefficients can be defined as:

$$c(g_i, g_j) = \frac{1}{N} \sum_{k=1,N} \left(\frac{g_{ik} - M_{gi}}{\sigma_{gi}}\right)\left(\frac{g_{jk} - M_{gj}}{\sigma_{gj}}\right)$$

where $M_{gi}$ and $M_{gj}$ are the average of $g_i$ and $g_j$ respectively, and $\sigma_{gi}$ and $\sigma_{gj}$ are their corresponding standard deviations, and N is the total number of observations.

The statistical properties of the eigenvalues of random matrices are known in the limit of very large dimensions. Particularly, in the limit N→∞, L→∞, such that Q≡L/N is fixed, the distribution $P_{RM}(\lambda)$ of eigenvalues $\lambda$ of the random correlation matrix is given by $$P_{RM}(\lambda) = \frac{Q}{2\pi} + \frac{\sqrt{(\lambda_+ - \lambda)(\lambda - \lambda_-)}}{\lambda}$$

for $\lambda$ within the bounds $\lambda_- \leq \lambda_i \leq \lambda_+$, where $\lambda_-$ and $\lambda_+$, are the minimum and maximum eigenvalues of the random correlation matrix, respectively, given by $$\lambda_\pm = 1 + \frac{1}{Q} \pm 2\sqrt{\frac{1}{Q}}.$$

RMT focuses on the study of statistical properties of eigenvalue spacing between consecutive eigenvalues. From RMT, distribution of eigenvalue spacing of real and symmetrical random matrices follows two universal laws depending on the correlativity of eigenvalues. Strong correlation of eigenvalues leads to statistics described by the Gaussian Orthogonal Ensemble (GOE). On the other hand, eigenvalue spacing distribution follows Poisson statistics if there is no correlation between eigenvalues. To express it differently, eigenvalue spacing distribution of a random matrix with non-zero values only for its diagonal (or block-diagonal parts) follow Poisson statistics, because eigenvalues of this system are not correlated due to the absence of interaction between diagonal (or block-diagonal) parts.

To validate RMT estimate and to ensure that the theoretical null distribution does not deviate significantly from that of empirical null (deviations might be expected because of the finite size of the matrix and because the data may not be gaussian), the data matrix may be scrambled (for each row, a distinct permutation of the columns is performed) and verified that RMT predicted zero significant components.

The nearest neighbor spacing distribution (NNSD) of eigenvalues, P(s), of RMT can also be used in some calculations, as discussed below. This is defined as the probability density of the so-called unfolded eigenvalue spacing $s=e_{i+1}-e_i$ where $e_i=N_{av}(E_i)$, and $E_i(i=1, \ldots, N)$ is the eigenvalues of the matrix (N being the order of the matrix), and $N_{av}$ is the smoothed integrated density of eigenvalues obtained by fitting the original integrated density to a cubic spline or by local density average. From RMT, P(s) of the GOE statistics closely follows Wigner-Dyson distribution $P_{GOE}(s) \approx \frac{1}{2} \pi s \exp(-\pi s^2/4)$. In the case of Poisson statistics, P(s) is given by Poisson distribution $P_{Poisson}(s)=\exp(-s)$. The difference between Wigner-Dyson and Poisson distributions manifests in the regime of small s, where $P_{GOE}(s \rightarrow 0)=0$ and $P_{Poisson}(s \rightarrow 0)=1$.

Note that RMT technique can be applied to both higher and lower level views. In higher level, it may be used to extract the important companies/groups which are most responsible for the economic dynamics being observed. At a lower level, it may be used to extract the underlying skeleton of some complex networks.

To test the "modularity" of the clustering, lower values of correlation coefficients can be removed as given by the equation $$c(g_i, g_j) = \frac{1}{N} \sum_{k=1,N} \left( \frac{g_{ik} - M_{gi}}{\sigma_{gi}} \right) \left( \frac{g_{jk} - M_{gj}}{\sigma_{gj}} \right)$$

from the data of interest, starting from the lowest. Using chi-square test, a sharp transition from a Wigner-Dyson distribution to a Poisson distribution would be observed at a certain defined "cutoff" level q. Once this takes place, the desired clustering can be obtained. It should be noted that this approach is different from existing clustering methods, where here cutoffs or thresholds used for clustering are determined self-consistently by the transition given by RMT. For segmentation, the time series that are used could be FICO scores, geographical performance, loss, revenue, and so on.

Figure 20A:
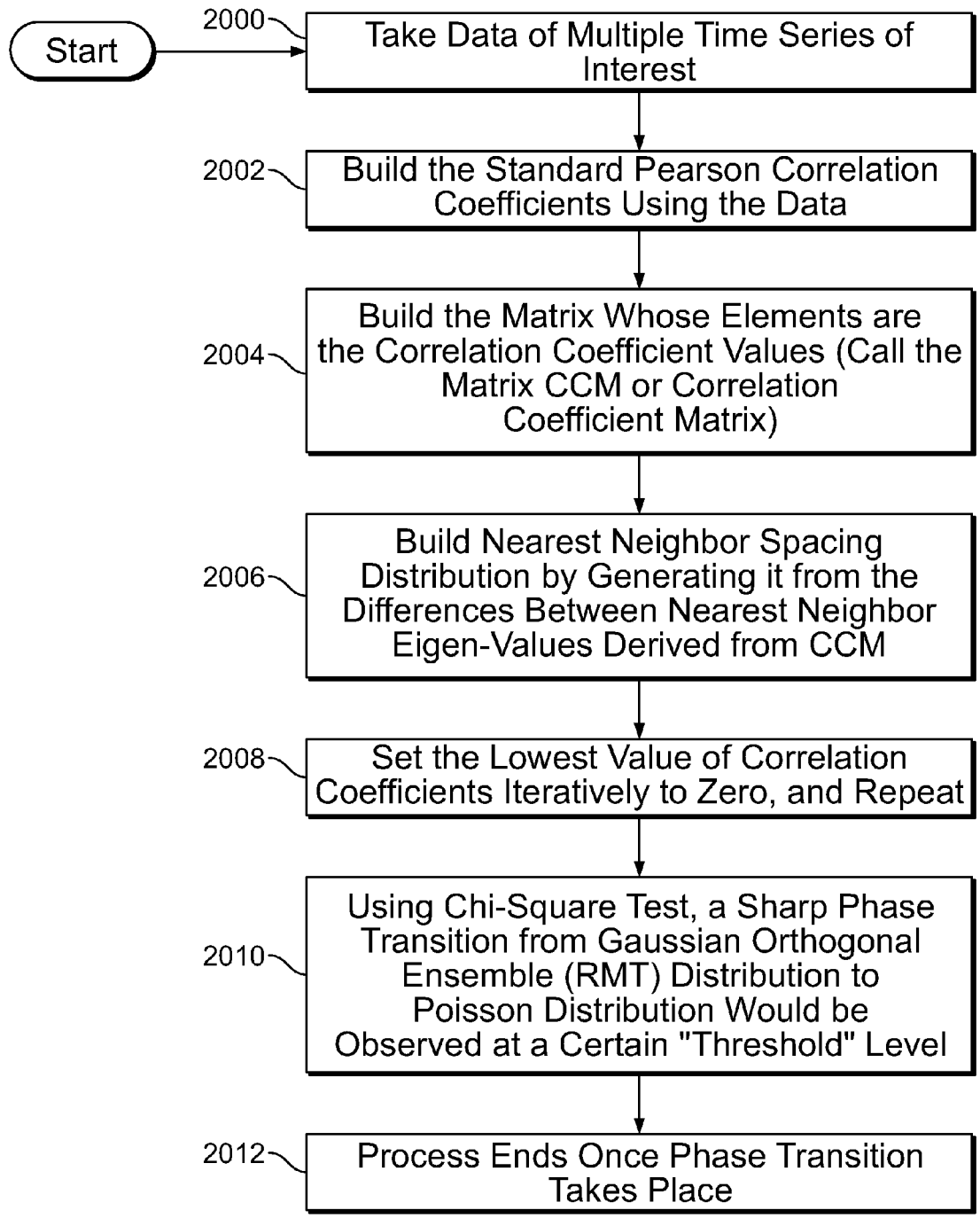
FIG. 20A illustrates a flow chart pertaining to an exemplary random matrix theory analysis.

FIG. 20A shows an example flow chart using the RMT method to determine economic instability in financial systems in segmentation or clustering, for example in risk segmentation or population clustering. First data of multiple time series of interest is obtained in step 2000. Next, standard Pearson correlation coefficients using the data are built at step 2002. The matrix whose elements are the correlation coefficient values (call the matrix CCM or Correlation Coefficient Matrix) is then formulated at step 2004. The nearest neighbor spacing distribution by generating it from the differences between nearest neighbor eigen-values derived from CCM is then obtained at step 2006. The lowest value of correlation coefficients is iteratively set to zero, and the calculation is repeated at step 2008. Using a chi-square test, a sharp phase transition from Gaussian Orthogonal Ensemble (RMT) distribution to Poisson distribution would be observed at a certain "threshold" level at step 2010. Once this takes place, optimal segmentation or clustering is achieved. The mathematical philosophy is basically trying to make CCM as diagonal as possible, but not necessarily completely diagonal, and the process should be stopped once a phase transition takes place at step 2012. The output could be in form of optimal segmentation or clustering, and software could be built to detect the threshold where the transition takes place. This could be associated with economic instability risks or simply optimal risk segmentation or population clustering only.

Figure 20B:
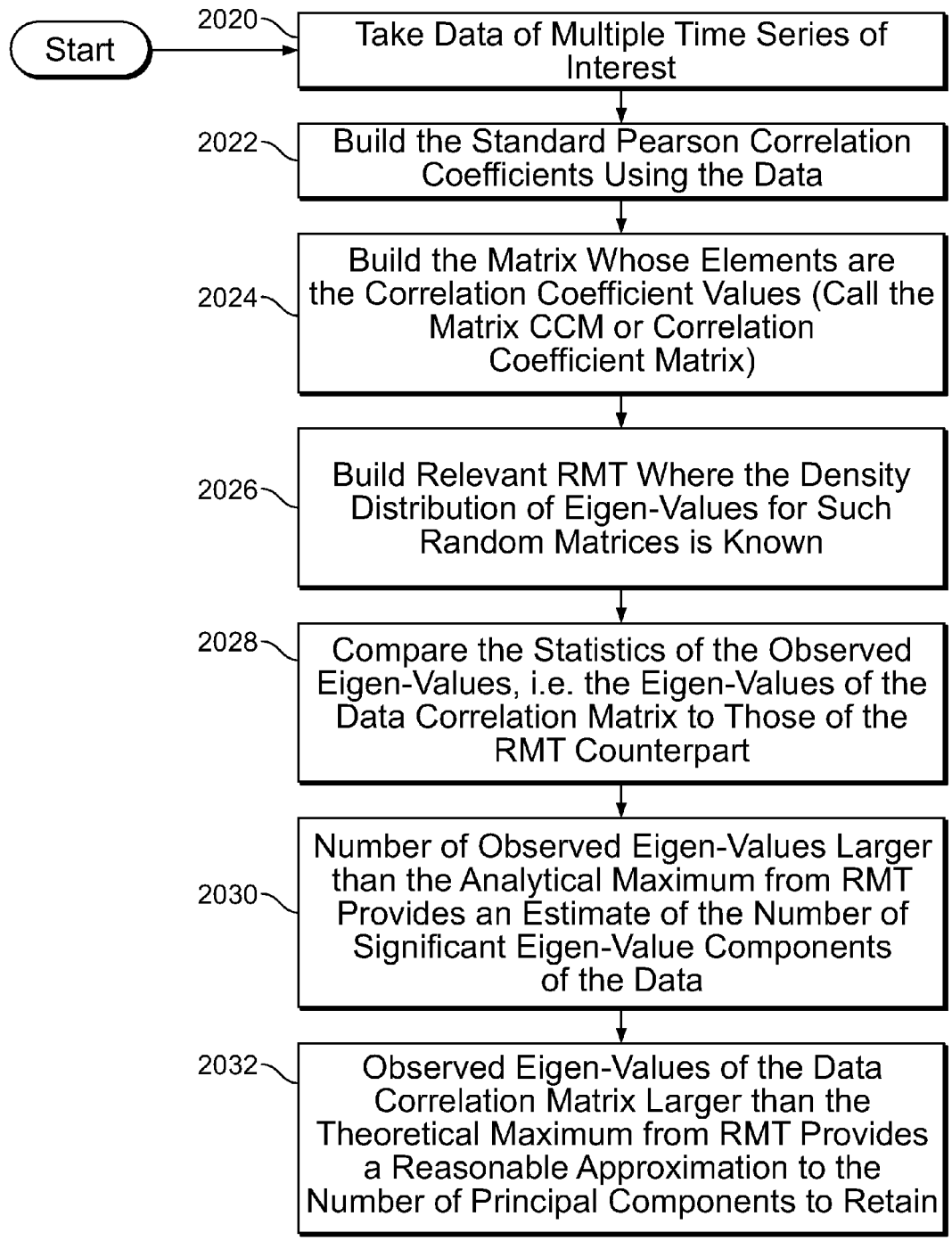
FIG. 20B illustrates another flow chart pertaining to an exemplary random matrix theory analysis.

An example flow chart using RMT to estimating dimensionality of the data used for PCA is depicted in relation to FIG. 20B. First, the data of multiple time series of interest is determined at step 2020. Next, the standard Pearson correlation coefficients are formulated using the data at step 2022. The matrix whose elements are the correlation coefficient values (call the matrix CCM or Correlation Coefficient Matrix) is then determined at step 2024. The relevant RMT is formed where the density distribution of eigen-values for such random matrices is known at step 2026. The statistics of the observed eigen-values, i.e. the eigen-values of the data correlation matrix is then compared to those of the RMT counterpart at step 2028. At step 2030, the number of observed eigen-values larger than the analytical maximum from RMT provides an estimate of the number of significant eigen-value components of the data. The observed eigen-values of the data correlation matrix larger than the theoretical maximum from RMT provides a reasonable approximation to the number of principal components to retain, i.e. the number of eigen-value components obtained using Principal Component Analysis (PCA) that are relevant in the calculation. The retained principal components (whose numbers are usually much lower than the original dimensionality of the data) can be used in the analysis.

Early Warning Detection of Economic Conditions:

Complex dynamical systems, financial system included, can have transitional points where a sudden shift to a totally different dynamical regime may take place. Though predicting such tipping points can be difficult, generic early-warning signs may indicate if a certain threshold is approaching.

Many complex dynamical systems have critical thresholds called tipping points where the system abruptly shifts from one state to another. For example, in global finance, there is big concern about a sudden systemic decline in market prices that can threaten the global financial system which, in turn, may lead to a global financial crisis. It may be difficult to predict such critical transitions since the state of the system may show little changes before the tipping point is reached. Additionally, models of complex systems may not be accurate for predicting where critical thresholds are located. However, it seems that certain generic signs may take place in a wide class of systems as they approach a critical point. The dynamics of systems near a critical point have generic properties, regardless of differences in the details of each system. Critical thresholds for such transitions correspond to bifurcations. In the so-called catastrophic bifurcation, once a threshold is exceeded, a positive feedback mechanism pushes the system through a phase of directional change towards a contrasting state. The transitions from a stable equilibrium to a cyclic or chaotic state can also happen in some other types of bifurcations.

Figure 21A:
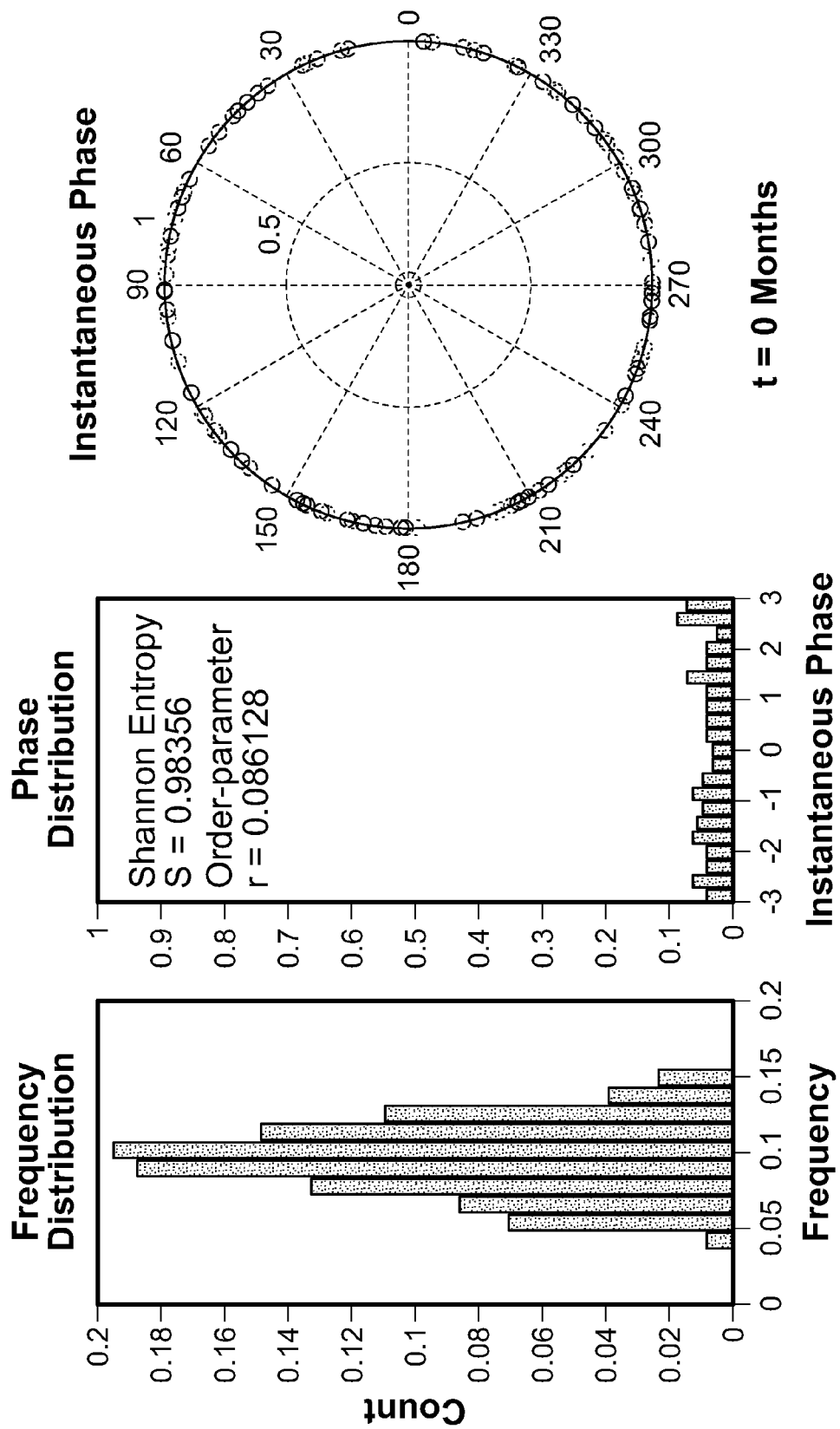
FIGS. 21A-21H show the evolution of exemplary economic data of an exemplary system over time.
Figure 21B:
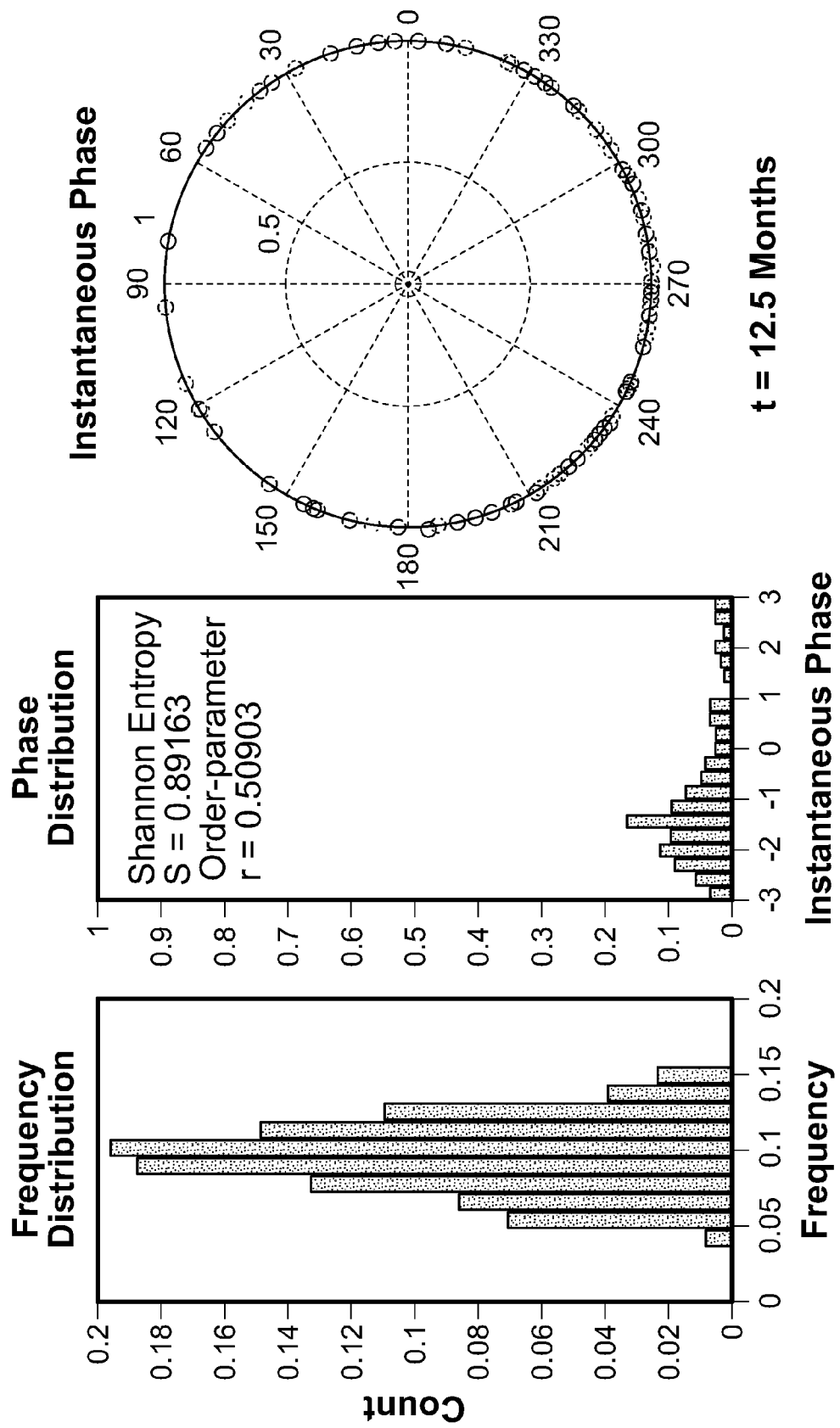
Figure 21C:
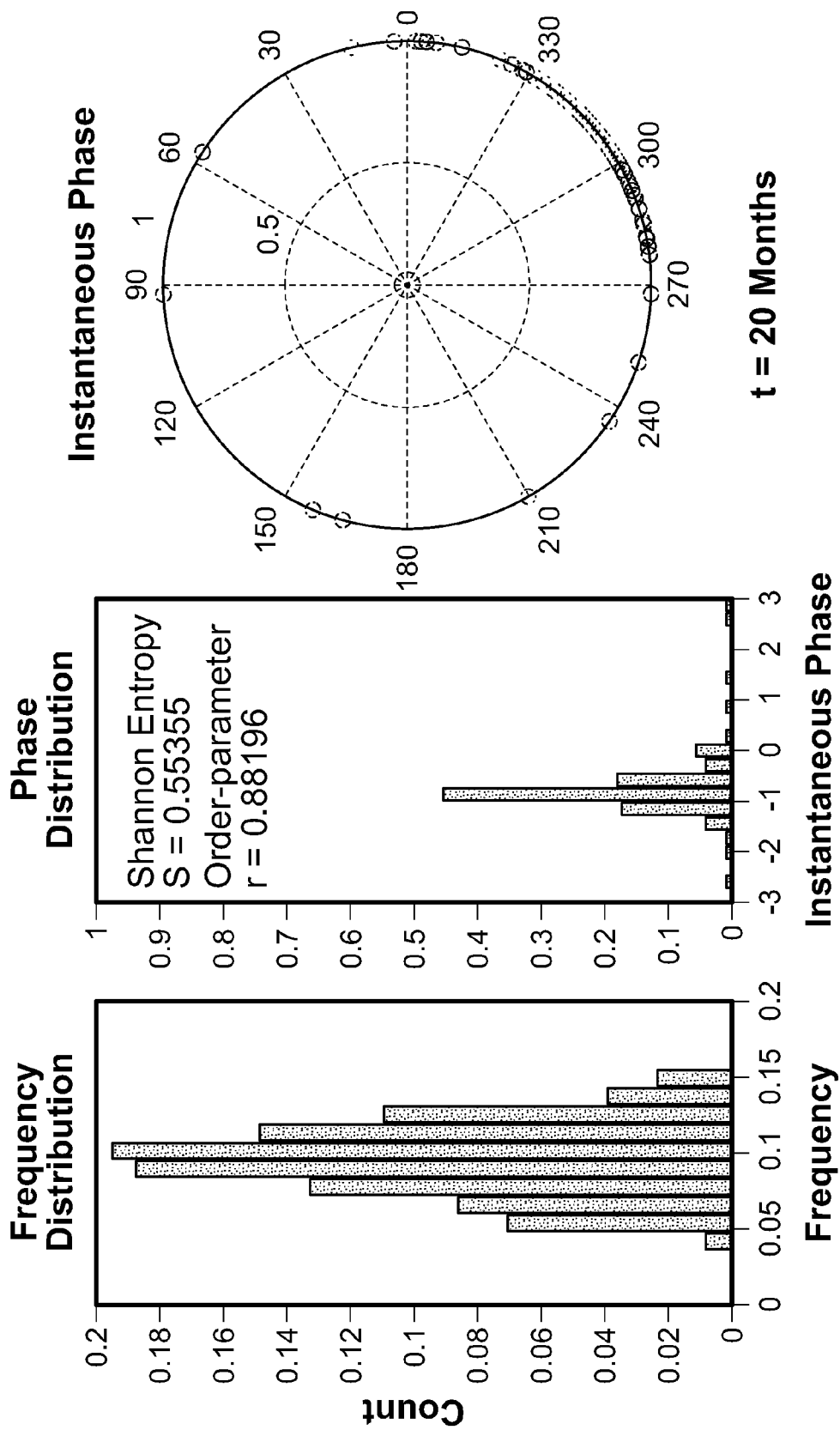
Figure 21D:
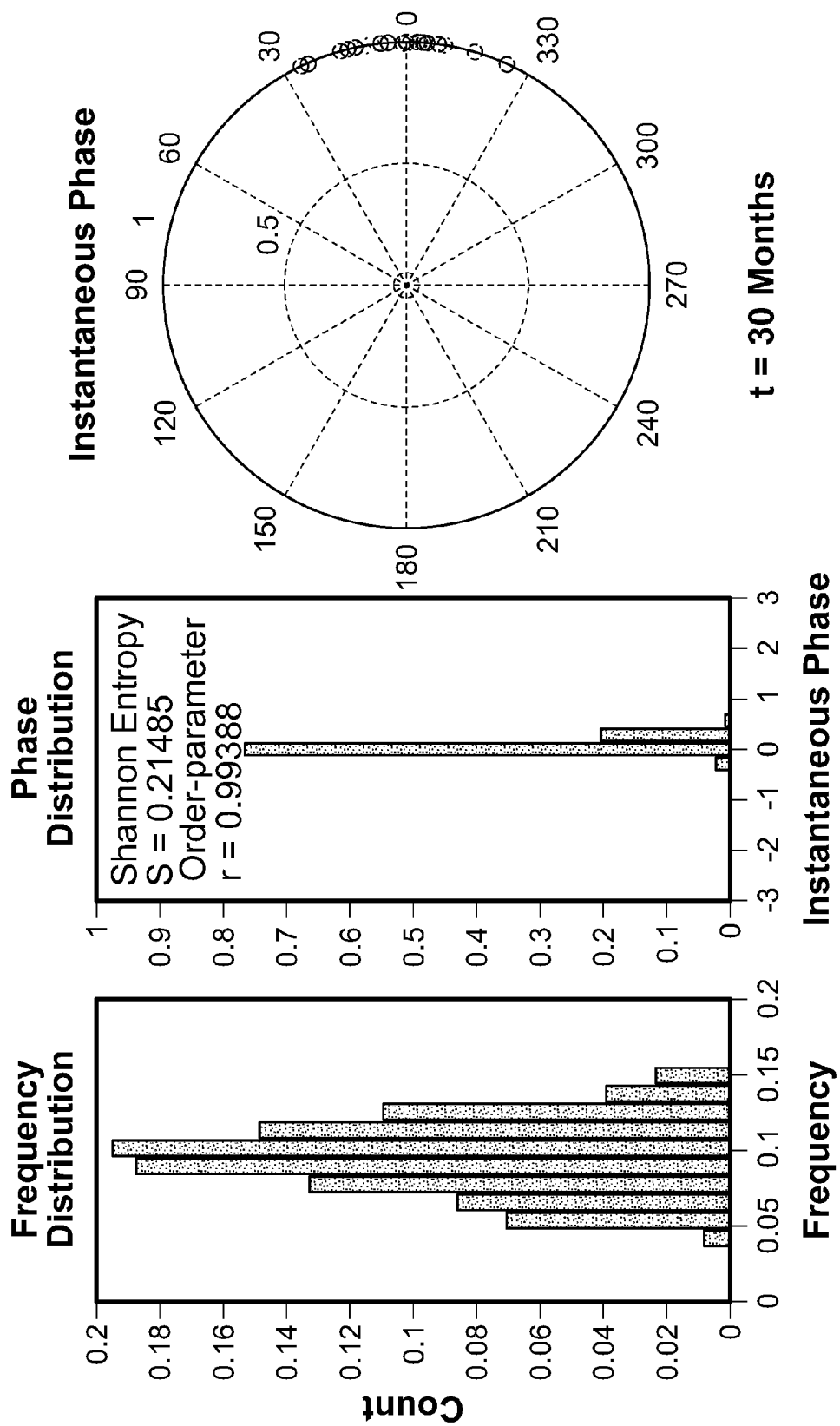
Figure 21E:
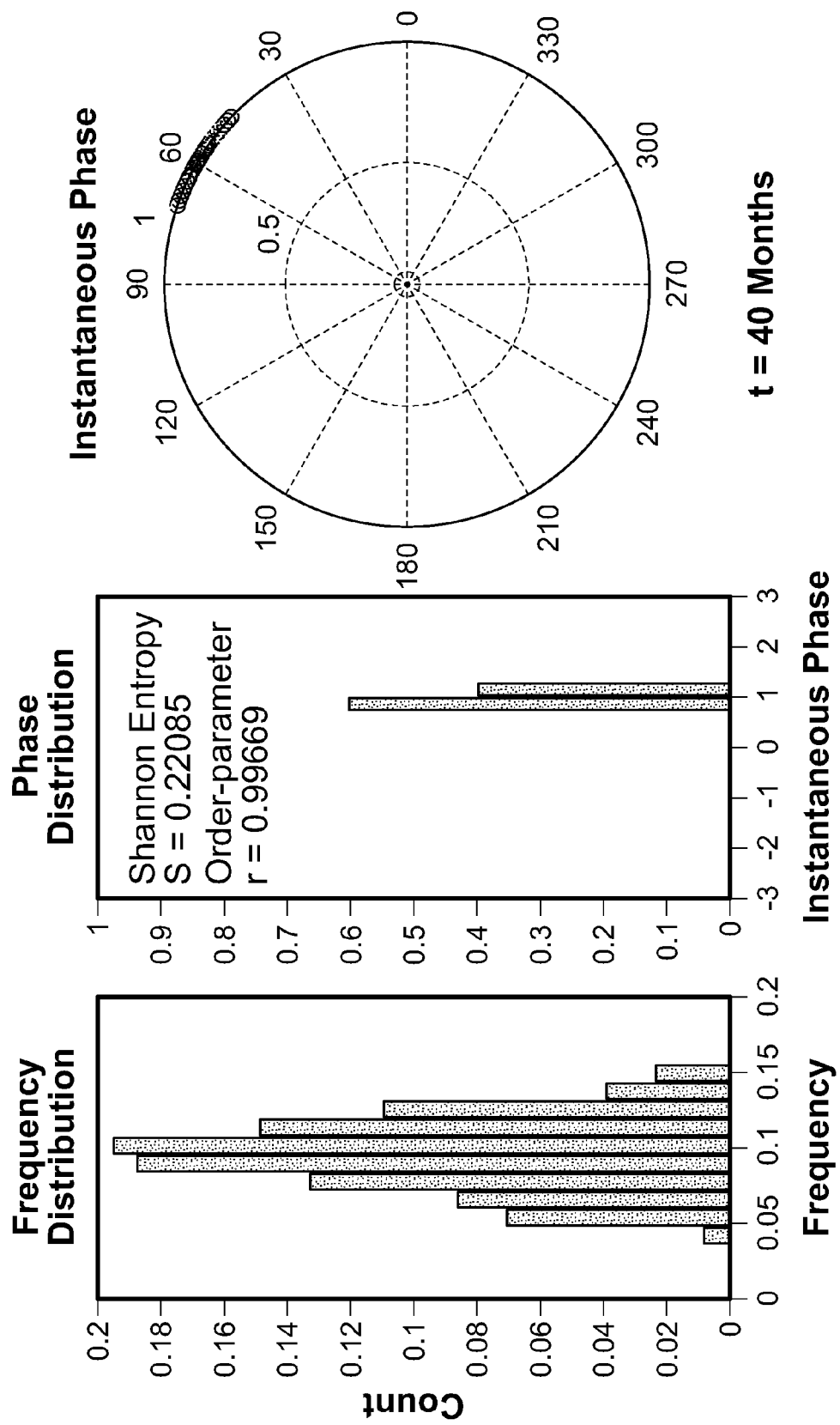
Figure 21F:
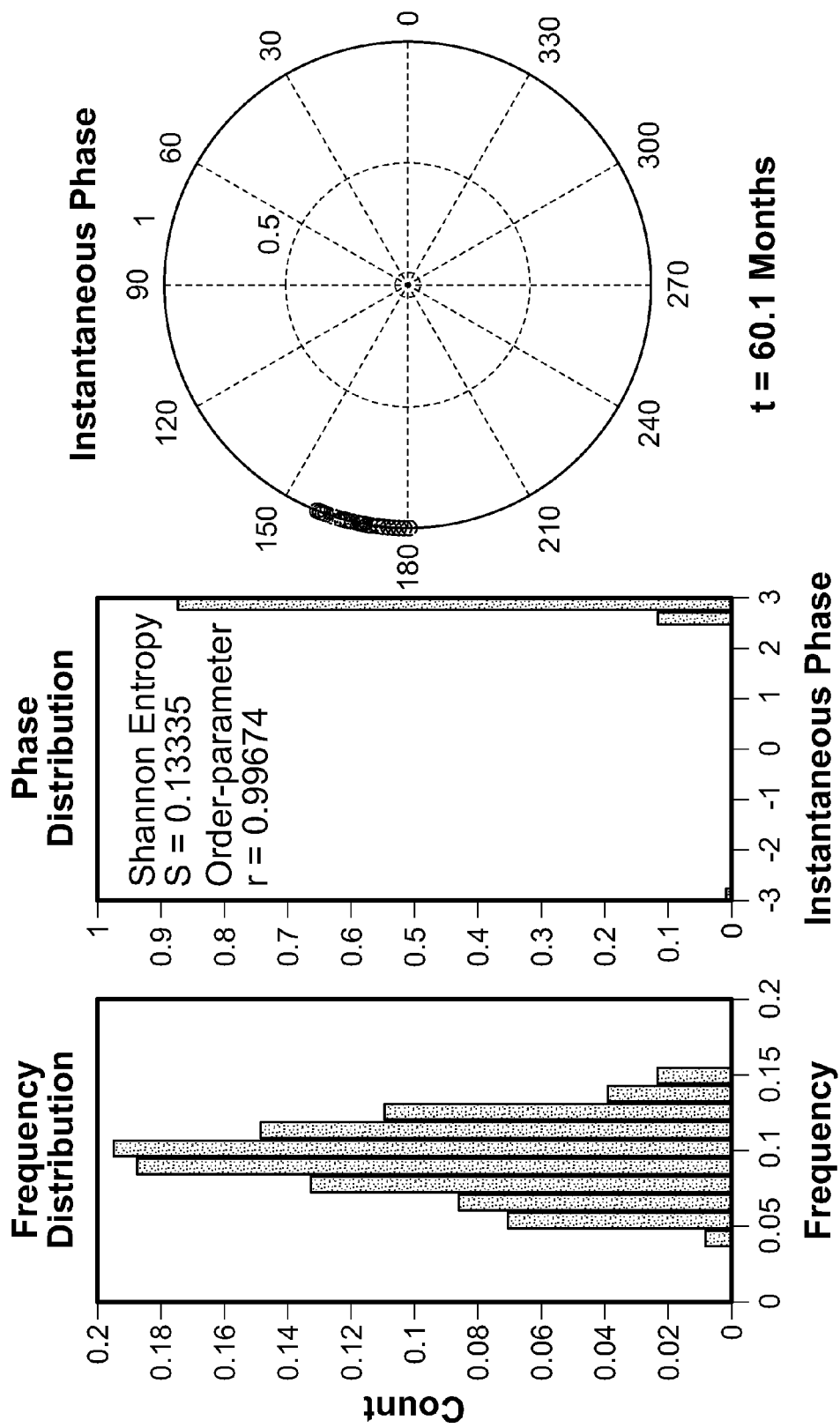
Figure 21G:
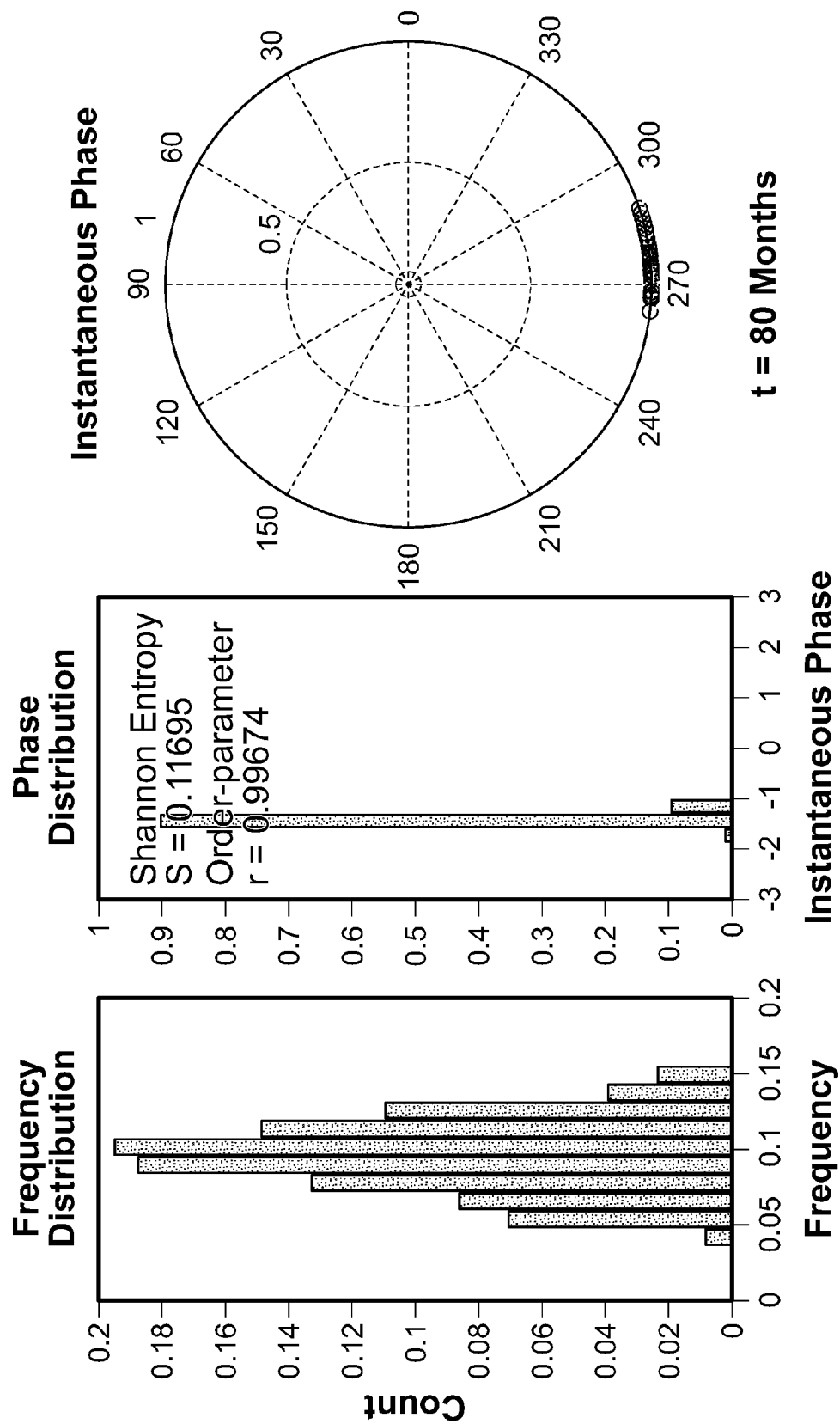
Figure 21H:
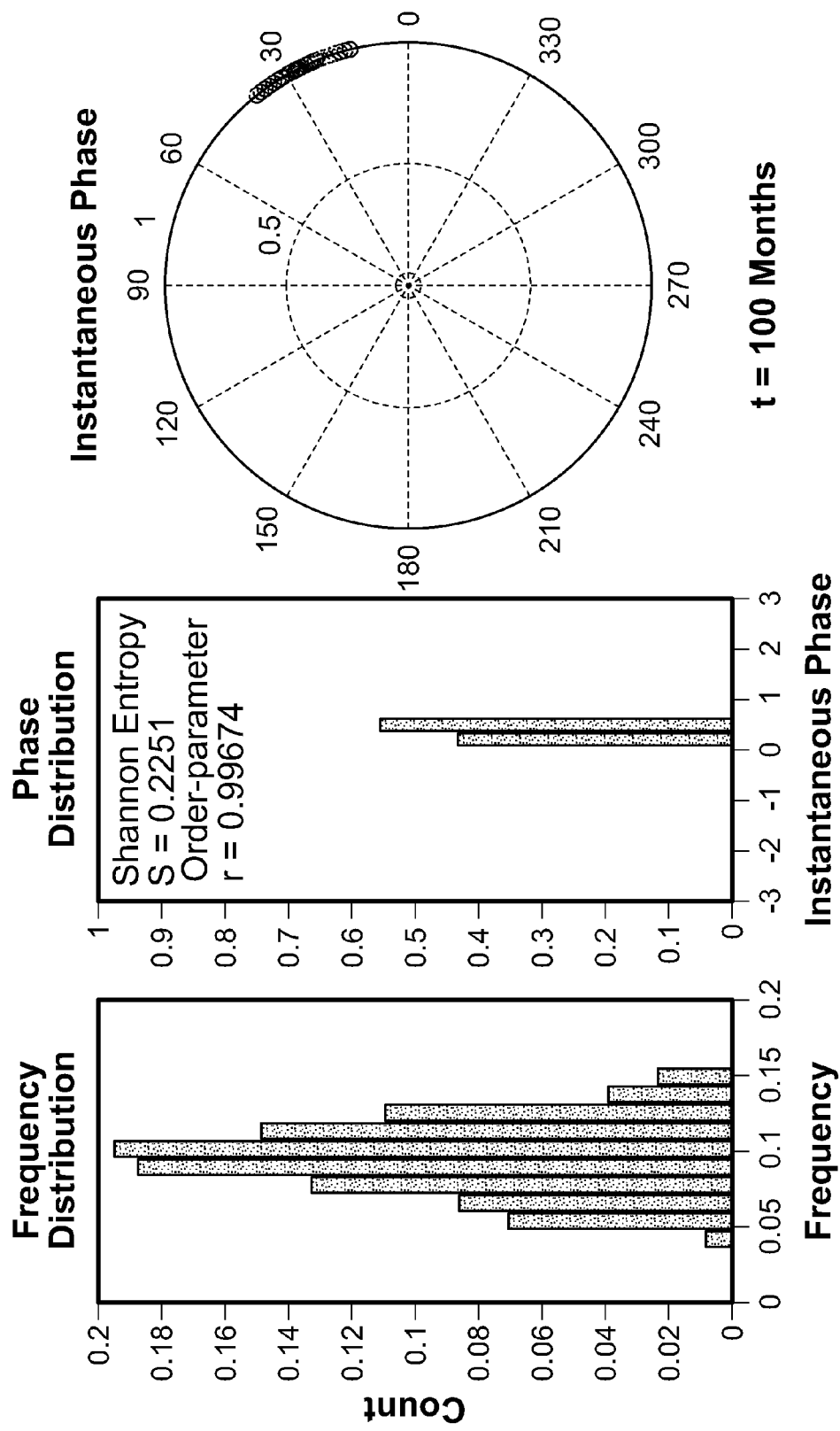

FIGS. 21A-21H illustrate eight panels of the same exemplary economic data, which show the evolution of an exemplary system over time. Each panel in FIGS. 21A-21H show three graphs: the left graph shows a frequency distribution, the middle graph shows a phase distribution, and the right graph shows the phases in polar form on a unit circle. As shown in FIGS. 21A-21C, from time=0 to 20 months, the exemplary economic data is out of phase with each other. However, starting at time=30 months, the exemplary economic data starts to move into phase with each other.

Figure 22A:
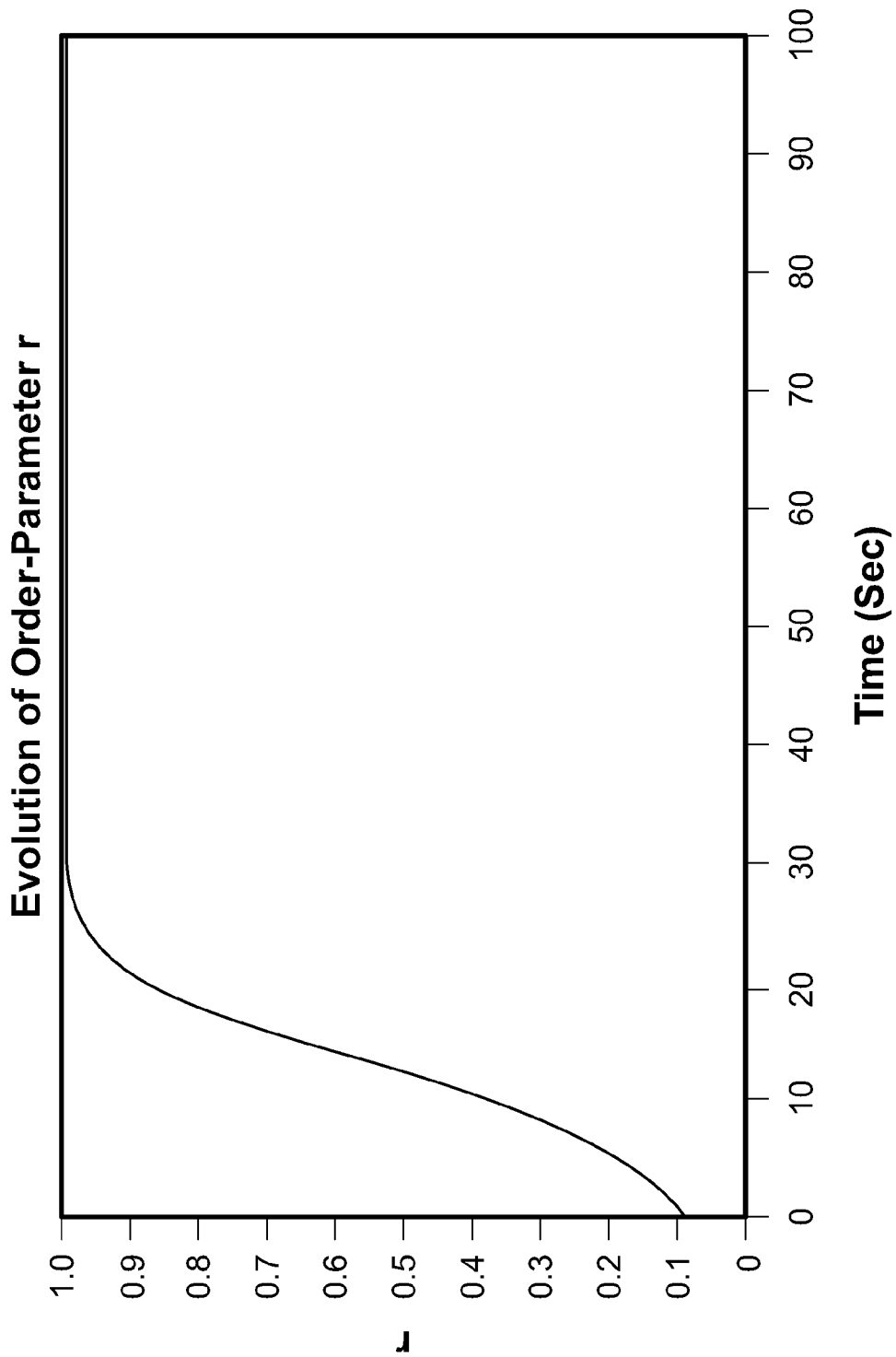
FIG. 22A shows the evolution of an exemplary order parameter over time.
Figure 22B:
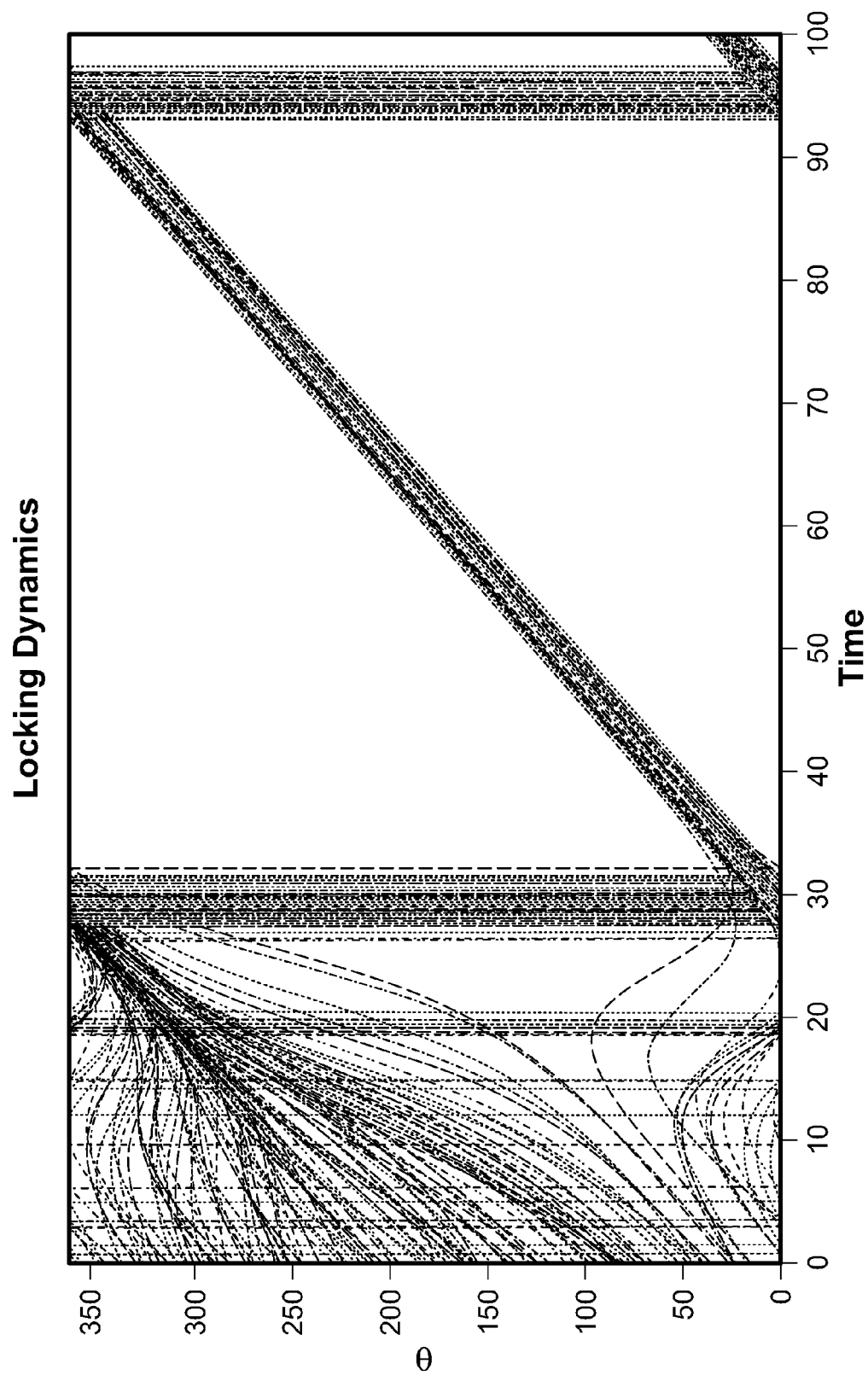
FIG. 22B illustrates an exemplary phase distribution of economic data.

FIG. 22A shows the evolution of the order parameter over time, and FIG. 22B illustrates how the phase distribution is locked to have the values which are confined within a certain (moving) range only. The order parameter, in this case, shows the level of synchronicity of the system as a whole.

In one example, indicators of whether a system is getting close to a critical threshold may be related to a phenomenon called critical slowing down, for example, fold catastrophe. At a fold bifurcation point, the dominant eigenvalue characterizing the rates of change around the equilibrium is zero. Therefore, as the system approaches such critical points, it becomes increasingly slow to recover from small perturbations. Such slowing down typically starts far from the bifurcation point, and that recovery rates decrease smoothly to zero as the critical points is approached.

The recovery rate after a small perturbation will be reduced, and will approach zero when a system moves towards a catastrophic bifurcation point, which can be further explained by the following simple dynamical system, where y is a positive scaling factor and a and b are parameters:

$$\frac{dx}{dt} = \gamma(x-a)(x-b).$$

This model has two equilibria, $\bar{x}_1 = a$ and $\bar{x}_2 = b$, of which one is stable and the other is unstable. If the value of a equals to that of b, the equilibria collide and exchange stability (in a transcritical bifurcation). Assuming that $\bar{x}_1$ is the stable equilibrium, it can be determined what happens if the state of the equilibrium is slightly perturbed $$(x = \bar{x}_1 + \varepsilon): \frac{d(\bar{x}_1 + \varepsilon)}{dt} = f(\bar{x}_1 + \varepsilon).$$

Here f(x) is the right hand side of the above equation $$\frac{dx}{dt} = \gamma(x-a)(x-b).$$

Linearizing the equation using a first-order Taylor expansion yields which simplifies to $$\frac{d(\bar{x}_1 + \epsilon)}{dt} = f(\bar{x}_1 + \varepsilon)$$
$$\approx f(\bar{x}_1) + \frac{\partial f}{\partial x}\bigg|_{\bar{x}_1} \varepsilon, f(\bar{x}_1) + \frac{d\varepsilon}{dt}$$
$$= f(\bar{x}_1) + \frac{\partial f}{\partial x}\bigg|_{\bar{x}_1} \varepsilon \Rightarrow \frac{de}{dt}$$
$$= \lambda_1 \varepsilon.$$

With eigenvalues $\lambda_1$ and $\lambda_2$ in this case, $$\lambda_1 = \frac{\partial f}{\partial x}\bigg|_a = -\gamma(b-a),$$

and, for the other equilibrium $$\lambda_2 = \frac{\partial f}{\partial x}\bigg|_b = -\gamma(b-a)$$

are obtained.

If b>a then the first equilibrium has a negative eigenvalue, $\lambda_1$, and, therefore, it is stable (as the perturbation goes exponentially to zero;

$$f(\bar{x}_1) + \frac{d\varepsilon}{dt} = f(\bar{x}_1) + \frac{\partial f}{\partial x}\bigg|_{\bar{x}_1} \varepsilon \Rightarrow \frac{de}{dt} = \lambda_1 \varepsilon\bigg).$$

It is easy to see from the above equations $$\lambda_1 = \frac{\partial f}{\partial x}\bigg|a = -\gamma(b-a),$$

and $$\lambda_2 = \frac{\partial f}{\partial x}\bigg|b = -\gamma(b-a).$$

that at the bifurcation (b=a) the recovery rates $\lambda_1$ and $\lambda_2$ are both zero and perturbations will not recover. Farther away from the bifurcation, the recovery rate in this model is linearly dependent on the size of the basin of attraction (b−a). For more realistic models, this is not necessarily true but the relation is still monotonic and is often nearly linear.

The most direct implication of critical slowing down is that the recovery rate after small perturbation can be used as an indicator of how close a system is to a bifurcation point. For most natural systems, it would be impossible to monitor them by systematically observing recovery rates. However, it can be shown that as a bifurcation is approached in such a system, certain characteristic changes in the pattern of fluctuations are expected to take place. An important prediction is that the slowing down should lead to an increase in autocorrelation in the resulting pattern of fluctuations.

Critical slowing down will tend to lead to an increase in the autocorrelation and variance of the fluctuations in a stochastically forced system approaching a bifurcation at a threshold value of a control parameter. The example given here illustrates why this is the case. In certain instances it may be assumed, there is a repeated disturbance of the state variable after each period $\Delta t$ (that is, additive noise). Between disturbances, the return to equilibrium is approximately exponential with a certain recovery speed, A. In a simple autoregressive model this can be described with the following equations: $x_{n+1} = \exp(\lambda \Delta t)(x_n - \bar{x}) + \sigma \epsilon_n$, and $y_{n+1} = \exp(\lambda \Delta t) y_n + \sigma \epsilon_n$. Here $y_n$ is the deviation of the state variable x from the equilibrium, $\epsilon_n$ is a random number from a standard normal distribution and $\sigma$ is the standard deviation. If $\lambda$ and $\Delta t$ are independent of $y_n$, this model can also be written as a first-order autoregressive (AR(1)) process: $y_{n+1} = \alpha y_n + \sigma \epsilon_n$. The autocorrelation $\alpha \equiv (\lambda \Delta t)$ is zero for white noise and close to one for red (autocorrelated) noise. The expectation of an AR(1) process: $y_{n+1} = c + \alpha y_n + \sigma \epsilon_n$ is $$E(y_{n+1}) = E(c) + \alpha E(y_n) + E(\sigma \varepsilon_n) \Rightarrow \mu$$
$$= c + \alpha \mu + 0 \Rightarrow \mu$$
$$= \frac{c}{1-\alpha}.$$

For c=0, the mean equals zero and the variance is found to be $$\text{Var}(y_{n+1}) = E(y_n^2) - \mu^2 = \frac{\sigma^2}{1-\alpha^2}.$$

Close to the critical point, the return speed to equilibrium decreases, implying that λ approaches zero and the autocorrelation a tends to one. Therefore, the variance tends to infinity. These early-warning signals are the result of critical slowing down near the threshold value of the control parameter.

Slowing down may cause the intrinsic rates of change in the system to decrease, and the state of the system at any given moment may become more and more like its past state. The resulting increase in "memory" of the system can be measured in various ways from the frequency spectrum of the system. One example approach is to calculate a lag-1 autocorrelation, which can be directly interpreted as slowness of recovery in such natural perturbation regimes.

Additionally, analysis in the models exposed to stochastic forcing confirms that if the system is driven gradually closer to a catastrophic bifurcation, there is a marked increase in autocorrelation that builds up long before the critical transition takes place. This is true even for realistic models. Whereas increased variance in the pattern of fluctuations can be seen as another possible consequence of critical slowing down as a critical transition is approached. As the eigenvalue approaches zero, the impacts of shocks do not decay, and their accumulating effect increases the variance of the state variable. In principle, critical slowing down could reduce the ability of the system to track the fluctuations, and thereby produce an opposite effect on variance. However, analysis shows that an increase in the variance usually arises and may be detected before a critical transition takes place.

Phenomenon of critical slowing down may lead to three possible early-warning signals in the dynamics of a system approaching a bifurcation that may be used in emerging risk detection: slower recovery from perturbations, increased autocorrelation, and increased variance.

Figure 24:
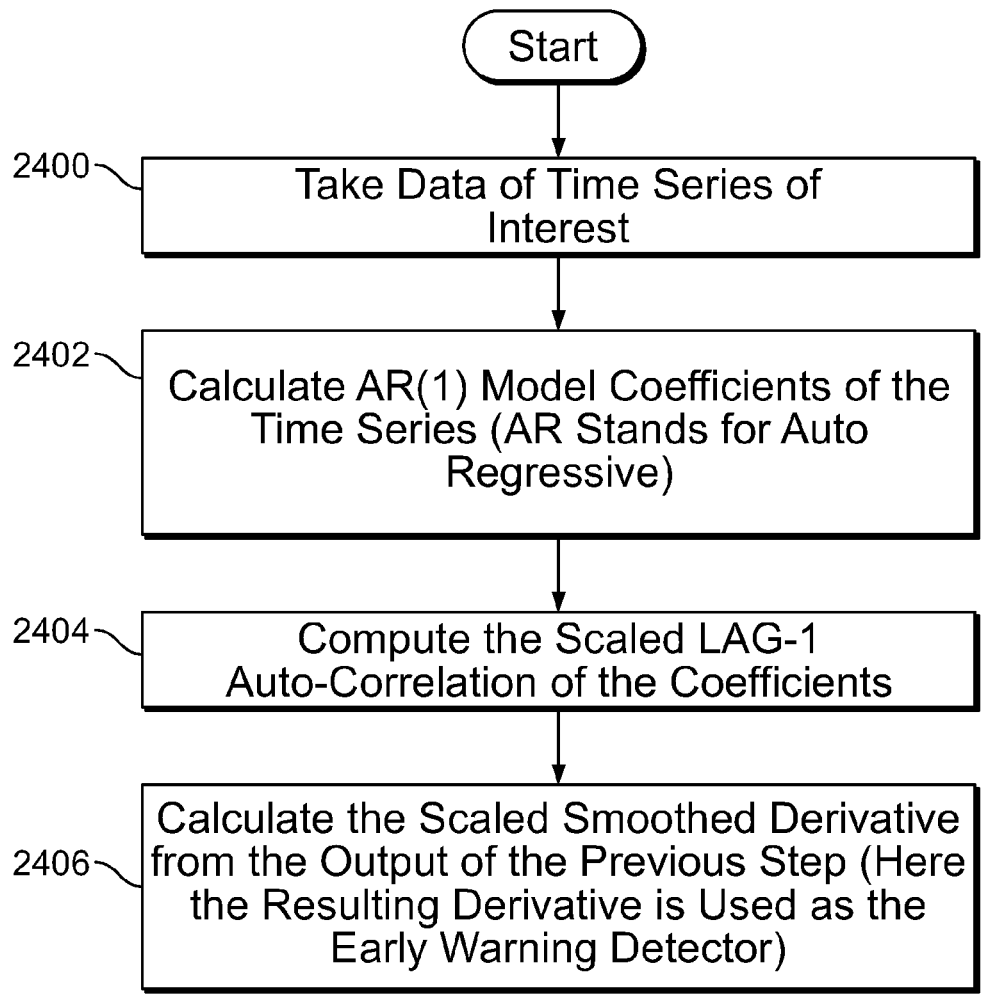
FIG. 24 shows an exemplary process for early warning detection of economic conditions.

An exemplary process is depicted in FIG. 24, which shows an exemplary process for determining an early warning signal for economic instability. In the first step, a data series of interest is obtained in step 2400 to determine the particular early warning signal. Next, the Auto Regressive ("AR(1)") Model coefficients of a time series can be calculated in step 2402. The scaled lag-1 auto-correlation of the coefficients can be determined in step 2404. Finally, the scaled smoothed derivative of the previous computation can be determined at step 2406. The resulting derivative can be used as an early warning detector. For example, an indicator as a positive or negative warning could be provided to the user. In particular, the system could be configured to output a positive indicator when the scaled smoothed derivative is above a predetermined threshold value and can be configured to output a negative indicator when the scaled smoothed derivative is below a predetermined threshold value.

In one example, the above-mentioned process described in relation with FIG. 24 can be applied to the Home Price Index ("HPI") as shown in FIGS. 23A-23D to detect certain economic conditions. FIGS. 23A-23D show the scaled HPI (blue curve), the scaled lag-1 auto-correlation of AR(1) coefficients (green curve), and the scaled smoothed derivative of the lag-1 auto-correlation of AR1 coefficients (red curve). The results are shown for Charlotte in FIG. 23A, Las Vegas in FIG. 23B, Cleveland in FIG. 23C, and Phoenix in FIG. 23D. The last monthly calendar time being used is August 2009. In this example, the scaled lag-1 auto-correlation of AR(1) coefficients and the scaled smoothed derivative of the lag-1 auto-correlation of AR(1) coefficients can serve as the leading indicators for HPI. A monitoring process can be configured to monitor the leading indicators for the HPI.

In certain examples a computer-implemented method can be employed to perform one or more aspects of the methods discussed herein. Alternatively an apparatus comprising: a processor; and a memory for storing computer readable instructions that, when executed by the processor, can cause the apparatus to perform one or more aspects of the methods discussed herein. In other embodiments, one or more non-transitory computer-readable media may have instructions stored thereon that, when executed, cause at least one computing device to perform one or more aspects of the methods discussed herein.

Features of Methods and Systems for Determining Economic Conditions According to Examples of the Disclosure:

In one example, a method can include one or more of the following steps: receiving an input of economic data including a plurality of macroeconomic and microeconomic indicators, applying a band pass filter to the economic data, extracting a cycle signal from the band pass filter, determining a synchronization event of the plurality of macroeconomic and microeconomic indicators, and outputting an economic prediction based on the synchronization event. The band pass filter can be applied to the plurality of macroeconomic and microeconomic indicators simultaneously. After applying a band pass filter to the economic data the absolute value of the plurality of the filtered economic data series is calculated. The absolute value of the filtered data can be reviewed to determine correlations and concentration measures across the plurality of economic indicators to predict economic trends. A principal component analysis can be applied to the economic data to determine a market driver.

In another example, a method can include one or more of the following steps:

determining a first principal component number from the economic data, determining eigenvector contents of the first principal component number, normalizing the eigenvector contents of the first principal component number, sorting the normalized eigenvector contents from smallest to largest, calculating the distances between the normalized eigenvector contents, calculating the mean of the distances to obtain a dispersion level, and outputting an economic instability prediction based on the dispersion level of the distances. The predetermined time window can be set to approximately 70 months, though it can have any value deemed reasonable. The first principal component number can represent systemic risk. The eigenvalue contents can be normalized such that the eigenvalue contents total summation is 100%. A lower dispersion level may indicate a greater risk of economic instability. The input of economic data can include both microeconomic data and macroeconomic data. Prior to applying principal component analysis the economic data can be passed through a band pass filter to determine a cycle state.

In another example, a method can include one or more of the following steps: receiving economic data of a predetermined time window and applying principal component analysis to the economic data, determining a first principal component number, determining a second principal component number, calculating the ratio between the first principal component number and the second principal component number, determining the largest ratio between the first principal component number and the second principal component number, and outputting a market driver prediction based on the largest ratio between the first principal component number and the second principal component number. The predetermined time window can be approximately 70 months. The first principal component can be systemic risk and the second principal component can be non-systemic risk. The input of economic data may include both microeconomic data and macroeconomic data.

In another example, a method can include one or more of the following steps: receiving economic data of a multiple time series, determining correlation coefficient values using the data of multiple time series, creating a matrix using the correlation coefficient values, determining the nearest neighbor spacing distribution, determining lowest values of correlation coefficients and set the lowest value of correlation coefficients iteratively to zero, determining a threshold level by using a chi-square test, and outputting an economic instability prediction based on the threshold level. The nearest neighbor spacing distribution can be determined by taking the differences between nearest neighbor eigen-values derived from a correlation coefficient matrix. The threshold level can be determined by detecting a sharp phase transition from a Gaussian Orthogonal Ensemble distribution to a Poisson distribution. A standard Pearson correlation coefficient values can be determined using the data of multiple time series.

In another example, a method can include one or more of the following steps: obtaining economic data of multiple time series of interest, determining correlation coefficient values using the data, forming a matrix of the correlation values and determining the eigen-values of the correlation matrix, forming a random matrix counterpart with known eigen-value density distribution, comparing statistics of the eigen-values of the data correlation matrix to the values of the random matrix counterpart of known eigen-value distribution, determining the difference between the number of the eigen-values of the data correlation matrix and the random matrix counterpart, and outputting a the number of principal components to retain based on the difference between the number of the eigen-values of the data correlation matrix and the random matrix counterpart. The standard Pearson correlation coefficients can be obtained using the data in the method.

In another example, a method can include one or more of the following steps: receiving data of a predetermined time series, determining auto regressive model coefficients for the data of the time series, determining a scaled lag-1 auto-correlation of the coefficients, and outputting an indicator based on the scaled lag-1 auto-correlation of the coefficients. The indicator can be positive when the scaled lag-1 auto-correlation of the coefficients is above a predetermined threshold value. The indicator can be negative when the scaled lag-1 auto-correlation of the coefficients is below a predetermined threshold value. The data of the predetermined time series can be Home Price Index data. A scaled smoothed derivative from the scaled lag-1 auto-correlation of the coefficients can be determined. A second indicator can be output based on a scaled smoothed derivative from the scaled lag-1 auto-correlation of the coefficients.

As previously discussed, many complex dynamical systems have critical thresholds called tipping points where the system abruptly shifts from one state to another. In global finance, there is big concern about a sudden systemic decline in values that can threaten the global economic system which, in turn, may lead to global economic downturns. It is traditionally difficult to predict such critical transitions since the state of the system may show little change before the tipping point is reached. However, it seems that certain generic signs may take place in a wide class of systems as they approach a critical point. The dynamics of systems near a critical point have generic properties, regardless of differences in the details of each system. Critical thresholds for such transitions correspond to bifurcations. In the so-called catastrophic bifurcation, once a threshold is exceeded, a positive feedback mechanism pushes the system through a phase of directional change towards a contrasting state. The transitions from a stable equilibrium to a cyclic or chaotic state can also happen in some other types of bifurcations. Three possible early-warnings in the dynamics of a system approaching a tipping point may be used in emerging instability detection: slower recovery from perturbations, increased autocorrelation and increased variance.

When an economic system approaches a critical threshold (e.g., a tipping point), the system may abruptly shift from one state to another (e.g., where the value of underlying economic instrument becomes appreciably lower or higher than a previous value). Consequently, it may be important that an early warning signal be expeditiously conveyed to a user who is responsible for the underlying economic instrument. Those of skill in the art will appreciate that there may be instances where instability may occur within minutes or seconds after receiving an early warning signal. Those of skill in the art will also appreciate that economic instruments may be a tradable resource of any kind. Economic instruments may be cash, evidence of an ownership interest in an entity, a contractual right to receive or deliver cash or another economic instrument, or a derivative. Cash instruments may be securities which are readily transferable or may be instruments such as loans, where both borrower and lender have to agree on a transfer. Derivative instruments may derive their value from the value and characteristics of one or more underlying entities such as a resource, index, or interest rate. Derivative instruments may be exchange-traded derivatives and over-the-counter derivatives.

While the term "network" includes not only a "physical network" and a "content network," as previously discussed, the term "network" may also refer to "platform networks." For example, a Unified Network Platform (UNP) comprises an open platform architecture that enables the convergence of network applications including data networking, security, network infrastructure, network applications, and network management.

Figure 25:
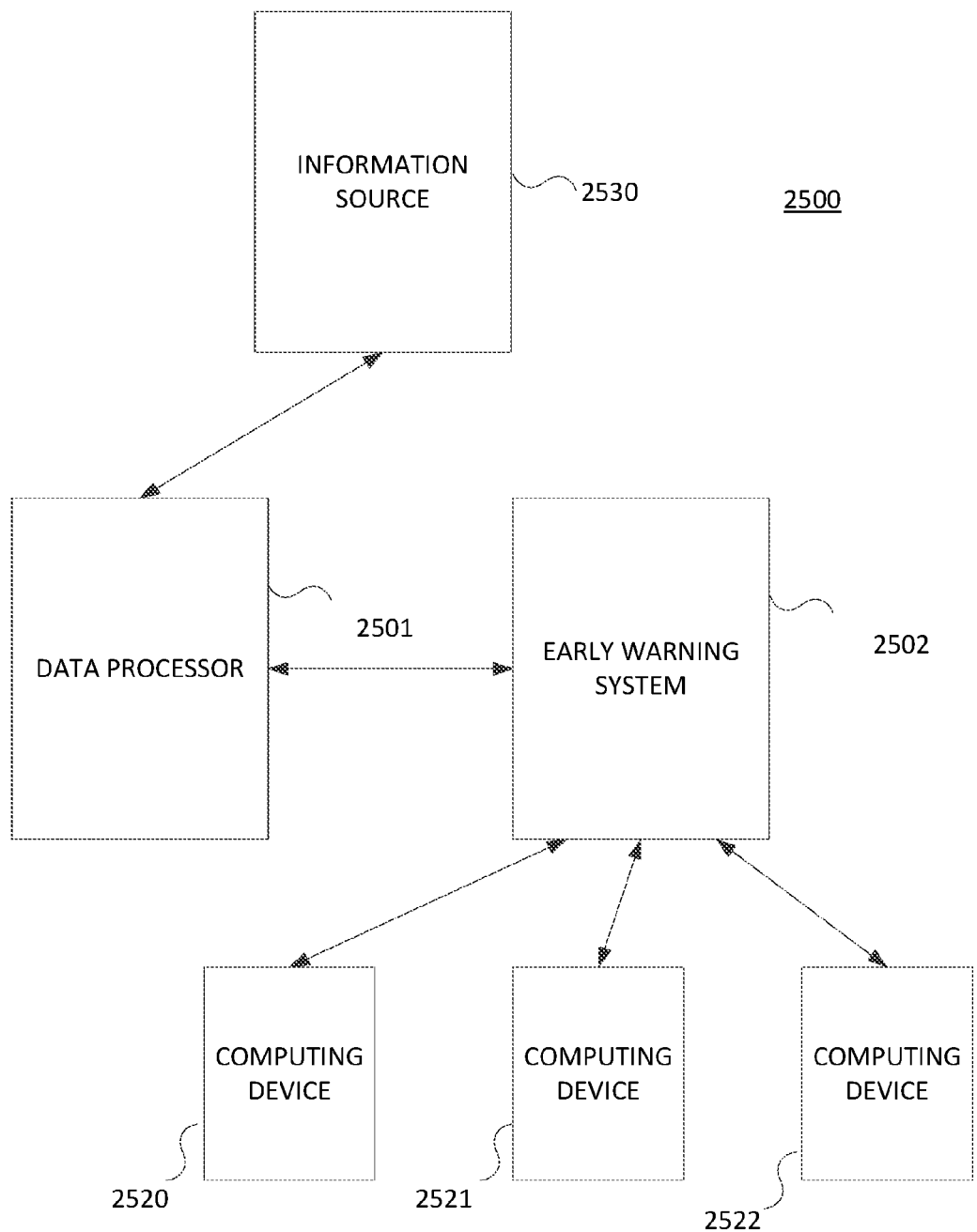
FIG. 25 illustrates an apparatus with a data processor and an early warning system in accordance with an aspect of the embodiments.

FIG. 25 illustrates apparatus 2500 that comprises data processor 2501 and early warning system 2502 in accordance with an aspect of the embodiments. For example, processor 2501 obtains information about a real-world system (which is typically external to apparatus 2500) such as an underlying complex economic network. The information is gathered from information source 2530, which may comprise a network of computers and/or databases that monitor the real-world system. As previously discussed, processor 2501 processes the obtained information to determine if the underlying real-world system exhibits characteristics are indicative that the real-world system is approaching a critical threshold. In such a situation, early warning system 2502 generates an early warning signal to one or more computing devices 2520-2522 to inform devices 2520-2522 about the potential instability of the system.

Those of skill in the art will appreciate that apparatus 2500 may process and transform information from different types of real-world systems in the realms of biology, epidemiology, genetics, transportation, computer software, and economics.

Figure 23A:
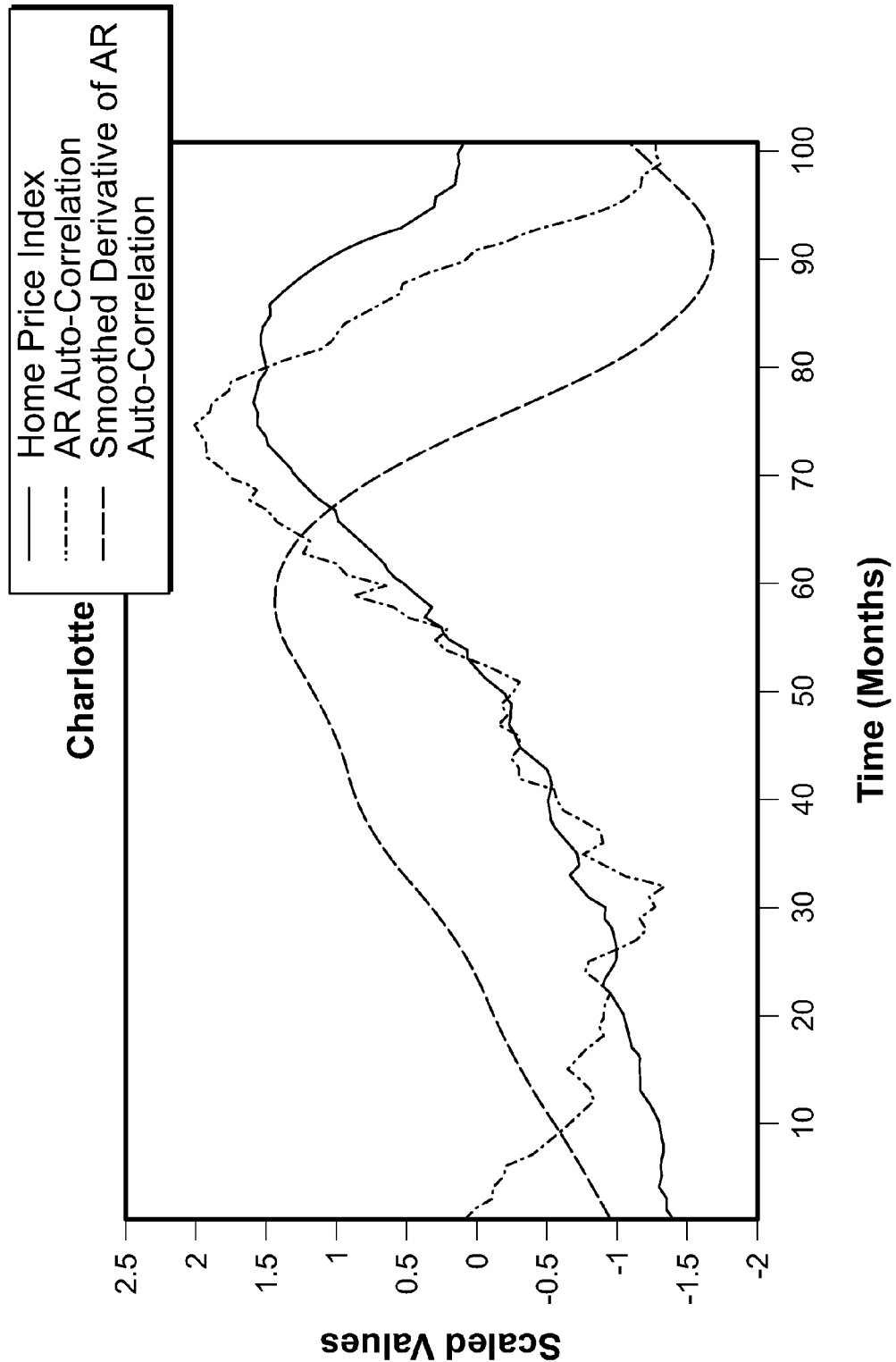
FIGS. 23A-23D illustrate exemplary Home Price Index data and derivatives thereof.
Figure 23B:
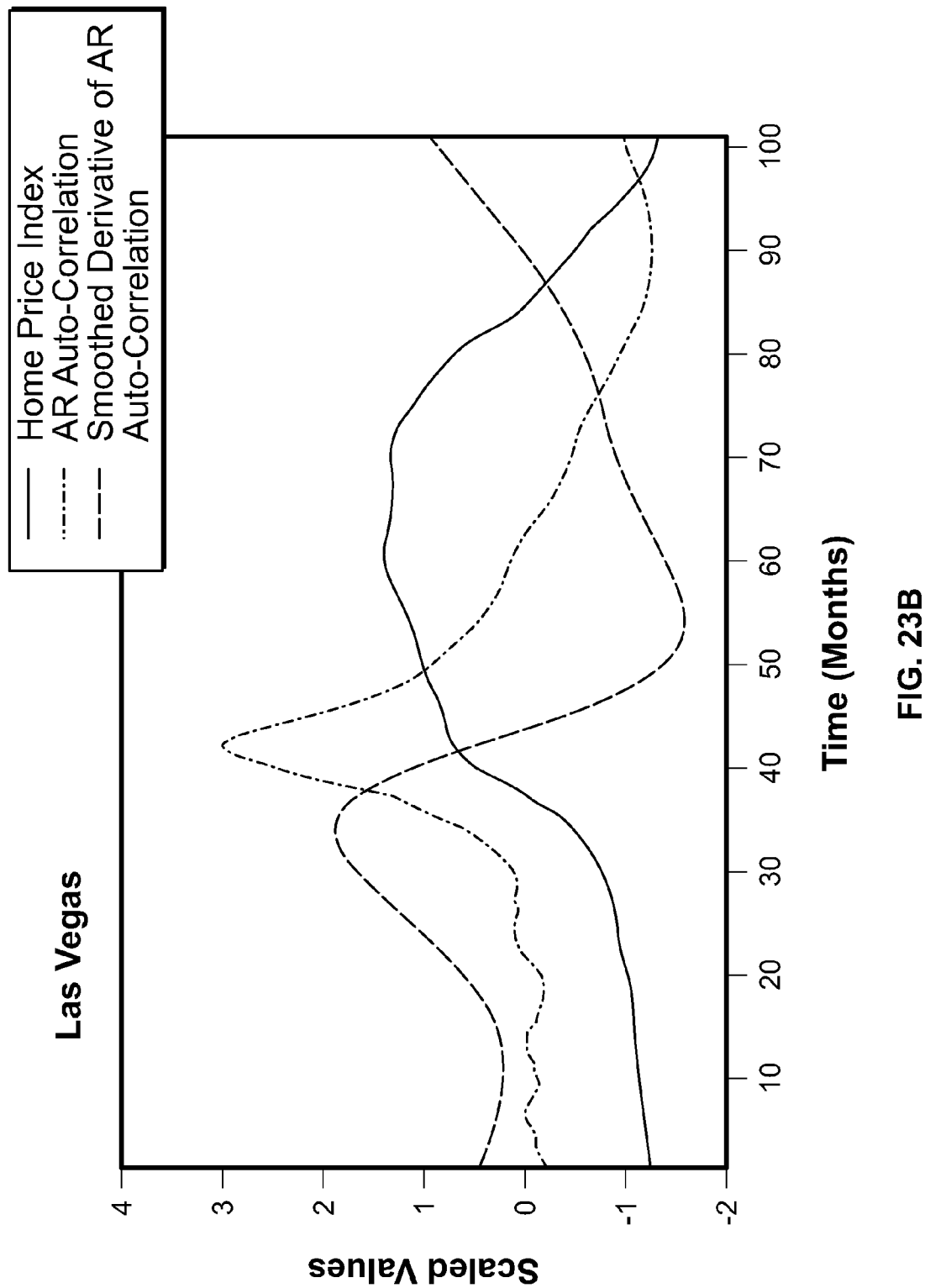
Figure 23C:
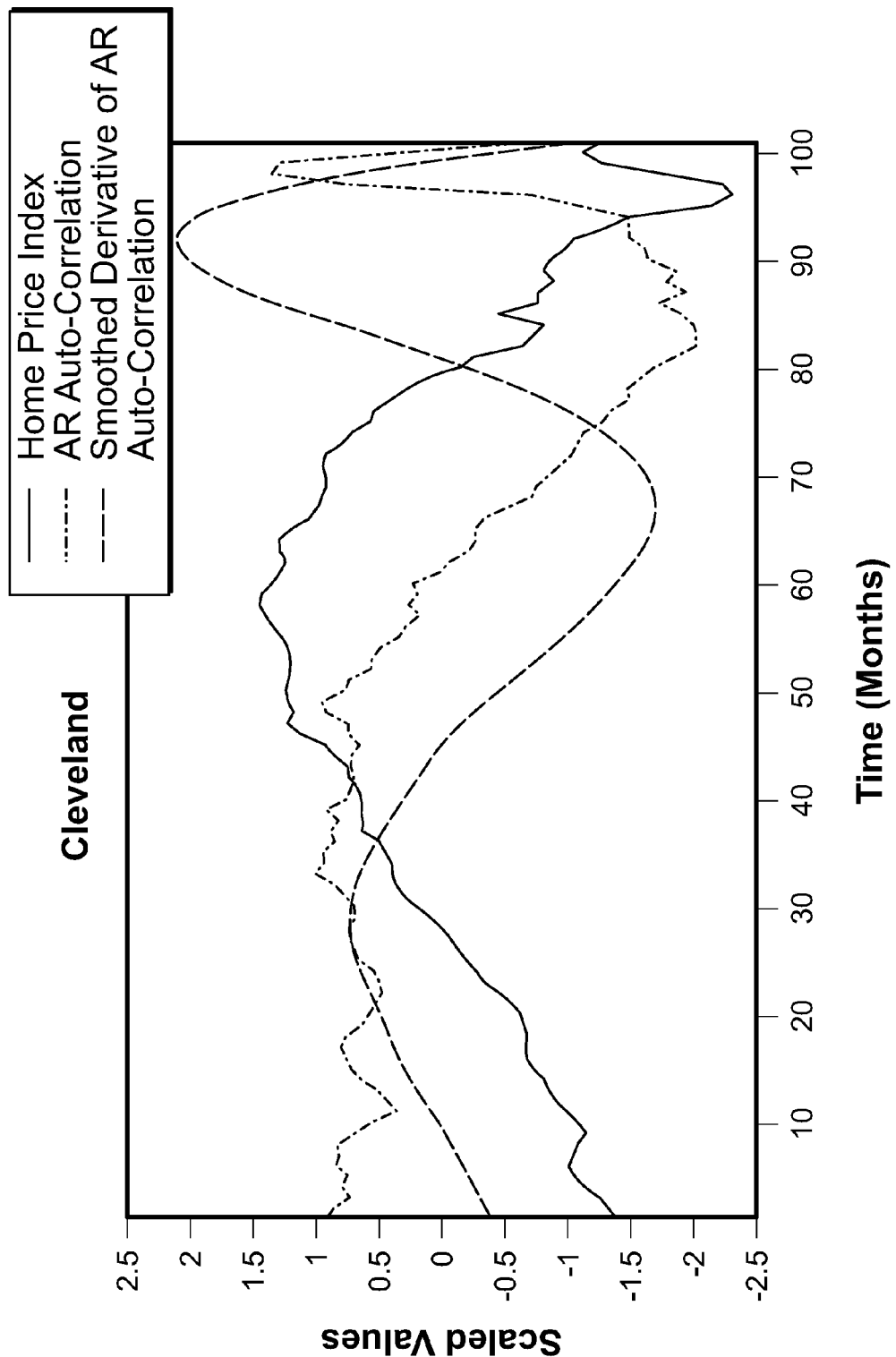
Figure 23D:
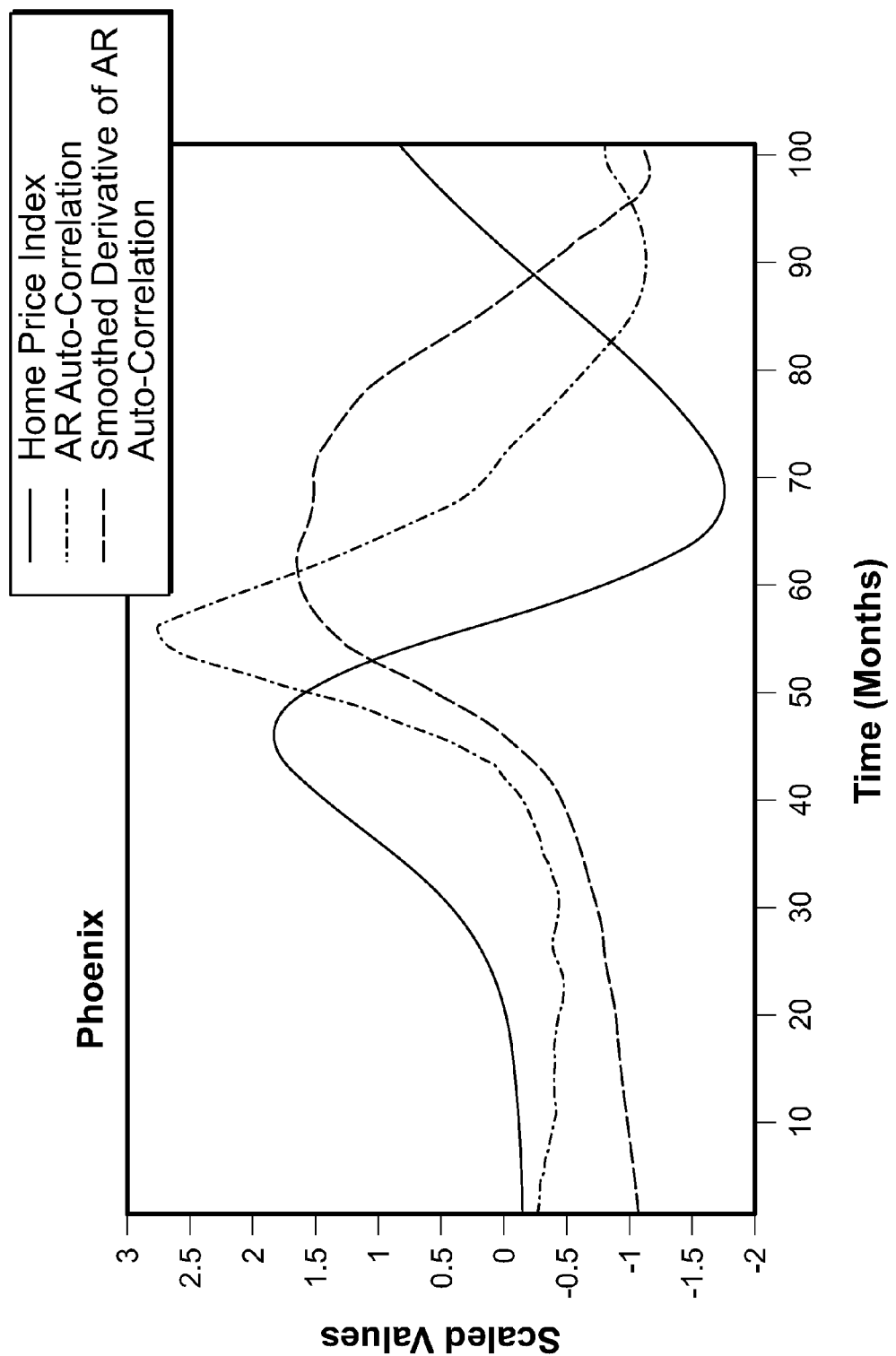

Referring to FIGS. 23A-D, early warning system 2502 may determine from the scaled smoothed derivative that the home price index (HPI) for Las Vegas (a geographical region as shown in FIG. 23B) is approaching a critical threshold while the HPI for Cleveland (a geographical region as shown in FIG. 23C) is not. In such a situation, early warning system 2502 may generate an early warning signal having a positive warning signal component corresponding to Las Vegas and a negative warning signal component for Cleveland. For example, the early warning signal may comprise a message having indicators for Las Vegas and Cleveland with positive and negative values, respectively.

An early warning signal may comprise one or more messages that are sent to one or more computing devices. For example, as will be discussed, a first message may notify computing devices 2520-2522 that a critical threshold is being approached while a second message has more detailed information about the possible instability. Based on the information contained in the early warning signal, action via a computing device may be initiated to address the possible instability.

Figure 26:
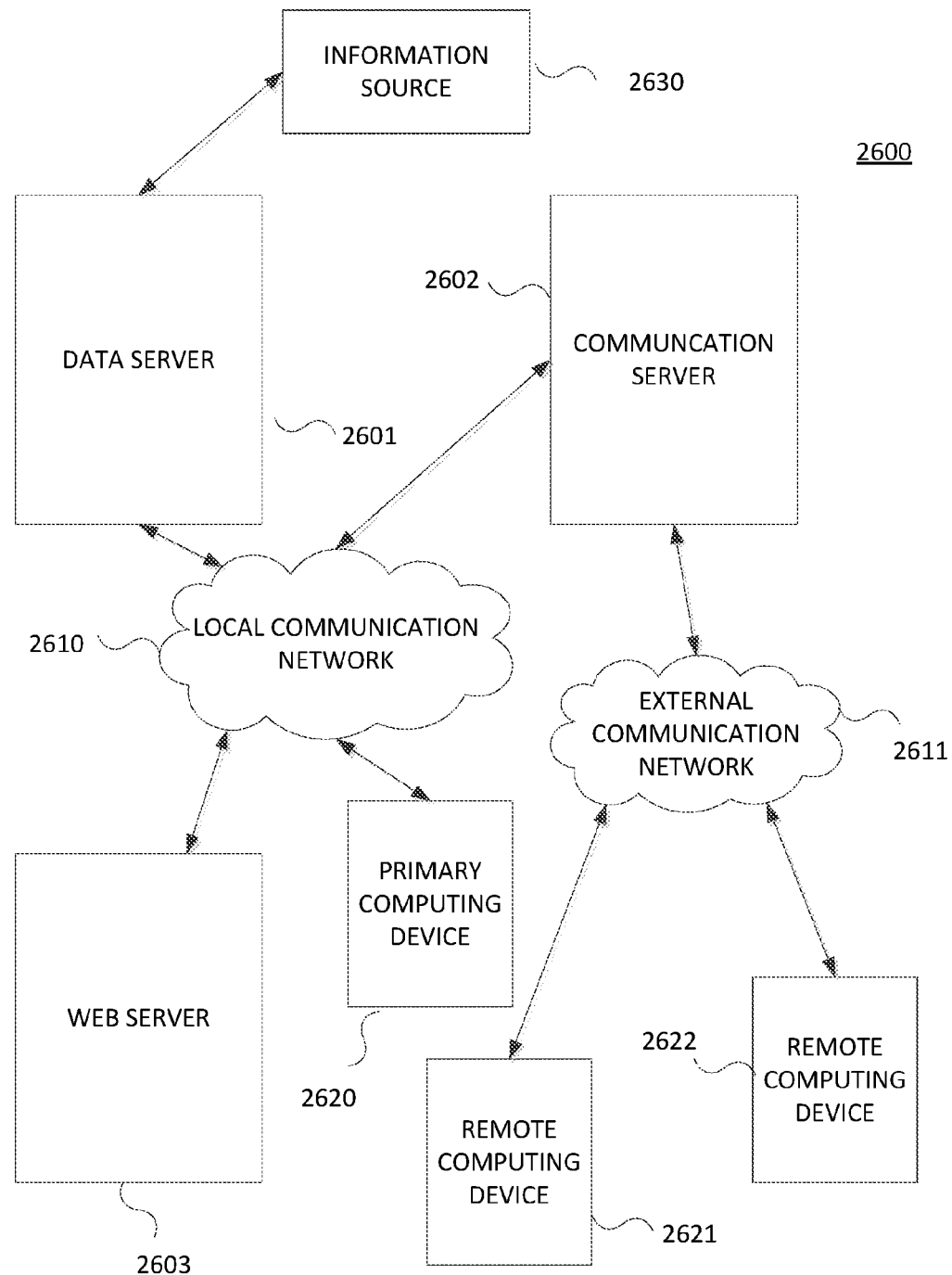
FIG. 26 illustrates a computer system that supports processing of information about a real-world system and generating an early warning signal in accordance with an aspect of the embodiments.

FIG. 26 illustrates computer system 2600 that supports apparatus 2500 for processing information from information source 2630 and generating an early warning signal pertaining to the stability/instability of a real-world system in accordance with an aspect of the embodiments. Computer system 2600 comprises servers 2601, 2602, and 2603. With some embodiments, data server 2601 obtains information about a real-world system from information source 2630. As previously discussed, the real-world system may comprise an underlying economic network that exhibits structural attributes that may provide clues about economic instability or economic stability. Based on processing the information from information source 2630, data server 2601 may detect early-warning signs of the real-world system approaching a critical threshold where the system becomes unstable. If so, data server 2601 generates an early warning signal. Notification of the event may be sent to one or more users (associated with computing devices 2620-2622) via communication server 2603.

Communication server 2603 may send an event notification to some or all of computing devices 2620-2622 through one or more different communication media. For example, a notification may be sent via a short message service (SMS) and/or via an intranet/internet. Referring to FIG. 26, communication server 2603 interacts with primary computing device 2620 via local communication network 2610 and with remote computing devices 2621-2622 via external communication network 2611. With some embodiments, primary computing device 2620 may support a user when the user is working in an office environment. However, the user may not be available in the office environment when the real-world system is exhibiting characteristics of possible instability and immediate action must be initiated by the user. In such a situation, the event notification may be sent to remote computing device 2621 and/or remote computing device 2622, which are registered to the user. As will be discussed, if an acknowledgement to the notification is received by communication server 2602 from one of remote computing devices 2621-2622, more detailed information about the possible instability may be sent to the responding computing device. For example, if communication server 2602 receives an acknowledgement from device 2622, an early warning application may be manually or automatically launched at device 2622 in which a communication connection is established between web server 2603 and device 2622 via external communication network 2611. One or more messages may be sent to device 2622 via the early warning application through the communication connection to provide additional information about the detected event. For example, textual information identifying the corresponding geographical area (e.g., Charlotte, Las Vegas, Cleveland, and/or Phoenix as shown in FIGS. 23A-D, respectively) and including quantitative information (e.g., AR auto-correlation and/or smoothed derivative of the AR) as well as graphical information (e.g., plots showing relationships between various types of data as shown in FIGS. 23A-D) may be sent from web server 2603 to device 2622 via communication server 2602 and external communication network 2611. Detailed information may include information specific to a particular geographical region associated with a registered device 2620-2622 as well as information about other geographical regions that may be correlated with the particular geographical region. For example, a potential instability for Las Vegas may be detected so that detailed information may be sent a device registered for a user responsible for the Las Vegas geographical region. However, the detailed information may include HPI information about Charlotte, Cleveland, and/or Phoenix and/or other related information (e.g., home liquidity) so that the registered user for Las Vegas region can correlate the potential instability with other geographical regions to ascertain whether there is a systemic instability for the HPI.

With some embodiments, the detailed information in the early warning signal may indicate whether the economy associated with the instability is moving in a positive or negative direction and further indicate if there are any particular elements driving the change. On a macro level this could be certain industries or asset classes. On a micro level it could be a certain company's economic performance or group of companies' economic performances. Also, economic instability may be affected by political instability, e.g., government grid-lock, elections, and the like. As previously discussed, principal component analysis or PCA may be used to identify the particular "drivers" of the trends. This can indicate which subcomponents are accounting for the change in state. For example, as previously discussed in reference to FIG. 9, largest ratios of two predetermined components may illustrate a particular economic driver. Two subcomponents can be compared by calculating the ratio between their first and second principal components. In one example, the first principal component can represent systemic risk, for example, a recession or other event external to the data being studied. The second principal component can be non-systemic (idiosyncratic) risk, which can be specific to a particular subcomponent. Subcomponent 5 may be the market driver because the ratio of the first principal component to the second principal component is the largest.

With some embodiments, an early warning application may be automatically launched at computing device 2620, 2621, or 2622 whenever an acknowledgment is generated at the device in response to receiving an early warning notification. Once launched, the early warning application may extract additional information about a potential instability from one or more messages contained in an early warning signal, appropriately filter the additional information, format the processed information, and display the information at the computing device. Moreover, the early warning application may be device-independent so that the application can execute on a variety of different device types.

Servers 2601, 2602, and 2603 may be combined on the same physical machines, and retain separate virtual or logical addresses, or may reside on separate physical machines. FIG. 26 illustrates just one example of a network architecture that may be used, and those of skill in the art will appreciate that the specific network architecture and data processing devices used may vary, and are secondary to the functionality that they provide, as further described herein. For example, services provided by data server 2601, web server 2602, and communication server 2603 may be supported by a single physical server.

Each computing component (servers 2601-2603 and computing devices 2620-2622) may be any type of known computer, server, or data processing device as discussed herein, e.g., as shown in FIG. 1.

Figure 27:
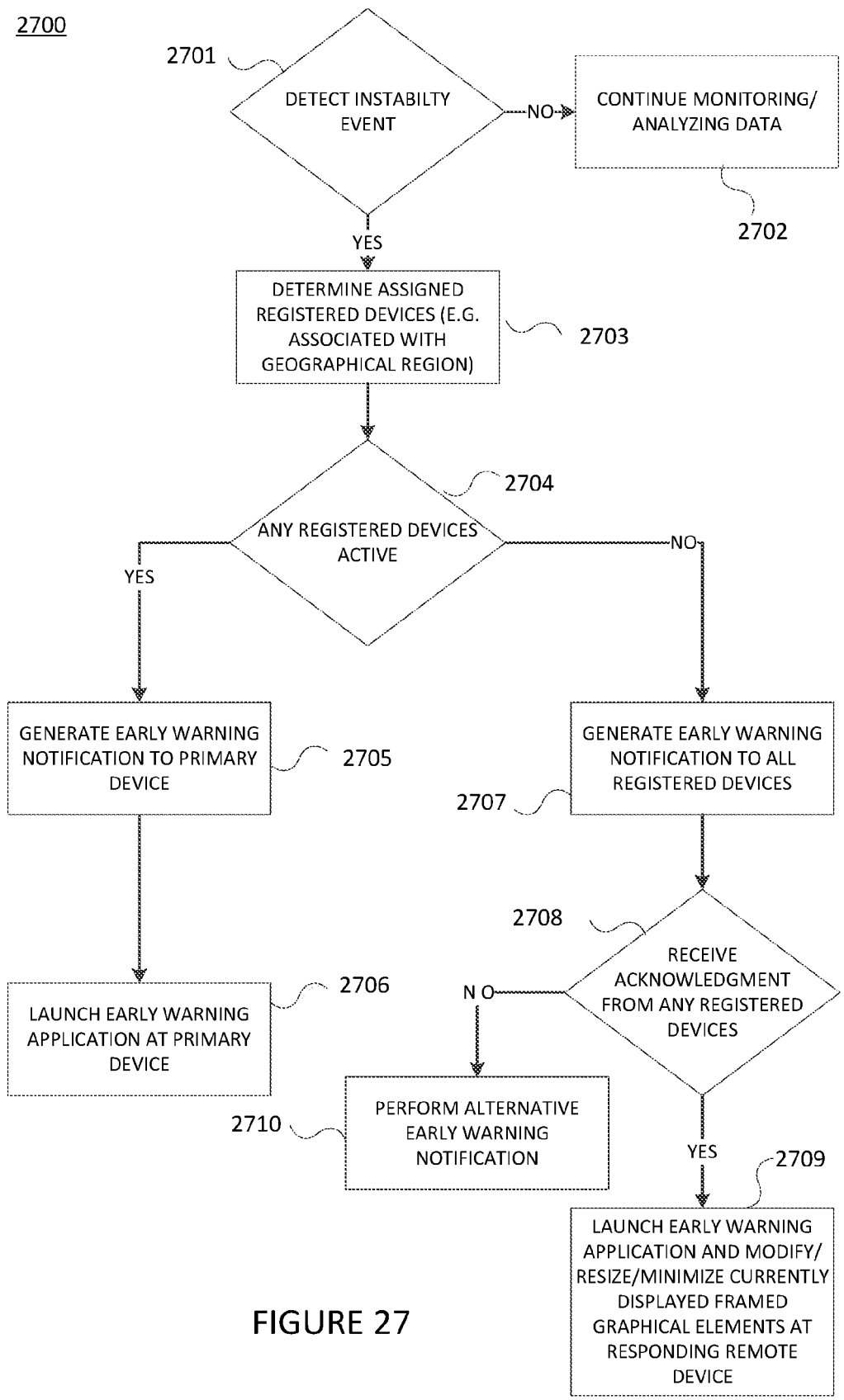
FIG. 27 illustrates a flow diagram for generating an early warning signal from processed information and responding to the early warning signal in accordance with an aspect of the embodiments.

FIG. 27 illustrates flow diagram 2700 for generating an early warning signal from processed information and responding to the early warning signal in accordance with an aspect of the embodiments. With some embodiments, flow diagram 2700 may be performed by one or more processors executing computer readable instructions from one or more non-transitory computer-readable media spanning data server 2601, communication server 2602, and/or web server 2603.

Referring to FIGS. 26 and 27, system 2600 obtains information about a real-world system from information source 2630. At block 2701, system 2600 determines whether there is a potential instability within the real-world system. For example, system 2600 may detect the dynamics of a system approaching a tipping point as indicated by slower recovery from perturbations, increased autocorrelation, and/or increased variance. If not, system 2600 continues to monitor/analyze information from source 2630.

If a potential instability is detected at block 2701, system 2600 determines the assigned registered devices for the potential instability at block 2703, where registered devices may be associated with one or more users. For example, the real-world system may exhibit instability at some or all of the associated geographical regions (entities), where registered devices may be assigned to a particular geographical region. Based on the determined geographical region, one or more registered computing devices 2620-2622 (e.g., desktops, laptops, notebooks, mobile telephones or smartphones with applications and other functionality, handheld device with Wi-Fi or other wireless enabled tablets, tablet computers, PDAs, and the like), may be registered for the geographical region on behalf of the user or users responsible for the identified geographical region.

Devices 2620-2622 may be registered according to different criteria, e.g., associated with specific geographical regions as discussed above. Moreover, embodiments may consider an identified economic system spanning geographies, industries, and/or other economic neighborhoods when determining criteria for the registration of devices 2620-2622.

System 2600 determines whether any of registered computing devices 2620-2622 are active at block 2704. If so, system 2600 generates an early warning notification to the primary device at block 2705. For example, a user may be active at primary computing device 2620 (which may be registered as the primary device since it operates in a more secure office environment). With some embodiments, the notification may be a short text message identifying the possible instability and the associated geographical region.

At block 2706, an early warning application may be automatically launched at the primary device after the notification is received at the computing device. The early warning application may obtain detailed information about the detected event. For example, a communication connection may be established between web server 2603 and device 2620 via communication server 2602 to provide quantitative information (e.g., AR auto-correlation and/or smoothed derivative of the AR) as well as graphical information. The additional information may be formatted in one or more webpages by web server 2603 and displayed at computing device 2620 via the early warning application and/or web browser.

However, if system 2600 determines that none of the registered devices is active at block 2704, system 2600 generates an early warning notification to all registered devices at block 2707. For example, if device 2620 is not active, system 2600 may send an early warning notification to remote computing devices 2621-2622, which may be portable devices having lesser capabilities than device 2620.

If system 2600 receives an acknowledgement from a registered device, as detected at block 2708, the early warning application may be automatically launched at the responding device at block 2709. In addition, based on the display capabilities of the device, some or all of the currently displayed framed graphical elements (sometimes referred as windows) may be modified, resized, and/or minimized to more effectively display the detailed content of the early warning signal. For example, a currently displayed window may be obscuring a window depicting a graphical representation about the HPI (FIGS. 23A-D). If so, the currently displayed window may be modified or moved to reduce the obscurity.

If system 2600 does not receive an acknowledgement to the early warning notification from any of the registered devices, system 2600 may initiate an alternative early warning notification. A notification may be sent to alternative devices (e.g., devices registered for a different geographical region) or via e-mail sent to registered users at block 2710.

Figure 28:
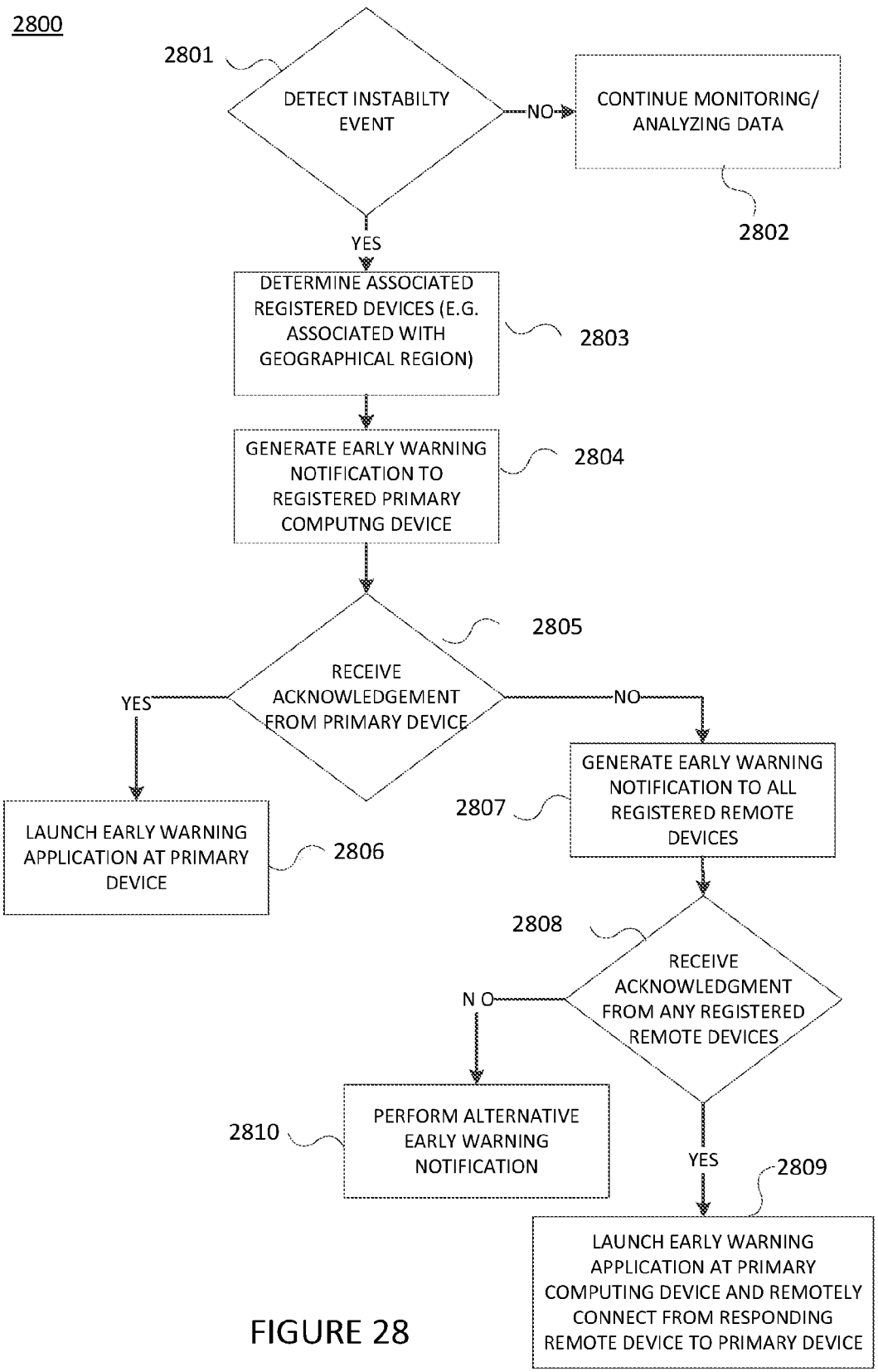
FIG. 28 illustrates a flow diagram for generating an early warning signal from processed information and responding to the early warning signal in accordance with an aspect of the embodiments.

FIG. 28 illustrates flow diagram 2800 for generating an early warning signal from processed information and responding to the early warning signal in accordance with an aspect of the embodiments. Referring to FIG. 27, blocks 2801-2808 and 2810 are similar to blocks 2701-2708 and 2710, respectively. However, if system 2600 receives an acknowledgment from a registered remote device at block 2808, the early warning application is launched at the primary computing device (e.g., the user's computer located on the office environment) to retrieve detailed information from web server 2603. A communication connection may then be automatically established between the remote device and the primary device via communication server 2602. Consequently, a user may obtain detailed information about the potential instability from the primary device via the communication connection at the remote device.

Referring to FIGS. 27 and 28, while early warning notifications may target specific devices, embodiments may target access-id applications, e.g., social media user accounts, domain-specific registered users, and the like. The additional layer of notification may not have very specific details of the alert other than notify the recipient of the message to check the devices where the recipient chooses to receive the secured alert.

Figure 29:
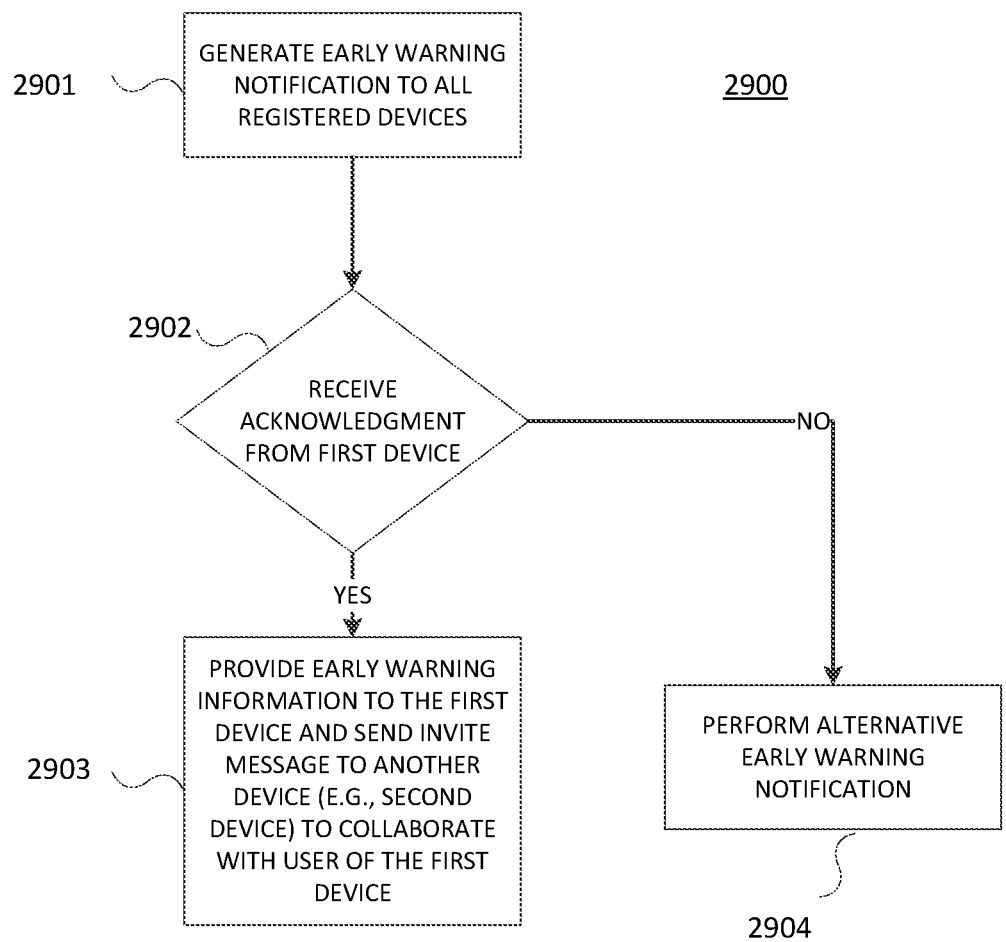
FIG. 29 illustrates a flow diagram for sending an early warning signal to a plurality of computing devices in accordance with an aspect of the embodiments.

FIG. 29 illustrates flow diagram 2900 for sending an early warning signal to a plurality of computing devices in accordance with an aspect of the embodiments. As with flow diagrams 2700 and 2800, system 2600 generates an early warning notification to all registered computing devices 2620-2622 at block 2901. When the first device acknowledges the notification at block 2902, system 2600 provides detailed early warning information to the first responding device. At block 2903, an invite message may be generated and sent to another device so that the user of the first device can collaborate with another user of the other device, where the other device may or may not be registered. When communication is established between the first device and the other device, the detailed information may be shared with the other device. Furthermore, a subsequent invite massage may be generated by the first device, other device, or system 2600 to include a further device during the collaboration.

Figure 30:
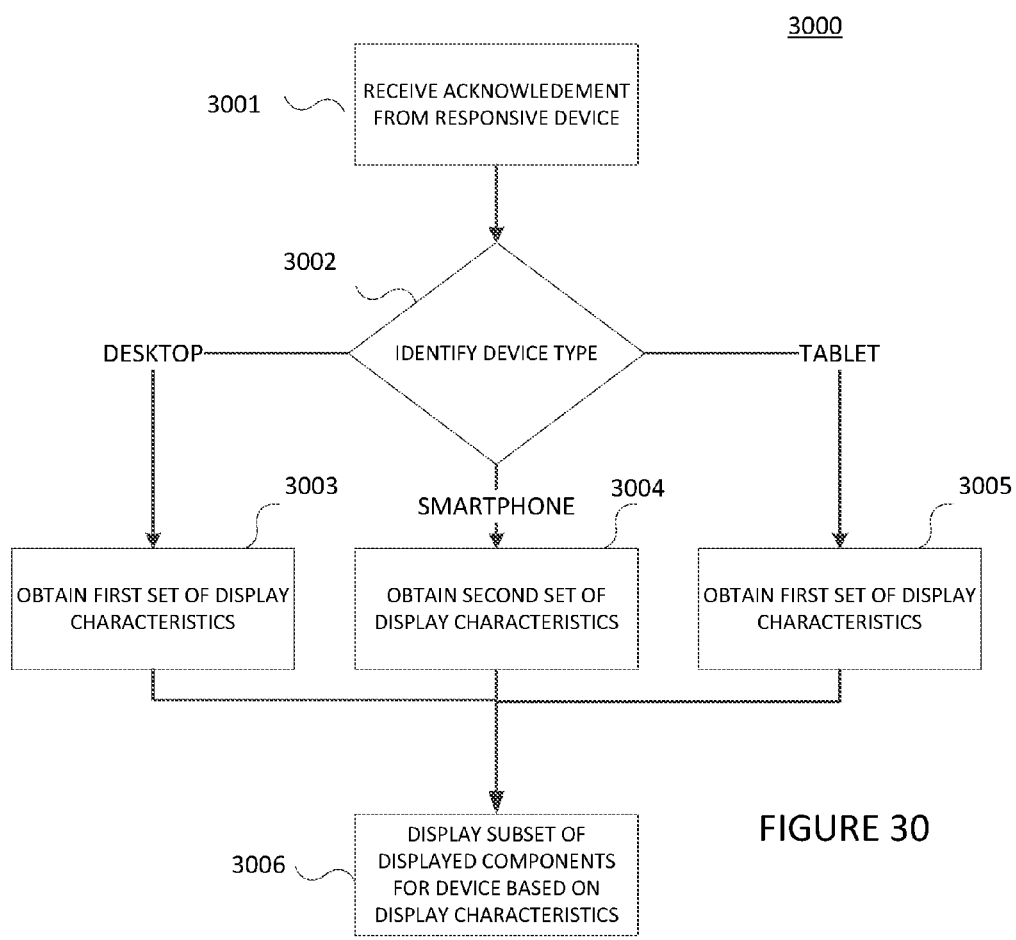
FIG. 30 illustrates a flow diagram for displaying information obtained from an early warning signal at a computing device in accordance with an aspect of the embodiments.

FIG. 30 illustrates flow diagram 3000 for displaying information derived from an early warning signal at a computing device in accordance with an aspect of the embodiments. At block 3001, system 2600 receives an acknowledgment to an early warning notification from one of the registered devices. System 2600 identifies the device type of the responding device at block 3002 and determines the display characteristics based on the identified device type at blocks 3003-3005, which corresponds to a desktop, smartphone, and tablet, respectively. However, additional or different types of devices may be supported. Based on the obtained display characteristics, web server 2603 may consider the viewable image size, resolution, and aspect ratio to determine the amount of detailed information provided to the device. Web server 2603 may partition the detailed information into a plurality of information components and provide selected information components of the detailed information to the device based on the display characteristics at block 3006. For example, different information components may comprise different graphical elements having varying degrees of information and/or resolution.

Information components of the detailed may span a variety of forms including textual information and visualizations that may convey the systematic uncertainty associated with the potential instability. Visualizations may be presented in different forms, including graphs, network diagrams, correlograms, and the like. The information components may be pushed from computer system 2600 or may be pulled by computing devices 2620-2622. When pushed, computer system 2600 may obtain the display characteristics of a responding computing device 2620-2622, and send information components that the responding computing device can effectively display. When pulled, an early warning application may support a dashboard from which a user can select available information components that are to be displayed on the computing device.

When early warning system 2502 has notified registered devices about the potential instability, early warning system 2502 may further insure that the computing devices of appropriate individuals are connected via a communication system (for example, by generating invite messages as discussed above) so that a decision about the instability can be reached by a participant or collectively by a group of participants. With some embodiments, a data structure (e.g., role-based matrix) may map a level of responsibility for each of the participants and with identities of associated computing devices for those who are needed in the decision-making process. The data structure may be based on an organization chart, where typically the higher one's level in organization chart, the greater the authority one has for making a decision. The data structure may relate the individual, the level of responsibility, and the device identity of the individual. The data structure may reside within system 2600 or may reside in a separate computing entity (e.g., a separate server).

With some embodiments, early warning system 2502 may interact with an emergency notification system that may have been established to reach personnel in the event of natural and non-natural events. The emergency notification system may follow a contact tree to contact employees via telephone calls, e-mails, and so forth. The early warning signal from early warning system 2502 may induce the early notification system to function as an added contact mechanism. Moreover, the contact mechanism may include delivering early warning signals through social media and software-defined networks.

In some situations, only some of the participants of the communication connection may have the authority to make a decision about the instability. With some embodiments a separate communication connection may be established among the decision-makers (e.g., a subset of the participants) so that messaging/conversation among the decision-makers is not available to other participants. For example, some of the participants in a first communication connect may not have the authority to make a decision about an instability. If so, a second communication connection may be established among the decision-makers, where the conversation/messaging of the second communication connection is not available to the first communication connection.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   an early warning system;
   a processor; and
   memory storing computer readable instructions that, when executed by the processor, cause the apparatus to:
   receive economic data of multiple time series for an economic system;
   determine correlation coefficient values using the data of the multiple time series;
   create a matrix using the correlation coefficient values;
   determine the nearest neighbor spacing distribution;
   determine lowest values of correlation coefficients and set the lowest values of correlation coefficients iteratively to zero;
   determine a threshold level of a control parameter, wherein the threshold level is detected once a phase transition occurs and wherein a modeled distribution for the economic data changes from a first distribution to a second distribution;
   output an economic instability prediction based on the threshold level;
   generate, based on the economic instability prediction, an early warning signal about the economic data, wherein the early warning signal is indicative of whether the threshold level is approaching and wherein the early warning signal comprises an early warning notification and detailed information about a potential instability of the economic data;
   determine a set of registered computing devices associated with the economic system, wherein the set includes a first device and a second device;
   send the early warning notification about the economic system to the first and second devices;
   initiate launching of an early warning application at the first device; and
   send the detailed information about the potential instability to the first device via the early warning application.

2. The apparatus of claim 1 wherein the nearest neighbor spacing distribution is determined by taking the differences between nearest neighbor eigen-values derived from a correlation coefficient matrix.

3. The apparatus of claim 2, wherein the memory storing the computer readable instructions that, when executed by the processor, further cause the apparatus to:
diagonalize the correlation coefficient matrix until the phase transition occurs.

4. The apparatus of claim 1 wherein the threshold level is determined by using a chi-square test.

5. The apparatus of claim 4 wherein the threshold level is determined additionally by detecting a sharp phase transition from a Gaussian Orthogonal Ensemble distribution to a Poisson distribution.

6. The apparatus of claim 1 wherein standard Pearson correlation coefficient values are determined using the data of multiple time series.

7. The apparatus of claim 1, wherein the memory stores computer readable instructions that, when executed by the electronic processing device, further cause the apparatus to:
send an invite message to another device, wherein the invite message invites the other device to communicate with the first device.

8. The apparatus of claim 1, wherein the memory stores computer readable instructions that, when executed by the electronic processing device, further cause the apparatus to:
when the acknowledgment to the warning notification is received from the first device, identify a device type of the first device;
determine a first display characteristic of the first device from the device type; and
send a subset of information components to the first device based on the first display characteristic, wherein the detailed information comprises a plurality of information components.

9. The apparatus of claim 1 further comprises:
a data structure, wherein the data structure maps decision-making roles of individuals with associated device identities, wherein the device identities identify a plurality of devices; and
wherein the memory device storing computer readable instructions that, when executed by the electronic processing device, further causes the apparatus to establish a first communication connection with the plurality of devices based on the data structure.

10. The apparatus of claim 9 wherein the memory stores computer readable instructions that, when executed by the electronic processing device, further cause the apparatus to:
establish a second communication connection with a subset of the plurality of devices based on the data structure; and
prevent content of the second communication connection from being conveyed to the first communication connection.

11. The apparatus of claim 1 wherein the memory stores computer readable instructions that, when executed by the electronic processing device, further cause the apparatus to:
send an alert indication to a designated recipient through an access-id application, wherein the recipient is informed to check at least one of the set of registered computing devices.

12. A method comprising:
receiving, by a processing system, economic data of multiple time series;
determining, by the processing system, correlation coefficient values using the data of the multiple time series;
creating, by the processing system, a matrix using the correlation coefficient values;
determining, by the processing system, the nearest neighbor spacing distribution;
determining, by the processing system, lowest values of correlation coefficients and setting the lowest values of correlation coefficients iteratively to zero;
determining, by the processing system, a threshold level of a control parameter, wherein the threshold level is detected once a phase transition occurs and wherein a modeled distribution for the economic data changes from a first distribution to a second distribution;
outputting, by the processing system, an economic instability prediction based on the threshold level;
generating, by the processing system, an early warning signal based on the economic instability prediction for an economic system, wherein the early warning signal is indicative of whether the threshold level is approaching and wherein the early warning signal comprises an early warning notification and detailed information about a potential instability of the economic system;
sending the early warning notification about the economic system to a primary device;
when an acknowledgement is received from the primary device, sending the detailed information about the instability to the primary device; and
when the acknowledgement is not received from the primary device,
determining a set of registered computing devices associated with the economic system, wherein the set includes a first device and a second device;
sending the early warning notification about the economic system to the first and second devices;
initiating a launching of an early warning application at the primary device;
remotely connecting the primary device to the first device; and
sending the detailed information to the first device via the primary device.

13. The method of claim 12 wherein the nearest neighbor spacing distribution is determined by taking the differences between nearest neighbor eigen-values derived from a correlation coefficient matrix.

14. The method of claim 12 wherein the threshold level is determined by using a chi-square test.

15. The method of claim 14 wherein the threshold level is determined by detecting a sharp phase transition from a Gaussian Orthogonal Ensemble distribution to a Poisson distribution.

16. The method of claim 12 wherein standard Pearson correlation coefficient values are determined using the data of multiple time series.

17. One or more non-transitory computer-readable media having instructions stored thereon that, when executed, cause at least one computing device to:
receive economic data of multiple time series for an economic system;
determine correlation coefficient values using the data of the multiple time series;
create a matrix using the correlation coefficient values;
determine the nearest neighbor spacing distribution;
determine lowest values of correlation coefficients and set the lowest values of correlation coefficients iteratively to zero;
determine a threshold level of a control parameter by using a chi-square test, wherein the threshold occurs at an observed phase transition and wherein a modeled distribution for the economic data changes from a first distribution to a second distribution;

output an economic instability prediction based on the threshold level;

generate an early warning signal from the economic instability prediction for the economic system, wherein the early warning signal is indicative of whether the threshold level is approaching and wherein the early warning signal comprises and early warning notification and detailed information about a potential instability of the economic system;

determine a set of registered computing devices associated with the economic system, wherein the set comprises a first device and a second device;

send the early warning notification about the economic system to the first and second devices;

initiate of an early warning application at the first device; and send the detailed information about the potential instability to the first device via the early warning application.

18. The one or more non-transitory computer-readable media of claim 17 wherein the nearest neighbor spacing distribution is determined by taking the differences between nearest neighbor eigen-values derived from a correlation coefficient matrix.

19. The one or more non-transitory computer-readable media of claim 17 wherein the threshold level is determined by detecting a sharp phase transition from a Gaussian Orthogonal Ensemble distribution to a Poisson distribution.

20. The one or more non-transitory computer-readable media of claim 17 wherein standard Pearson correlation coefficient values are determined using the data of multiple time series.

21. An apparatus comprising:
a processor; and
memory storing computer readable instructions that, when executed by the processor,
cause the apparatus to:
obtain economic data of multiple time series of interest about an economic system;
determine correlation coefficient values using the data;
form a matrix of the correlation values and determine eigen-values of the correlation matrix;
form a random matrix counterpart with a known eigen-value density distribution;
compare statistics of the eigen-values of the data correlation matrix to values of the random matrix counterpart of the known eigen-value distribution;
determine a difference between a quantity of the eigen-values of the data correlation matrix and the random matrix counterpart;
output a retained number of principal components to be retained based on the difference between the quantity of the eigen-values of the data correlation matrix and the random matrix counterpart; and
determine, from the retained number, a driver of trends determined from the economic data;
include an indicator about the driver in an early warning signal, wherein the early warning signal comprises an early warning notification and detailed information about a potential instability of the economic system;
determine a set of registered computing devices associated with the economic system, wherein the set includes a first device and a second device;
initiate a launching of an early warning application at the first device; and
send the detailed information about the potential instability to the first device via the early warning application.

22. The apparatus of claim 21 wherein standard Pearson correlation coefficients are obtained using the data.

23. The apparatus of claim 21, wherein the memory storing the computer readable instructions that, when executed by the processor, further cause the apparatus to:
determine maximum values of observed eigen-values;
determine an observed quantity of observed eigen-values greater than the maximum values; and
approximate the retained number of principle components by the observed quantity.

24. The apparatus of claim 21, wherein the memory storing the computer readable instructions that, when executed by the processor, further cause the apparatus to:
analyze micro level data after the driver has been determined.

* * * * *